(12) United States Patent
Glowny et al.

(10) Patent No.: US 6,249,570 B1
(45) Date of Patent: Jun. 19, 2001

(54) SYSTEM AND METHOD FOR RECORDING AND STORING TELEPHONE CALL INFORMATION

(76) Inventors: David A. Glowny, 53 Candlewood Rd., Milford, CT (US) 06460; Phil Min Ni, 3 Fairview Dr., Apt. 2, Danbury, CT (US) 06810; John E. Richter, 118 Shelton Rd., Trumbull, CT (US) 06611

(*) Notice: Subject to any disclaimer, the term of this patent is extended or adjusted under 35 U.S.C. 154(b) by 0 days.

(21) Appl. No.: 09/328,299

(22) Filed: Jun. 8, 1999

(51) Int. Cl.$^7$ ............................................. H04M 1/64
(52) U.S. Cl. ................................. 379/88.22; 379/111
(58) Field of Search ....................... 379/67.1, 68, 88.09, 379/88.11, 88.22, 88.25, 93.12, 93.17, 93.23, 111, 112, 113, 116, 265, 266, 267, 309; 360/5, 6, 55

(56) References Cited

U.S. PATENT DOCUMENTS

| | | |
|---|---|---|
| 3,104,284 | 9/1963 | French et al. . |
| 3,369,077 | 2/1968 | French et al. . |
| 3,723,667 | 3/1973 | Park, Jr. et al. .................. 179/100.1 |
| 3,727,203 | 4/1973 | Crossman ...................... 340/174.1 J |
| 4,130,739 | 12/1978 | Patten ................................ 179/100.1 |
| 4,199,820 | 4/1980 | Ohtake et al. ......................... 365/234 |
| 4,260,854 | 4/1981 | Kolodny et al. ...................... 179/6.09 |
| 4,298,954 | 11/1981 | Bigelow et al. ....................... 364/900 |
| 4,435,832 | 3/1984 | Asada et al. ............................. 381/34 |
| 4,442,485 | 4/1984 | Ota et al. ............................... 364/200 |
| 4,542,427 | 9/1985 | Nagai ................................... 360/72.1 |
| 4,549,047 | 10/1985 | Brian et al. .......................... 179/18 B |
| 4,602,331 | 7/1986 | Sheth ................................... 364/200 |
| 4,621,357 | 11/1986 | Naiman et al. .......................... 370/58 |
| 4,630,261 | 12/1986 | Irvin ........................................ 370/81 |
| 4,631,746 | 12/1986 | Bergeron et al. ....................... 381/35 |
| 4,679,191 | 7/1987 | Nelson et al. ........................... 370/84 |
| 4,686,587 | 8/1987 | Hipp et al. ............................ 360/74.2 |
| 4,688,117 | 8/1987 | Dwyer et al. ......................... 360/72.3 |
| 4,692,819 | 9/1987 | Steele .................................. 360/72.1 |
| 4,709,390 | 11/1987 | Atal et al. ............................... 381/51 |
| 4,785,408 | 11/1988 | Britton et al. ...................... 364/513.5 |
| 4,785,473 | 11/1988 | Pfeiffer et al. .......................... 379/89 |
| 4,799,144 | 1/1989 | Parruck et al. ....................... 364/200 |
| 4,799,217 | 1/1989 | Fang ..................................... 370/68.1 |
| 4,811,131 | 3/1989 | Sander et al. ......................... 360/74.4 |
| 4,811,376 | 3/1989 | Davis et al. ............................. 379/57 |
| 4,827,461 | 5/1989 | Sander ..................................... 369/7 |
| 4,829,514 | 5/1989 | Frimmel, Jr. et al. .................. 370/58 |
| 4,835,630 | 5/1989 | Freer ...................................... 360/69 |
| 4,841,387 | 6/1989 | Rindfuss ............................... 360/721 |
| 4,851,937 | 7/1989 | Sander ................................... 360/69 |
| 4,853,952 | 8/1989 | Jachmann et al. ...................... 379/88 |
| 4,864,620 | 9/1989 | Bialick .................................... 381/34 |
| 4,873,589 | 10/1989 | Inazawa wt al. ....................... 360/53 |
| 4,890,325 | 12/1989 | Taniguchi et al. ...................... 381/34 |
| 4,891,835 | 1/1990 | Leung et al. ............................ 379/88 |
| 4,893,197 | 1/1990 | Howells et al. ........................... 360/8 |

(List continued on next page.)

FOREIGN PATENT DOCUMENTS

| | | | |
|---|---|---|---|
| 0 544 626 A2 | 8/1993 | (EP) | ............................. H04Q/11/04 |
| 0 437 515 B1 | 1/1998 | (EP) | ............................. H04M/3/42 |
| 0 822 696 A2 | 2/1998 | (EP) | ............................. H04N/3/36 |
| 2 310 102 | 8/1997 | (GB) | ............................. H04N/1/21 |

\* cited by examiner

*Primary Examiner*—Scott L. Weaver

(57) ABSTRACT

A system and method for monitoring a telephone switching environment. In a preferred embodiment the system and method identify telephone call segments that relate to one telephone call and construct a data representation of a lifetime of the telephone call, using data regarding telephony events associated with the telephone call segments of the telephone call. The system and method are also capable of using the data representation to display a graphical representation of a lifetime of a telephone call.

8 Claims, 29 Drawing Sheets

| AgentId | EXTENSION | LOCATION | START TIME | END TIME | CONNECT REASON | DISCONNECT REASON |
|---|---|---|---|---|---|---|
| A | | EXTERNAL | $t_1$ | $t_7$ | NORM START | NORM DROP |
| B | 0001 | INTERNAL | $t_1$ | $t_4$ | NORM START | Xfr AWAY |
| HOLD | | INTERNAL | $t_4$ | $t_6$ | Xfr Rec | Xfr AWAY |
| C | 0002 | INTERNAL | $t_6$ | $t_7$ | Xfr Rec | OTHER PARTY HANGUP |

U.S. PATENT DOCUMENTS

| | | | |
|---|---|---|---|
| 4,907,225 | 3/1990 | Gulick et al. | 370/94.1 |
| 4,939,595 | 7/1990 | Yoshimoto et al. | 360/19.1 |
| 4,975,941 | 12/1990 | Morganstein et al. | 379/88 |
| 4,991,217 | 2/1991 | Garrett et al. | 381/43 |
| 5,001,703 | 3/1991 | Johnson et al. | 370/79 |
| 5,031,146 | 7/1991 | Umina et al. | 365/189.01 |
| 5,065,428 | 11/1991 | Mitchell et al. | 380/23 |
| 5,129,036 | 7/1992 | Dean et al. | 395/2 |
| 5,130,975 | 7/1992 | Akata | 370/60 |
| 5,142,527 | 8/1992 | Barbier et al. | 370/62 |
| 5,163,132 | 11/1992 | DuLac et al. | 395/275 |
| 5,179,479 | 1/1993 | Ahn | 360/72.1 |
| 5,195,128 | 3/1993 | Knitl | 379/67 |
| 5,210,851 | 5/1993 | Kato et al. | 395/425 |
| 5,216,744 | 6/1993 | Alleyne et al. | 395/2 |
| 5,270,877 | 12/1993 | Fukushima et al. | 360/48 |
| 5,274,738 | 12/1993 | Daly et al. | 395/2 |
| 5,283,818 | 2/1994 | Klausner et al. | 379/67 |
| 5,305,375 | 4/1994 | Sagara et al. | 379/89 |
| 5,339,203 | 8/1994 | Henits et al. | 360/39 |
| 5,353,168 | 10/1994 | Crick | 360/5 |
| 5,396,371 | 3/1995 | Henits et al. | 360/5 |
| 5,404,455 | 4/1995 | Daly et al. | 395/275 |
| 5,446,603 | 8/1995 | Henits et al. | 360/48 |
| 5,448,420 | 9/1995 | Henits et al. | 360/48 |
| 5,457,782 | 10/1995 | Daly et al. | 395/2 |
| 5,533,103 * | 7/1996 | Peavey et al. | 379/69 |
| 5,819,005 | 10/1998 | Daly et al. | 395/2.09 |
| 5,867,559 * | 2/1999 | Jorgensen et al. | 379/67 |
| 5,982,857 * | 11/1999 | Brady | 379/88.19 |
| 6,070,241 * | 5/2000 | Edwards et al. | 379/67 X |

FIG. 16

| AgentId | EXTENSION | LOCATION | START TIME | END TIME | CONNECT REASON | DISCONNECT REASON |
|---|---|---|---|---|---|---|
| A | | EXTERNAL | $t_1$ | $t_7$ | NORM START | NORM DROP |
| B | 0001 | INTERNAL | $t_1$ | $t_4$ | NORM START | Xfr AWAY |
| HOLD | | INTERNAL | $t_4$ | $t_6$ | Xfr Rec | Xfr AWAY |
| C | 0002 | INTERNAL | $t_6$ | $t_7$ | Xfr Rec | OTHER PARTY HANGUP |

FIG.16B

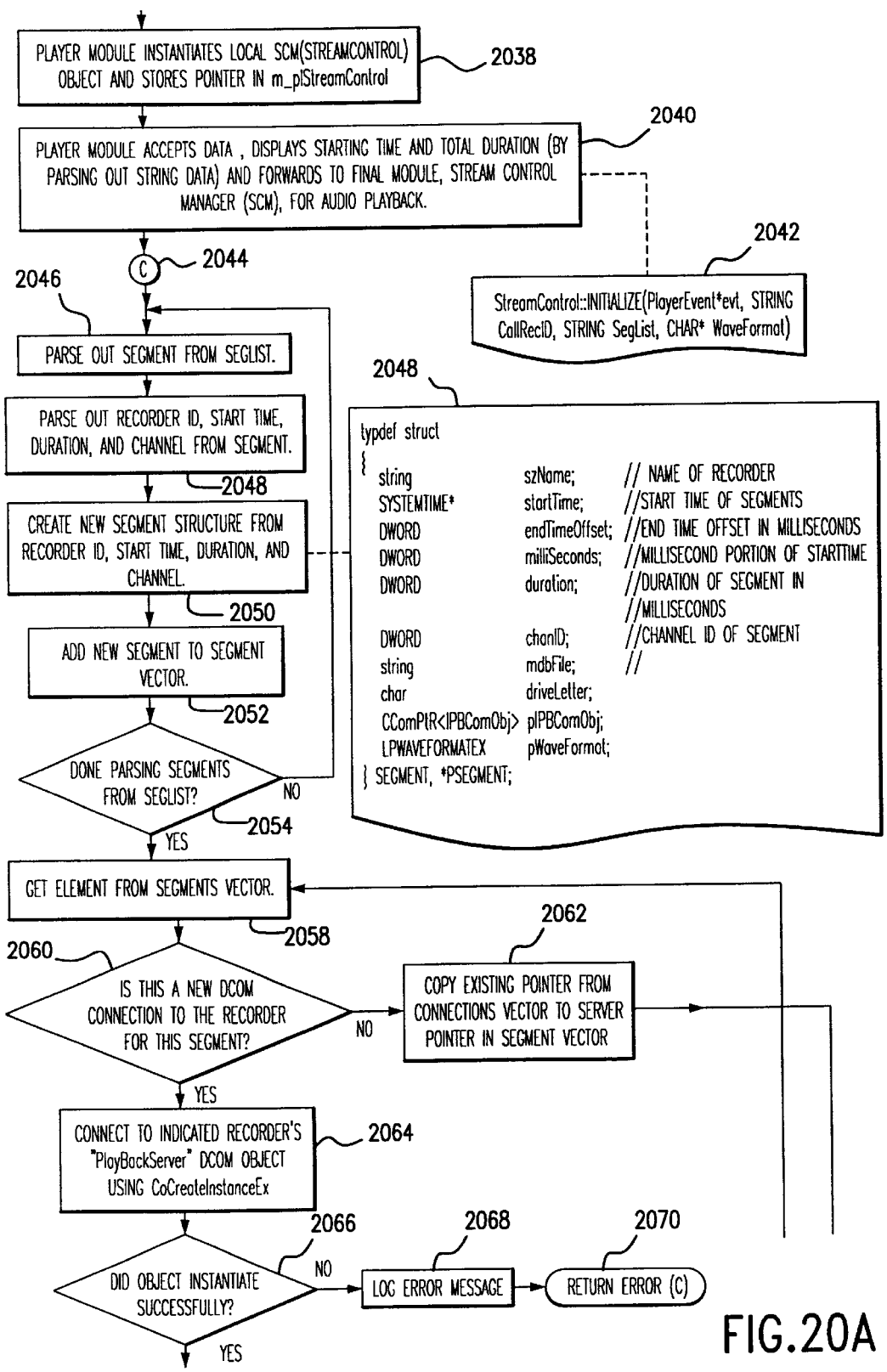

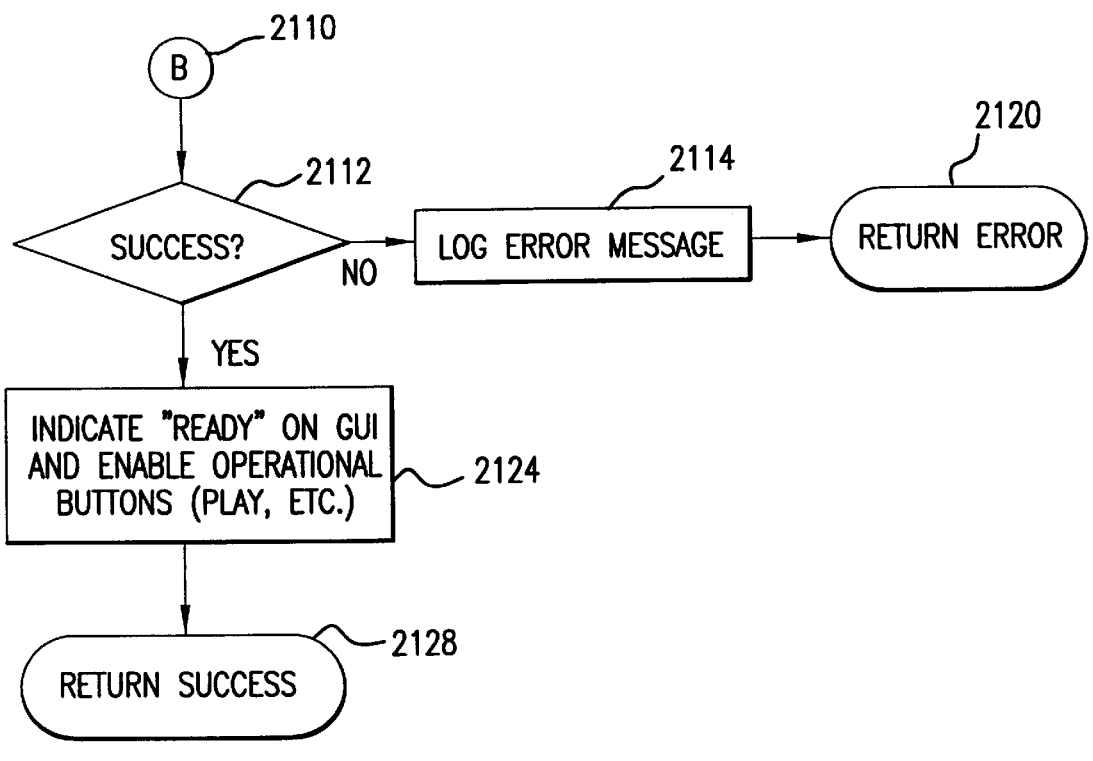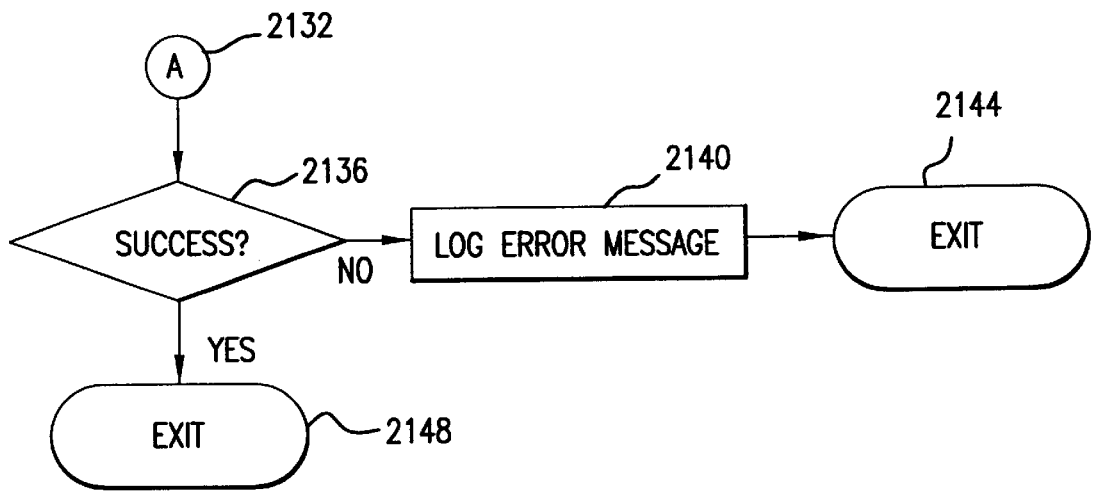
FIG.21

SYSTEM AND METHOD FOR RECORDING AND STORING TELEPHONE CALL INFORMATION

FIELD OF THE INVENTION

This invention relates generally to computer-aided data recording. In particular, it relates to computer-aided monitoring and recording of telephone calls.

BACKGROUND OF THE INVENTION

Telephone call monitoring systems are used in a variety of contexts, including emergency dispatch centers and commercial call centers. In many currently available call monitoring systems, a multitude of audio input sources ("channels") are monitored and recorded by a single hardware unit, and the audio recordings are saved and organized according to the input channel, date, time and duration. The capacity of the recording unit can be expanded to handle a larger number of channels by combining several recording units into a system using a local area network (LAN). Because retrieval is only possible using basic search criteria (recording unit, channel, date, time and duration), it is often difficult to locate a particular audio recording that is of interest. When there is a need to search for a recording according to search criteria that are not directly supported by simple voice recording, locating a specific recording may require tedious and repetitive searching. For example, if there is a need to find a specific customer's call to resolve a disputed transaction, the recording unit or channel that carried the original call might not be known, so the searcher would be forced to manually play back many calls before finding the correct one.

With the advent of computer telephony integration (CTI), it is now possible to monitor a data link that supplies more information about telephone calls, in addition to simple voice recording. In a typical CTI system a telephone switch or private branch exchange (PBX) provides an interface suitable for processing by a computer, and expanded information about telephone calls is made available through this interface as the calls occur. Data fields that are available within this expanded information may include the external telephone number of the calling party, as well as identification numbers to help associate a series of events pertaining to the same call. With such a data link being used alongside a voice recording system, the search and retrieval system can be supplemented by constructing a database that combines the previously discussed basic search criteria with enhanced search criteria (based upon information obtained through a CTI data link) such as: telephone numbers of parties involved in the call; Caller ID (CLID) or Automatic Number Identification (ANI); Dialed Number Identification Service (DNIS); or the Agent ID Number of the Customer Service Representative.

As shown in FIG. 2, with suitable equipment for tapping into a voice communications line, a recording unit can intercept telephone call traffic using two methods. By attaching wires for recording channels on each extension within a call center, the traffic can be intercepted and recorded as it passes between the PBX and the agent telephone set. This first method is known as "station-side" recording 180. Alternatively, by attaching equipment on the trunk lines between the PBX and Public Switched Telephone Network (PSTN), the traffic can be intercepted at its point of entry into the call center before the calls are dispatched by the PBX. This second method is known as "trunk-side" recording 170. Since businesses usually have more agent telephone sets than trunk lines, a "trunk-side" solution is likely to require less recording equipment and thus be less expensive. Another significant point for consideration is that "trunk-side" provides access only to external inbound or outbound calls, which are those typically involving customers of a business, whereas "station-side" also provides access to internal calls between agents (which may or may not relate to an external customer's transaction).

With respect to data links to provide call information to computers, there are typically two different categories of links from the PBX available. Some older links use interfaces such as SMDR (Station Message Detail Recording) or CDR (Call Detail Recording) that provide summary information about telephone calls in a line-oriented text format. Both acronyms refer to essentially the same type of system. Information from these links is generally provided after the call has concluded, and as such is suitable for billing applications or traffic analysis software. Many newer links use real-time interfaces that are designed to supply a series of events while a telephone call is still active within the PBX, to enable computer and multimedia systems to respond and interact with an external caller. The information provided by such real-time links is typically much more detailed than that provided by SMDR.

The detailed information and real-time nature of a CTI link is particularly important when building a recording system that is intended to react to telephone calls as they occur and to dynamically select which calls ought to be recorded or discarded. CTI-supplied information is also important when building a recording system that is intended to capture the full history of a telephone call, including recording the different agents who were involved in the conversation and how the call was held, transferred or conferenced. Likewise, real-time information is important in a system that intends to support (a) a live display of active calls, and (b) the capability for a user to listen and monitor the live audio traffic.

A "trunk-side" solution based upon voice recording alone will not satisfy the above requirements in a practical manner, since telephone calls are assigned to trunks dynamically as needed to handle the traffic. What trunk channel a particular call will be carried on cannot be predicted in advance. Without information to associate a logical telephone call with a physical recording of audio from a trunk channel, a user might have to search and retrieve many recordings before finding the one that is of interest. Moreover, in a system designed to make use of the enhanced search criteria provided by a data link, it would not be possible to programmatically associate the search data with the voice recording without information about the trunk channel where the call occurred.

This problem can be avoided as long as the data link provides sufficient information about the trunk channels being used for each call. Unfortunately, some PBX environments do not supply this critical information about trunk channels within the data provided on the real-time CTI link. For example, this problem is manifested by the Lucent Technologies DEFINITY G3 PBX, which is a commonly used telephone switch in North America. While the Lucent G3 PBX provides trunk channel information through its SMDR link, that information is not available until after the conclusion of the call. This presents a problem for system features and capabilities dependent upon real-time data. The real-time data link provided by the Lucent G3 PBX does not provide the necessary information about trunk channels. There is thus a need for a system which is capable of simultaneously monitoring both the SMDR link and the real-time CTI link, gathering information about calls from both sources, and combining that information into a single data model of the telephony activity within the call center. There is a further need for a system that combines the data model with information concerning the location of call recordings, resulting in a "master call record" that contains data matching each call with the segments of which it is comprised, and matching the data for each segment with the location of the recording of that segment. Such a system would facilitate monitoring, recording, and playing back complete telephone calls.

SUMMARY OF THE INVENTION

The present invention is directed to a system and method that is capable of simultaneously monitoring two or more data links, gathering information about calls from those data links, combining that information into a single data model of the telephony activity within the call center, and combining the data model with information concerning the location of call recordings, resulting in a "master call record" that contains data matching each call with the segments of which it is comprised, and matching the data for each segment with the location of the recording of that segment.

BRIEF DESCRIPTION OF THE DRAWINGS

FIG. 16 shows a graphical user interface used in the preferred embodiment.

FIG. 16B is a table illustrating descriptive information from the CTI Server used in a specific embodiment.

FIGS. 20, 20A, 20B, 21, 22, 22A, 22B, and 22C illustrate the operation of the Stream Control Manager.

DETAILED DESCRIPTION OF PREFERRED EMBODIMENTS

The present invention is directed to a communication recording system and method. Generally, the functionality of the system involves tapping into activity on a PBX (Private Branch Exchange) by intercepting audio on either the trunk or station side of a telephone call. The tapped audio is then redirected as input to a channel on a Digital Signal Processor (DSP) based voice processing board, which in turn is digitized into program addressable buffers. The recorded digitized audio is then combined with descriptive information ("metadata") obtained through a Computer Telephony Integration (CTI) communications link with the PBX, and stored as a single manageable unit ("Voicedata") to facilitate its subsequent search and retrieval. The system uses modular architecture in both its hardware and software, so that any one component can be replaced or upgraded without affecting the rest of the system.

In a preferred embodiment the communications recording system comprises multiple rack-mountable computer-processing servers (such as the Compaq ProLiant 1600 R), using a multi-tasking operating system (e.g., Microsoft Windows NT), DSP voice processing boards (e.g., Dialogic D/160SC), and a distributed set of software components available from Dictaphone Corporation. In a specific embodiment directed to the smallest configuration, all of these components may reside in a single computer-processing server. In other preferred embodiments, related components are typically packaged in combinations and the entire system spans multiple servers that coordinate processing through a Local Area Network (LAN).

In this preferred configuration, the overall system generally comprises CTI Servers, Voice Servers, a Central Database Server, and User Workstations. CTI servers generally use a set of components to manage a data communications link with a telephone switch environment, to obtain notification of calls as they occur, along with the descriptive information about the calls (e.g., source and destination telephone numbers). The Voice Servers use a set of components to collect audio recordings, manage their storage, and facilitate their playback through the LAN. The Central Database Server uses a set of components to manage system-wide search and retrieval of recorded calls. User Workstations are typically desktop computers that use a set of components to allow a person to submit requests to search and retrieve recorded calls for playback and to control automatically scheduled functions within the recording system.

Figure 1:
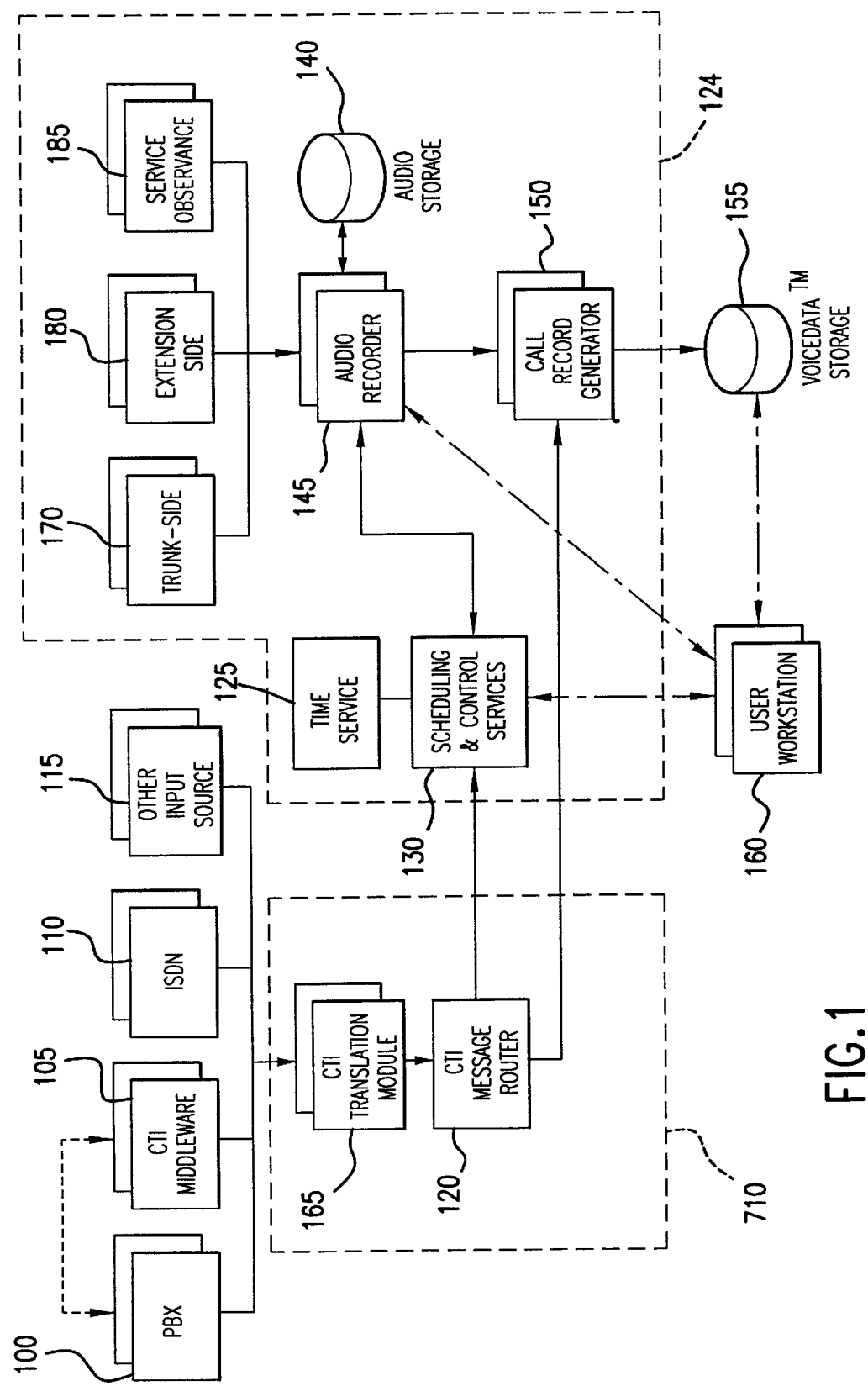
FIG. 1 is a block diagram of the system of this invention in a preferred embodiment.

FIG. 1 shows in a block diagram from components of the system of this invention in a preferred embodiment. Data enters the recording system from a variety of sources. These sources can include a PBX 100, CTI middleware 105, ISDN lines 110, or other input sources 115. It will thus be appreciated that the system of the present invention can be used for monitoring and recording of information about any type of electronic communications. For simplicity, the following discussion uses the term Telephone calls. However, it is intended that term covers any electronic communication unless specified otherwise expressly.

Data from data sources 100, 105, 110 or 115 is transmitted to one or more CTI Translation Modules 165, which translates input data into a common format. The data is then sent to a CTI Message Router 120, which distributes the data onward to appropriate components of the system.

Audio Recorders 145 may be used for passive trunk-side 170 and extension-side 180 recording on a predetermined static set of devices, as well as dynamically initiated recording of specific devices according to scheduling criteria through the Service Observance feature 185 provided by a telephone switch environment. The recordings are stored on an audio storage device 140. A Call Record Generator 150 matches data from the Audio Recorders 145 with data sent by the CTI Message Router 120 to create a Master Call Record (MCR) for each telephone call. The MCRs are stored in a Voicedata Storage module 155. One or more User Workstations 160 use the MCRs to reconstruct and play back complete or partial phone conversations stored in the audio storage device 140. A Scheduling and Control Services module 130 controls the Audio Recorders 145 and communicates with User Workstation 160. The Scheduling and Control Services module is responsible for starting and stopping the audio recording activity, according to pre-defined rules that are dependent upon time data provided by the Time Service 115 and CTI information. As the system components are packaged in the typical configuration, the CTI translation modules 165 and CTI message router 120 are co-resident upon a computer-processing server called the CTI Server 710. In a similar fashion, the combined set of components including the Time Service 125, Scheduling & Control Services 130, Audio Recorder 145, Audio Storage 140, and Call Record Generator 150, in a specific embodiment can be co-resident upon a computer-processing server called the Voice Server 124. The Voicedata storage 155 resides within a computer-processing server called the Central Database Server. The specialized application software for the User Workstation 160 resides upon desktop computers that use, in a preferred embodiment, Microsoft Windows 95, Windows 98 or Windows NT operating systems.

As noted above, in a specific embodiment the CTI Server comprises two main modules: a CTI translation module (such as the software program CtiCtc.exe, CtiLts.exe, and other translation modules) and a CTI Message Router module (such as the software program CtiServ.exe discussed below, or its equivalent). In a specific embodiment, the CTI Server may have several translation modules, for example, one for each PBX interface, or for each vendor API layer. As shown in FIG. 1, the CTI Server of the preferred embodiment accepts data from a PBX or similar equipment in a telephone switch environment, and can use both real-time CTI communications links and asynchronous information sources such the Station Message Detail Recording (SMDR) interface. The CTI Server translates and combines the various types of input data into a unified, normalized format. Normalized format information is then passed by the Message Router to various components of the system, as required.

As noted above, the Voice Server in a specific embodiment has several modules, including the Audio Recorder 145 and Call Record Generator (CRG) 150. The Audio Recorder collects a plurality of audio segments, representing the portions of a telephone call during which the sound level exceeded an adjustable tolerance threshold, thereby discerning alternating periods of speech and silence. Functionally, the Call Record Generator (CRG) produces Master Call Records, which encapsulate information (metadata) describing a telephone call. This descriptive information comes from a plurality of sources, including but not limited to an Audio Recorder and a CTI Server. The call records are created using a participant-oriented Call Record Model. The CRG then attempts to match the call records with existing recorded audio data. The CRG is thus able to combine data arriving in different chronological order into a single manageable entity which describes the complete history of a telephone call.

In a specific embodiment, a Playback Server (PBServer) (not shown) is a sub-component within the Audio Recorder module which uses call records to retrieve and play back telephone calls. Each recorder has its own PBServer, which is connected to a Player module (not shown) on the User Workstation 160. The Player module generally contains a Stream Control Manager module, which enables the Player module to use the PBServers to play back a telephone call which has several different participants and thus may have portions of the call stored on different recorders.

CTI Server

Still with reference to FIG. 1, when a call comes into the PBX system, both SMDR and real-time CTI data are generated by the PBX, and supplied to the recording system via the SMDR and CTI links. In accordance with the present invention, these two types of data are integrated by the CTI Server into a common format.

As known in the art, CTI (Computer Telephony Integration) supplements the recorded audio data in several important ways. CTI data is provided through a data communications link from specific telephone switching equipment located at the customer site. Supplied data comprises such items as the telephone numbers of involved parties, caller ID/ANI information, DNIS information, and agent ID numbers. ANI is Automatic Number Identification, a signaling method that identifies the telephone number of the calling party; the method is typically used by large-scale commercial call centers. DNIS is Dialed Number Identification Service, a feature that identifies the original "dialed digits," and that is commonly used in large-scale commercial call centers when multiple directory numbers are routed to the same receiving trunk group. In accordance with the present invention, the CTI server performs the task of analyzing and reorganizing data from both the real-time (CTI) and SMDR (asynchronous) links, and passing the results onwards into the recording system for further processing.

The design of the system of the preferred embodiment envisions that there will be a number of CTI translation modules 165 to accommodate a variety of possible input sources such as "native" PBX interfaces, CTI "middleware" vendors, ISDN data channel interfaces, etc. The system design incorporates flexibility in the manner in which CTI information is collected, making the system prepared to integrate with CTI links that may already exist at a customer site. The CTI Server of the preferred embodiment is capable of simultaneously monitoring both an SMDR link and a real-time CTI link, gathering information about calls from both sources, and combining that information into a single data model of the telephony activity within the call center.

The CTI Server is responsible for supplying certain metadata regarding telephony events to the Voice Server's Call Record Generator 150. This metadata, such as called party and calling party numbers, trunk and channel ID, date and time, agent ID, etc., is combined by the Call Record Generator along with the other metadata, and data that is provided by the Audio Recorder 145 itself. Using this information, other components within the system are able to search for calls using a wide variety of useful and meaningful criteria, rather than simply using the recorder channel, date and time. As is known to those skilled in the art, an "event" is simply an action or occurrence detected by a computer program. The Call Record Generator 150 integrates that data into a single call record, which is updated after every event during the call, so that at the end of the call, the call's entire history is contained in the call record. The CRG matches the call record to the recording segments created by the Audio Recorders. The CRG integrates the call record with the metadata for the associated recordings of the phone call to generate a Master Call Record. When an operator wants to hear a recorded phone call, he uses the User Workstation (preferably equipped with a graphical user interface) to recall and play back the recorded call. Since the phone call may have had several different participants, pieces of the call may have been recorded on different recorders, each of which is associated with a different Playback Server. The system is nevertheless capable of playing back the entire phone call in the proper sequence.

In a preferred embodiment the CTI Server obtains the information regarding telephony events from various telephone switching environments, including PBXs, ACDs, and turret systems, which may have a wide variety of proprietary CTI interfaces. A telephone switching environment is a local telephone system that provides for routing of calls on a static or dynamic basis between specific destinations; the system is capable of identifying of when calls occur and who is involved in the calls. The CTI Server converts the information received into a common "normalized" format that is a simplified subset of the types of information available across the different vendors' PBXs, ACDs, and turret systems. This data conversion is partially facilitated by products such as Dialogic's CT-Connect API, which is capable of processing CTI messages from the major vendor's switches such as the Lucent DEFINITY G3, Nortel Meridian and DMS-100, Aspect, Rolm 9751, Rockwell Spectrum and Galaxy, Siemens Hicom, and Intecom. However, in accordance with the preferred embodiment an additional software layer exists within the CTI Server to further filter and normalize the CTI information. This feature also allows for a separate point of integration with customized software interfaces that may be necessary to connect with other switch vendors, especially certain turret systems that are not supported by Dialogic's CT-Connect (CTC) product. Alternate embodiments of the translation module use Lucent CentreVu Computer Telephony Server for Windows NT, or Genesys T-Server, as middleware instead of Dialogic CT-Connect. Additional alternate embodiments include direct "native" interfaces to a particular telephone switch, such as Aspect, without an interposing middleware product.

In terms of the CTI messages exchanged between the CTI Server and the various PBXs, ACDs, and turret systems, in accordance with a preferred embodiment the CTI Server is a "passive listener." That is, the CTI Server will monitor and receive information about call activity, but it will not send messages to affect, control, or redirect the calls. Using an "active" CTI server is also contemplated in specific embodiments.

Whereas the focal point of a Voice Server is recording content (e.g., audio clips), the metadata generated by the CTI Server is focused on describing the facts pertinent to the start and end points of each participant's involvement within a call. In other words, within the system of the preferred embodiment, recording is managed in a call-centric (rather than event-centric) fashion. This corresponds with the typical caller's point of view, in which a call is the entire conversation with a business entity, even if the conversation involves transfers to other agents or conferencing of multiple parties. The CTI Server generates events with metadata for the start and end points of the various recording segments of a complex conversation. These event records are interrelated by ID numbers and reason codes (see FIG. 3) so that the entire sequence of events for a complex conversation can be reconstructed by a browser application, preferably implemented on the User Workstation 160.

In accordance with the preferred embodiment, there can be one or more CTI Servers within the system of the subject system, as needed to process the traffic load of CTI information generated by multiple PBXs, ACDs, and turret systems. In a specific embodiment, a single CTI Server may be configured so as to connect with several PBXs, ACDs, and turret systems, depending upon the traffic load and physical connectivity requirements. In alternate embodiments, different CTI servers can be attached to different input sources. Generally, the number of CTI Servers within the system does not have a direct relationship with the number of Voice Servers. The telephony events generated by a CTI Server are individually filtered and re-transmitted to the appropriate Voice Server based upon configuration data for the system as a whole (managed by the Central Database Server), which maps the recording locations (extension number, or trunk & channel ID) with the Voice Server name and recording input port (channel).

During the active lifetime of a call, real-time information is accumulated within a historical call record that tracks each participant within the call. Each participant record includes descriptive fields for telephone numbers, agent ID numbers, time ranges, and reason codes for joining and leaving the conversation. At certain key points during the accumulation of data, whenever a party joins or leaves the conversation, the call record is transmitted onward to allow the rest of the recording system to process the information accumulated thus far. Upon the conclusion of the call, the CTI server retains a copy of the call record for a configurable time interval before discarding it from memory. This delay is intended to allow for the arrival of the SMDR data.

Upon receiving SMDR data, the CTI server searches its memory for a call record pertaining to the same logical telephone call that would have been accumulated from previous real-time messages. Matching this information is not a trivial task, since the SMDR link and real-time CTI link do not share a common reference ID number for use by their messages in describing the occurrence of the telephone call.

Therefore the software of the preferred embodiment must use other "clues" to guide the matching process, by comparison on a combination of other data fields that exists in common between the SMDR and real-time CTI data. These data fields include: (1) the telephone number of the first external party involved in the call; (2) the telephone number of the first internal party involved in the call; (3) the direction of the call (e.g., inbound, outbound); (4) the start time of the call, in hours and minutes; and (5) the duration, in seconds, of the call.

Once again, the matching process is not trivial because the SMDR link gives the starting time of the call only in hours and minutes, whereas the starting time given by the real-time link also includes seconds. It is quite possible that more than one call could be started and stopped within a single minute. This would result in an ambiguous match, if not combined with other search fields. The same argument holds true for each of the other fields upon which a match can be performed. No single field alone will provide an unambiguous matching of the records. Even in combination, it is conceivable (although statistically unlikely) that an ambiguous case could occur: if the same two parties were to call each other twice within the span of a minute, and each call was roughly the same length in seconds. The odds of such a problem are increased if a large number of calls are routed through a common entry point into the call center, as would be the case if the first internal party involved in the call is a shared Voice Response Unit (VRU) or Automatic Call Distribution (ACD) queue. In addition, if information about the external party's number is missing due to limitations of the PSTN or incoming trunk configuration, matching the call records becomes even more problematic.

Adding to these difficulties is the fact that clock-time values reported by the SMDR link and the real-time CTI link may not be perfectly in synchronization with each other. Therefore, the preferred embodiment comprises a mechanism in which an imperfect match of times can be tolerated, while still retaining an acceptable level of reliability in matching the call records.

Because these various factors require a degree of flexibility in the matching algorithm, the preferred embodiment incorporates a weighted formula that is applied to potential match candidates. The formula yields a numerical confidence factor that can be used to select the best apparent match candidate. For each of the "clues," a test is conducted to determine the quality of matching on that data field. This matching quality is rated as a percentage. Certain fields, such as time values, are allowed to vary within a configurable tolerance range, whereas other fields are required to match exactly or not at all. After the matching quality of a field has been determined, it is multiplied by an importance factor that applies a relative weight to each of the various fields that can be examined during matching. The final confidence factor is the summation of these calculations:

$$\text{Confidence Factor} = \Sigma_i ((\text{Match Quality})_i * (\text{Weighting Factor})_i)$$

In order to account for the fact that characteristics of the call traffic may vary significantly between individual call centers, the tolerance factors (e.g., for time value offsets) and the weighting factors are re-configurable. There is also a re-configurable minimum level for confidence factors, below which the match candidate will always be rejected.

For those fields, such as time or duration, where an imprecise match may be allowed, the configuration data will define an allowable variance range (plus or minus a certain number of seconds). Values that do not match exactly, but fall within the variance range, are rated with match quality expressed in percentage that is measured by one minus the ratio of the difference from the expected value versus the maximum variance.

$$\text{Match Quality} = 1 - (\text{abs}(\text{ExpectedValue} - \text{ActualValue})/\text{MaximumVariance})$$

Values outside the variance range are rated as a match quality of zero. This produces a linearly scaled match quality. Alternate embodiments may use other distributions (e.g., standard deviation "bell curves") to produce a non-linear scale for the match quality. Where an exact match is required for a field, the match quality is either 100% or zero.

Example Real-time CTI events report a telephone call from an unknown external party missing or deliberately suppressed ANI/CLID information) to an internal party at extension 1234, starting at 12:25:03 and lasting for 17 seconds (CLID is Calling Line Identification, a signaling method that identifies the telephone number of the calling party; the method is typically used by residential subscribers and small businesses). Two SMDR records arrive which could possibly match with this call. The first record indicates an inbound call received by extension 1234 at 12:26 and lasting 26 seconds. The second record indicates an inbound call received by extension 1234 at 12:27 and lasting 20 seconds. The system is configured with a variance range of plus or minus 3 minutes for the start time, and plus or minus 10 seconds for the duration.

Weighting Factors are:
  20 External Party Telephone Number
  40 Internal Party Telephone Number
  30 Direction
  20 Start Time
  20 Duration Confidence Factors are therefore calculated as follows:

$$CF_1 = (20*1.00) = (40*1.00) + (30*1.00) + (20*(1-\tfrac{1}{3})) + (20*(1-\tfrac{9}{10})) = 105\ \tfrac{1}{3}$$

$$CF_2 = (20*1.00) + (40*1.00) + (30*1.00) + (20*(1-\tfrac{2}{3})) + (20*(1-\tfrac{3}{10})) = 110\ \tfrac{2}{3}$$

The system will therefore match the CTI events with the second SMDR record.

After a match has been selected, the trunk channel information (and any other useful information that can supplement the previously gathered real-time CTI data) is extracted from the SMDR data and added to the call record within the CTI server's data model of telephony activity. Then the updated call record is transmitted onward to allow the rest of the recording system to process it. With the trunk channel information at hand, the recording system is able to associate the enhanced logical search information with the physical voice recording, and take whatever actions may have been dependent upon this information, such as selectively recording or discarding the call.

Figure 2:
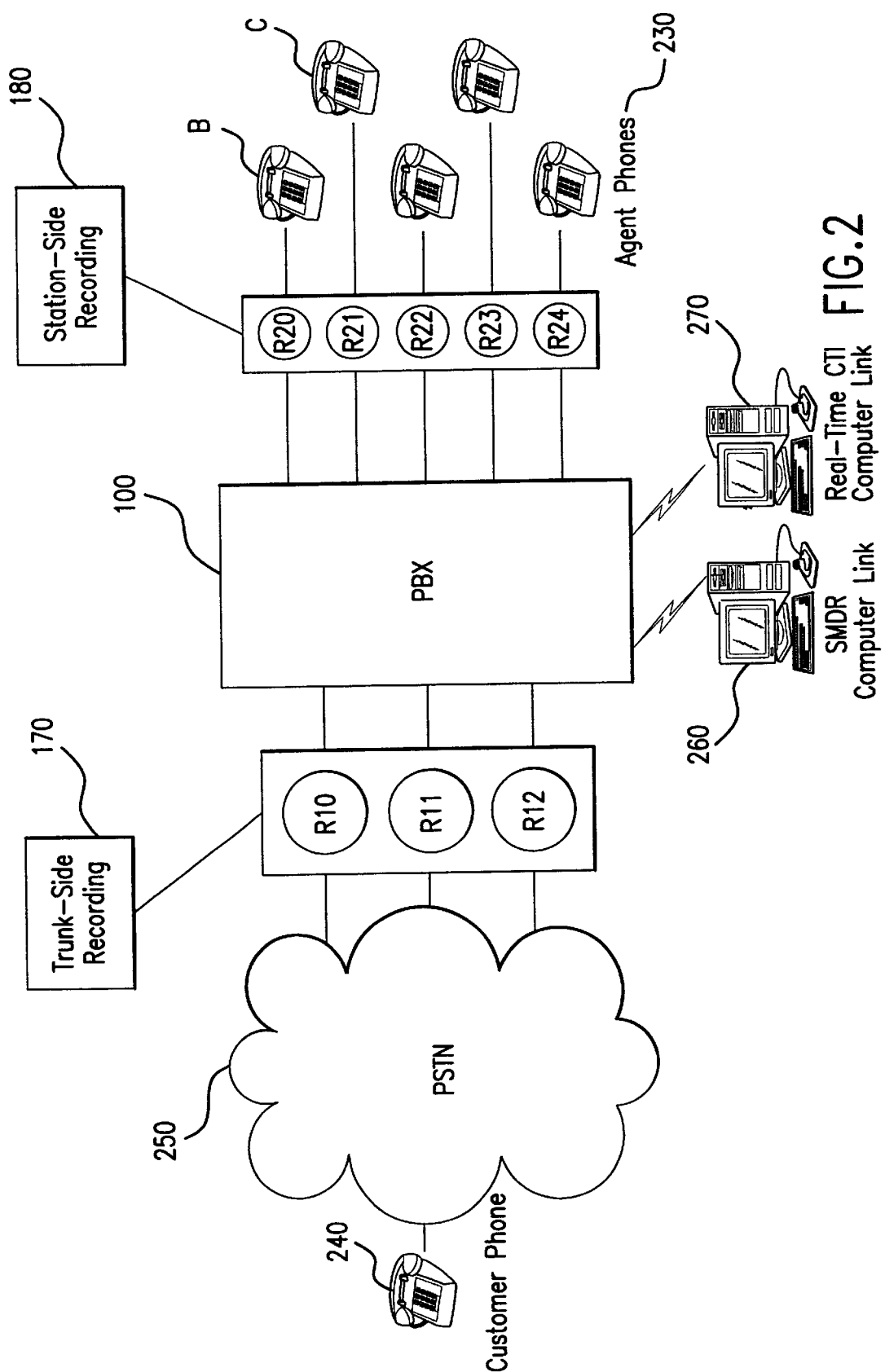
FIG. 2 illustrates the difference between trunk-side and station-side recording.

FIG. 2 is an illustration of the difference between trunk-side and station-side recording at a call center with agents. With suitable equipment for tapping into a voice communications line, a recording unit can intercept telephone call traffic using either of these two methods. By attaching wires for recording channels 180 on each extension within a call center, the traffic can be intercepted and recorded as it passes between the PBX 100 and the agent telephone sets 230. This first method is known as "station-side" recording. Alternatively, by attaching equipment 170 on the trunk lines between the PBX and Public Switched Telephone Network (PSTN) 250, the traffic can be intercepted at its point of entry into the call center before the calls are dispatched by the PBX. This second method is known as "trunk-side" recording. Since businesses usually have more agent telephone sets than trunk lines, a "trunk-side" solution is likely to require less recording equipment and thus be less expensive. Another significant point for consideration is that "trunk-side" provides access only to external inbound or outbound calls, which are those typically involving customers of a business, whereas "station-side" also provides access to internal calls between agents (which may or may not relate to an external customer's transaction).

A third type of recording interface is Service Observance 185 (see FIG. 1), which is physically wired in manner like station-side recording, but using separated dedicated lines to a recording input channel rather than being interposed between a PBX and telephone set. In this mode of operation, the Recorder joins into a telephone call as a silent conference participant using the PBX Service Observance feature (originally intended to enable a supervisor to directly monitor an employee's telephone calls upon demand). This differs from ordinary station-side recording in that the internal party being recorded on a given input channel can vary upon demand rather than being fixed by the wiring pattern.

Figure 3:
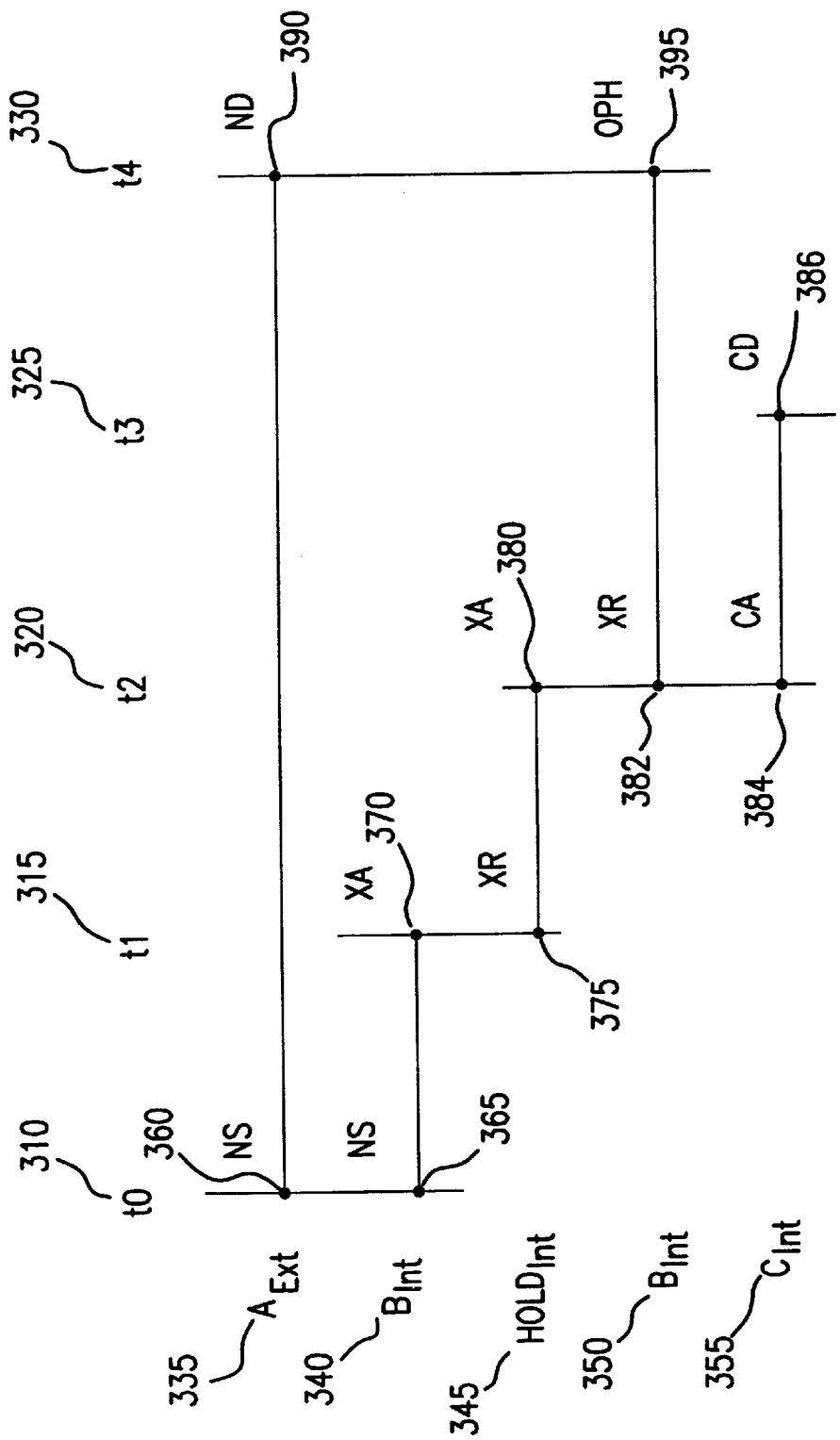
FIG. 3 shows a line-chart that illustrates various parties involved in a complex call.

FIG. 3 shows a line-chart that illustrates various parties involved in a complex call. A is the customer phone number, and B and C are the agent phone numbers located behind recording channels R20 and R21 respectively (see FIG. 2).

Initially, the call comes in from line A 335 to line B 340. A real-time CTI message occurs describing that phone B is ringing, but not yet answered. B answers the phone 365 at time t0 310. The "NS" at 360 indicates the normal start of a phone call. A real-time CTI message occurs describing the start of the call between A and B. The telephony model is updated to reflect the fact that the call between the initial 2 participants (A and B) started normally at time t0 310. A copy of the call record is then sent onward to the rest of the recording system. The call record is retained within the telephony model, associated with device (or line) B. At time t1 315, B places the call on hold 370 (the "XA" at 370 indicates that the call was transferred away from B; the "XR" at 375 indicates that the transfer was received by HOLD). A real time CTI message occurs describing that B placed the call on hold. The telephony model is updated to reflect that B transferred the call to HOLD 345 at time t1 315. (This information is accumulated with the information previously gathered at t0 310). A copy of the call record is then sent onward to the rest of the recording system. The call record is removed from device B within the telephony model, but kept in a list of held calls.

At time t2 320, B returns to the call 380 and conferences in C 355 (the "XA" at 380 indicates that the call was transferred away from HOLD; the "XR" at 382 indicates that the transfer was received by B; the "CA" at 384 indicates that C was added as a conference participant). A real-time CTI message occurs describing that B returned to the call and invited C by conferencing. The call record is moved within the telephony model from the list of held calls back to device B. The telephony model is updated to reflect that HOLD 345 transferred the call 380 back to B at t2 320. (Note that information is accumulated with the information previously gathered at t0 310 and t1 315). A copy of the call record is then sent onward to the rest of the recording system. The telephony model is updated to reflect that C joined the call 384 as a conference participant at t2. (This information continues to be accumulated with previously gathered information). A copy of the call record is then sent onward to the rest of the recording system. The call record is retained with both devices B and C within the telephony model.

At time t3 325, a real-time CTI message occurs describing that C dropped out 386 of the call (the "CD" at 386 indicates that C was dropped from the conference). The telephony model is updated to reflect that C dropped out of the conference at t3. (This information continues to be accumulated with previously gathered information). A copy of the call record is sent onward to the rest of the recording system. The call record is removed from device C within the telephony model, but retained with device B.

At time t4 330, A terminates the call to B. A real-time CTI message occurs describing that A terminated the call (The "ND" at 390 indicates that a normal drop of the call occurred; the "OPH" at 395 indicates that the other party hung up). The telephony model is updated to reflect that A stopped normally and B stopped because the other party hung up at t4. (This information continues to be accumulated with previously gathered information). A copy of the call record is then sent onward to the rest of the recording system. The call record is then removed from device B, but kept in a list of completed calls. An SMDR message is received which summarizes the call in its entirety. The list of completed calls is searched to find a match, and the appropriate call record is retrieved. The call record is updated with the trunk channel information from the SMDR message. A copy of the call record is sent onward to the rest of the recording system. The call record is removed from the list of completed calls.

Figure 4:
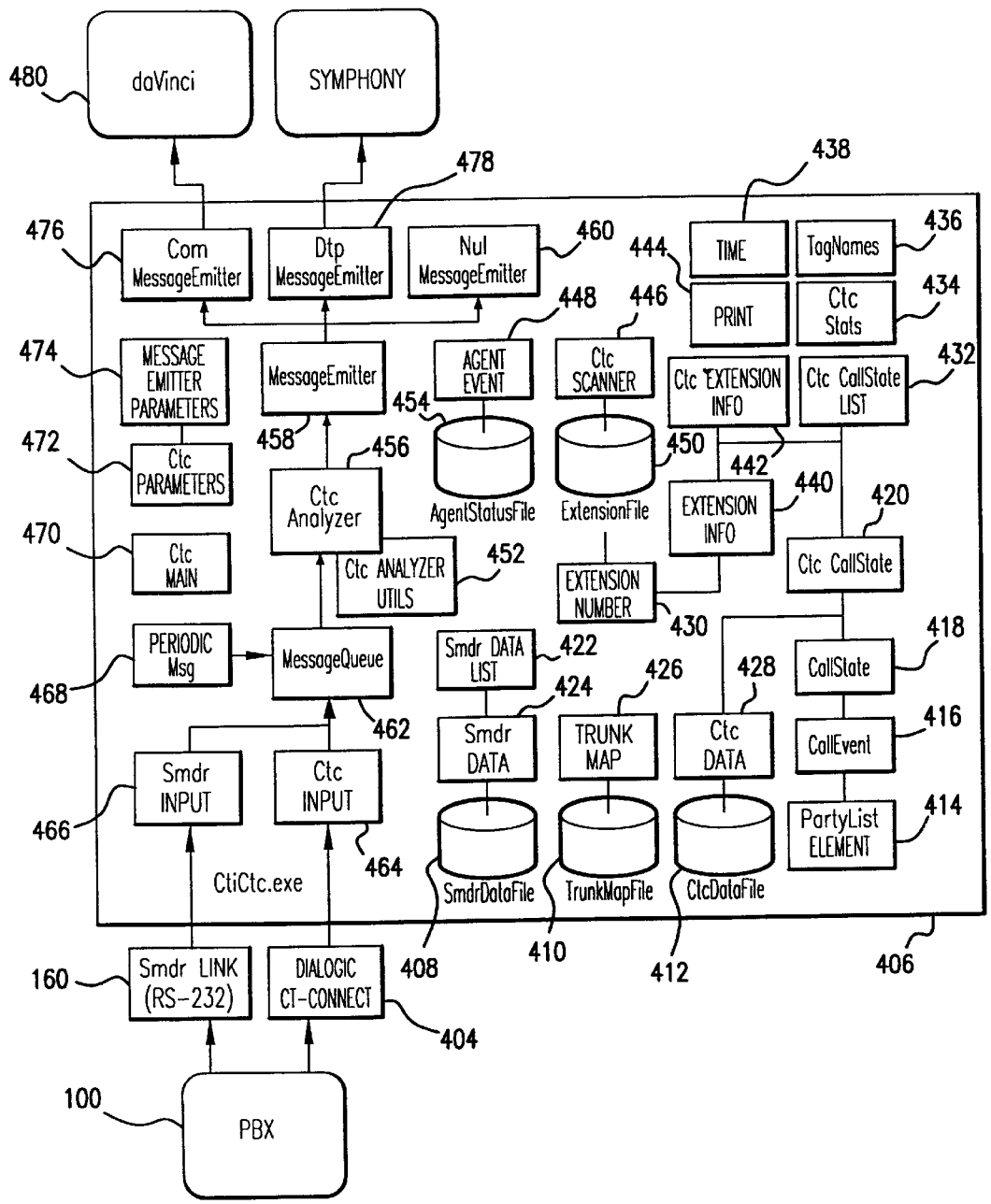
FIG. 4 shows a schematic block diagram of a preferred embodiment for translating, summarizing and normalizing signals received from both an SMDR link and a Dialogic CT-Connect CTI service.

FIG. 4 shows a schematic block diagram of a preferred embodiment for translating, summarizing and normalizing signals received from both an SMDR link and a Dialogic CT-Connect CTI unit. In the embodiment illustrated in FIG. 4, the recording system of the subject system is represented by daVinci™, a new generation recording system of Dictaphone Corp. Alternatively (or simultaneously), Dictaphone's Symphony™ CTI software can be used, in conjunction with Dictaphone's ProLog™ recording system (the system preceding daVinci™). Hereinafter, the translation/summarization module of the preferred embodiment illustrated in FIG. 4 will be referred to as CtiCtc.exe.

The module CtiCtc.exe is itself comprised of a plurality of modules, as shown in FIG. 4. A CtiAgentEvent module 448 is comprised of a data structure for agent log-on and log-off messages. A CtiAgentStatusFile module 454 manages a file that tracks agents currently logged on. A CtiCallEvent module 416 is comprised of a data structure for a call record (i.e., normalized and summarized CTI events). A CtiCallState module 418 is comprised of a generic data structure to represent the state of telephony activity at a particular location (extension, hold area, etc.). A CtiComMessageEmitter module 476 comprises a layer that converts the stream of CtiCallEvent objects (generated by a CtiCtcAnalyzer 456) into a format that can be sent to other da Vinci system components. A CtiCtcAnalyzer module 456 comprises a processing engine which examines CTC and SMDR messages and keeps track of a state machine for the activity on each extension. The CtiCtcAnalayzer module performs normalization of the CTC and SMDR data.

A CtiCtcAnalyzerUtils module 452 comprises a collection of utility subroutines that assist in examining the CTC and SMDR messages. A CtiCtcCallState module 420 comprises a data structure that represents the state of telephony activity at a particular location (extension, hold area, etc.) including CTC-specific information. A CtiCtcCallStateList module 432 manages an open-ended collection of CtiCtcCallState objects. This collection of objects is typically used to track calls that are "held" or "bumped." A CtiCtcData module 428 comprises a data structure wrapped around the raw CTC data, with the addition of a time stamp indicating when a message arrives. A CtiCtcDataFile module 412 manages a file of CtiCtcData objects that can be captured or displayed. A CtiCtcExtensionlnfo module 442 manages a collection of CtiCtcCallState objects, with one object for each extension.

A CtiCtcInput module 464 comprises an input source engine that obtains incoming CtiCtcData objects, either from a "live" server or from a playback file. A CtiCtcMain module comprises the main ( ) function for CtiCtc.exe. The main( ) function handles command line and registry parameters, along with other start-up processing. A CtiCtcParameters module 472 comprises data structure and program logic for managing the configuration parameters in the Windows NT registry. A CtiCtcScanner module 446 comprises a utility module for building a list of all available extensions on a particular telephone switch. A CtiCtcStats module 434 comprises a data structure for compiling statistics on the number of CTC, SMDR, and CTI messages. A CtiDtpField module (not shown) is used by a CtiDtpMessageEmitter module 478, and comprises a data structure for an individual field in the Dictaphone Telephony Protocol ("DTP"), used to communicate with other Symphony CTI system components. A CtiDtpMessage module (not shown) is used by a CtiDtpMessageEmitter module 478, and comprises a data structure for a complete message in the DTP to be sent onwards to the Symphony CTI system.

A CtiDtpMessageEmitter module 478 comprises a layer that converts the stream of CtiCallEvent objects (generated by CtiCtcAnalyzer 456) into a format that can be sent to the Symphony CTI recording platform. A CtiDtpSocketSrv module (not shown) manages the TCP/IP connection through which messages for DTP are sent to the Symphony CTI platform. A CtiDtpUtility module (not shown) comprises a collection of utility routines that assist in examining and processing DTP messages. A CtiExtensionFile module 450 manages the configuration file that lists all available telephone extensions. A CtiExtensionInfo module 440 manages a collection of CtiCallState objects, with one object for each extension. A CtiExtensionNumber module 430 comprises an abstraction of an individual extension number as either a numerical or string value, so that changes to this model will not have a global impact in CtiCtc.exe.

A CtiMessageEmitter module 458 comprises an abstract layer that converts the stream of CtiCallEvent objects (generated by CtiCtcAnalyzer 456) into a format that can be sent to various target platforms, including the da Vinci and SymphonyCTI systems. A CtiMessageEmitterParameters module 474 comprises a data structure and program logic for managing configuration parameters that relate only to the message emitter(s). A CtiMessageQueue module 462 comprises shared memory for transferring data between threads. As is known to those skilled in the art, a "thread" is a part of a program that can execute independently of other parts. A CtiNulMessageEmitter module 460 comprises a layer that accepts the stream of CtiCallEvent objects (generated by CtiCtcAnalyzer 456) and discards them instead of sending them to a target platform. Typically this layer is used only when debugging CtiCtc.exe, or to capture a sample file of CTI events from a PBX without sending them to the da Vinci or SymphonyCTI systems. A CtiPartyListElement module 414 comprises a sub-component of the CtiCallEvent data structure 416. The module 414 tracks information about an individual participant (e.g., caller, recipient) in a call.

A CtiPeriodicMsg module 468 comprises a generic handler for sending timer-based housekeeping messages. A CtiPrint module 444 comprises a layer that manages console output and conditional trace messages. A CtiSmdrData module 424 comprises a data structure wrapped around the raw SMDR data, with the addition of a time stamp indicating when a message arrives. A CtiSmdrDataFile module 408 manages a file of CtiSmdrData objects that can be captured or replayed. A CtiSmdrDataList module 422 manages an open-ended collection of CtiSmdrData objects. This is typically used to buffer SMDR records that have not been paired with CTC records. A CtiSmdrInput module 466 comprises an input source engine that obtains incoming CtiSmdrData objects, either from a "live" server or from a playback file.

A CtiTagNames module 436 comprises a utility module that converts number values to descriptive strings for debugging and tracing purposes. A CtiTime module 438 comprises a utility module that converts time values to UTC for internal storage and conditionally prints times in either the UTC or local time zone. A CtiTrunkMap module 426 comprises a data structure that describes a mapping between logical trunks and logical trunk groups, into physical trunks and TDM timeslots. A CtiTrunkMapFile module 410 manages a configuration file that contains the CtiTrunkMap information.

Figure 5:
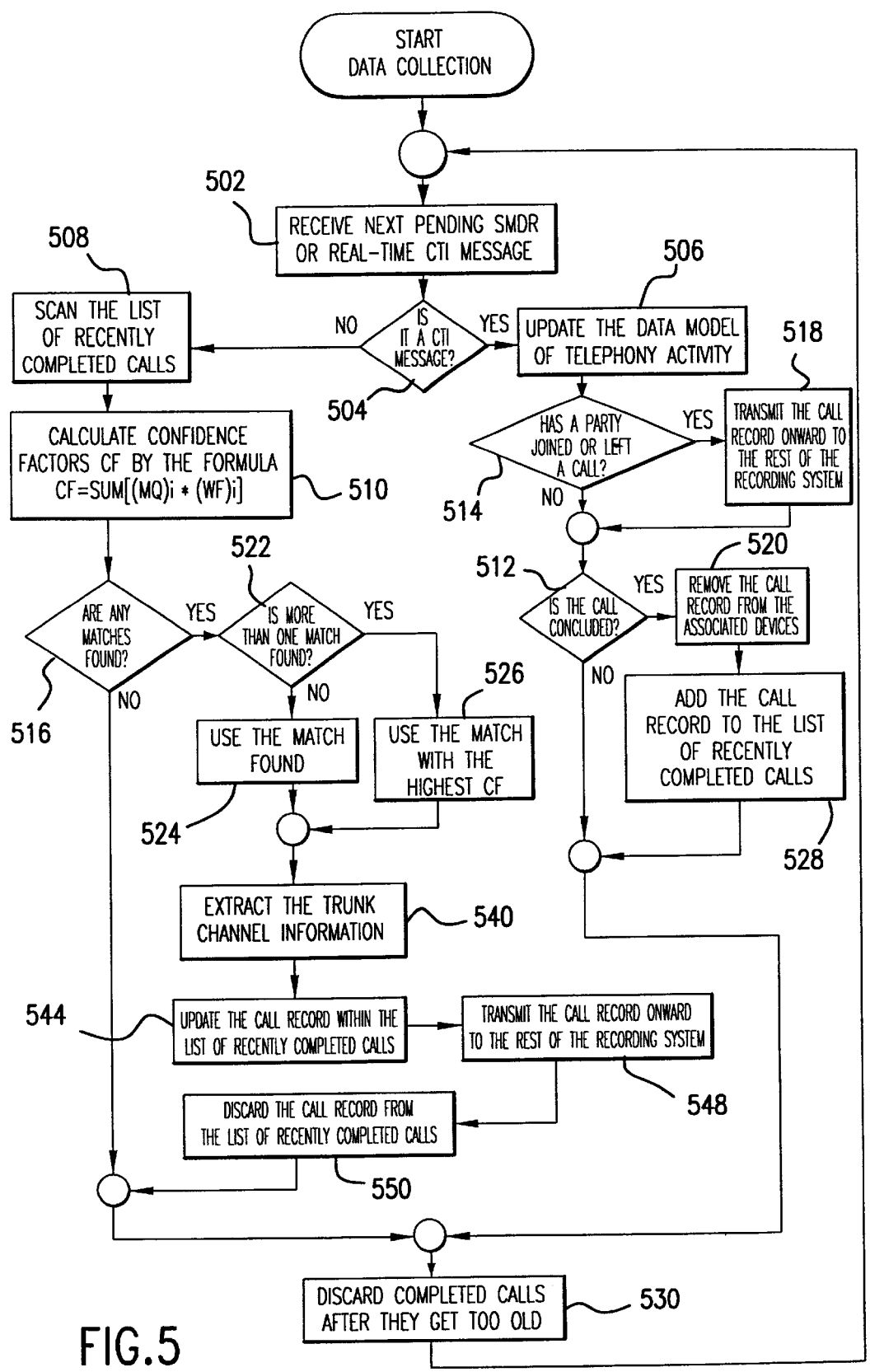
FIG. 5 illustrates the steps by which the translation module CtiCtc.exe integrates the data received from the CTI and SMDR links.

FIG. 5 illustrates the steps by which the translation module CtiCtc.exe integrates the data received from the CTI and SMDR links. Initially, at step 502, the translation module receives a message from the SMDR link or from the CTI link. If the message is determined, at step 504, to be a CTI message, the current data model of telephony activity is updated at step 506. If the translation module determines at step 514 that the CTI message indicates a party joined or left the call, the call record is at step 518 transmitted onward to the rest of the recording system before continuing to step 512. Otherwise, no message is transmitted onward to the rest of the recording system and processing continues directly to step 512. If the translation module determines at step 512 that the CTI message indicates that the call has been concluded, at step 520 the module removes the call record from the associated devices. The translation module then adds the call record to the list of recently completed calls at step 528. Completed calls are discarded (step 530) after they get too old (i.e., after a predetermined number of recorded calls, or a given time period after the original recording of the call). Processing then continues again from step 502 by receiving the next incoming message. If at step 512 the call has not been concluded, the completed calls are discarded (step 530) after they get too old. Processing then continues again from step 502 by receiving the next incoming message.

If at step 504 the message is an SMDR message, the translation module at step 508 scans the list of recently completed calls. At step 510 the translation module calculates confidence factors for the recently completed calls by using the formula:

$$\text{Confidence Factor} = \Sigma_i ((\text{Match Quality})_i * (\text{Weighting Factor})_i)$$

If any matches are found (step 516), and more than one match is found (step 522), the match with the highest confidence factor is used (step 526). If only one match is found, that match is used (step 524). At step 540, the trunk channel information is extracted, and at step 544 the call record is updated within the list of recently completed calls. The call record is transmitted at step 548 to the rest of the recording system. At step 550 the call record is discarded from the list of recently completed calls. Cpleted call are discarded (step 530) after they get too old. If no matches were found at step 516, the completed calls are discarded (step 530) after they get too old. Processing then continues again from step 502 by receiving the next incoming message.

Figure 6:
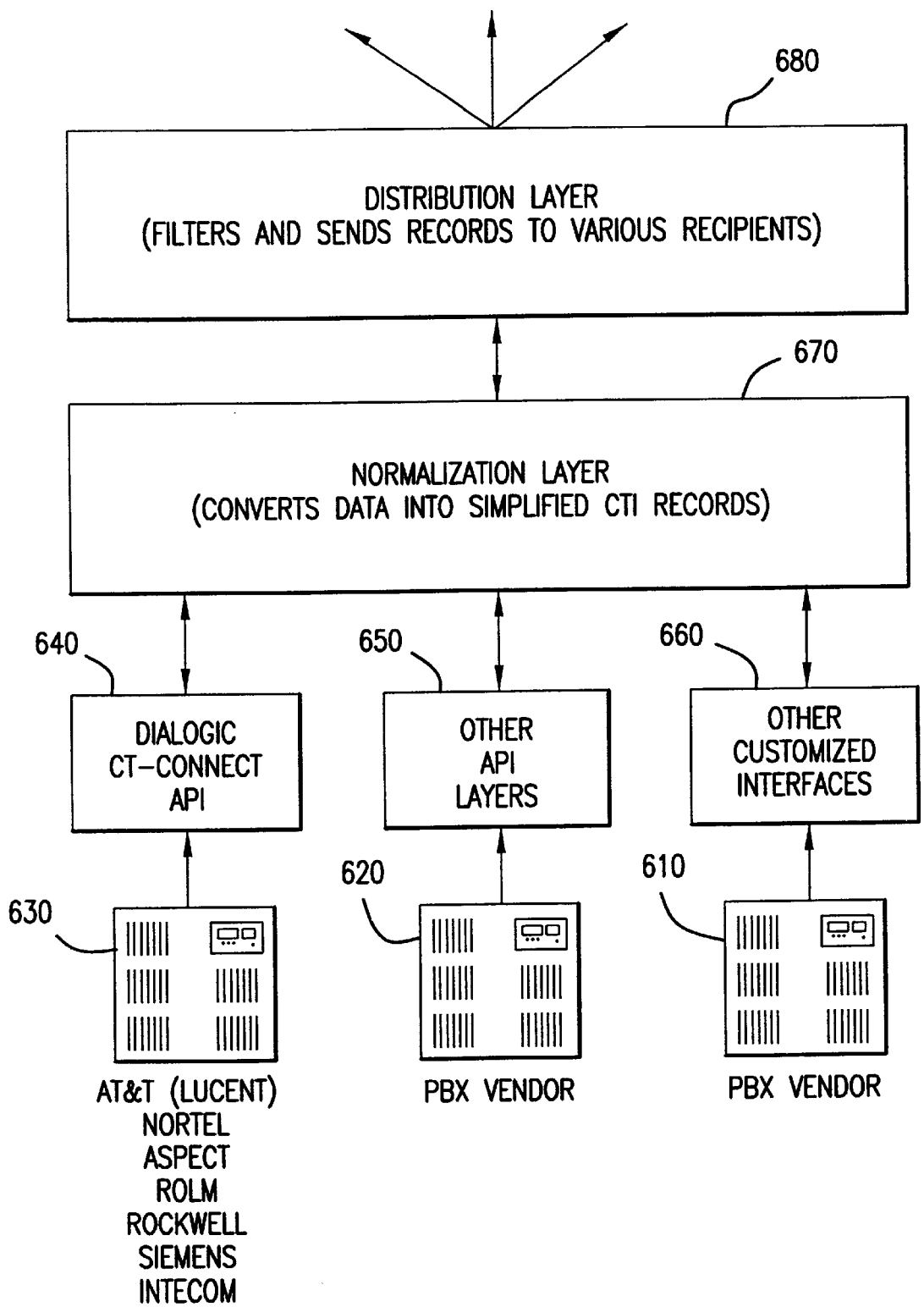
FIG. 6 illustrates how the CTI Server can be viewed as a set of logically distinct layers that deal with translating and distributing CTI events.

As shown in FIG. 6, the CTI Server can be viewed as a set of logically distinct layers that deal with translating and distributing CTI events. Starting from the bottom of the picture, CTI events flow from a PBX in its proprietary format to Dialogic CT-Connect middleware 640 another API layer 650 or custom interface layer 660 that each provide partial normalization of the data. This helps to reduce the complexity of the "translation" job, since there are fewer APIs than individual PBX types. But since one object of the subject system is to retain the flexibility to integrate with a variety of third-party CTI vendors (e.g., Dialogic, Genesys, etc.) there is another layer 670 above the API or custom interface layer to complete the job of "translation." The final result after passing through this "normalization" layer is that all of the CTI events are in a single, common, integrated data format.

Once the CTI events have been converted to a normalized format, the CTI Server can address its other mission of distributing (routing) the messages. The distribution layer 680 examines each message to determine what other recording system components need to receive it, and then sends a copy of the event to the appropriate destination(s).

This logical separation of responsibilities used in a preferred embodiment simplifies the programming required to implement the subject system. Translation modules do not need to know anything about other recording system components, and they can focus on dealing with a single specific PBX or vendor API layer. Likewise, the distribution module will not need to know anything about specific PBX or vendor API layers, and it can focus on making routing decisions and communicating with the rest of the recording system.

Figure 7:
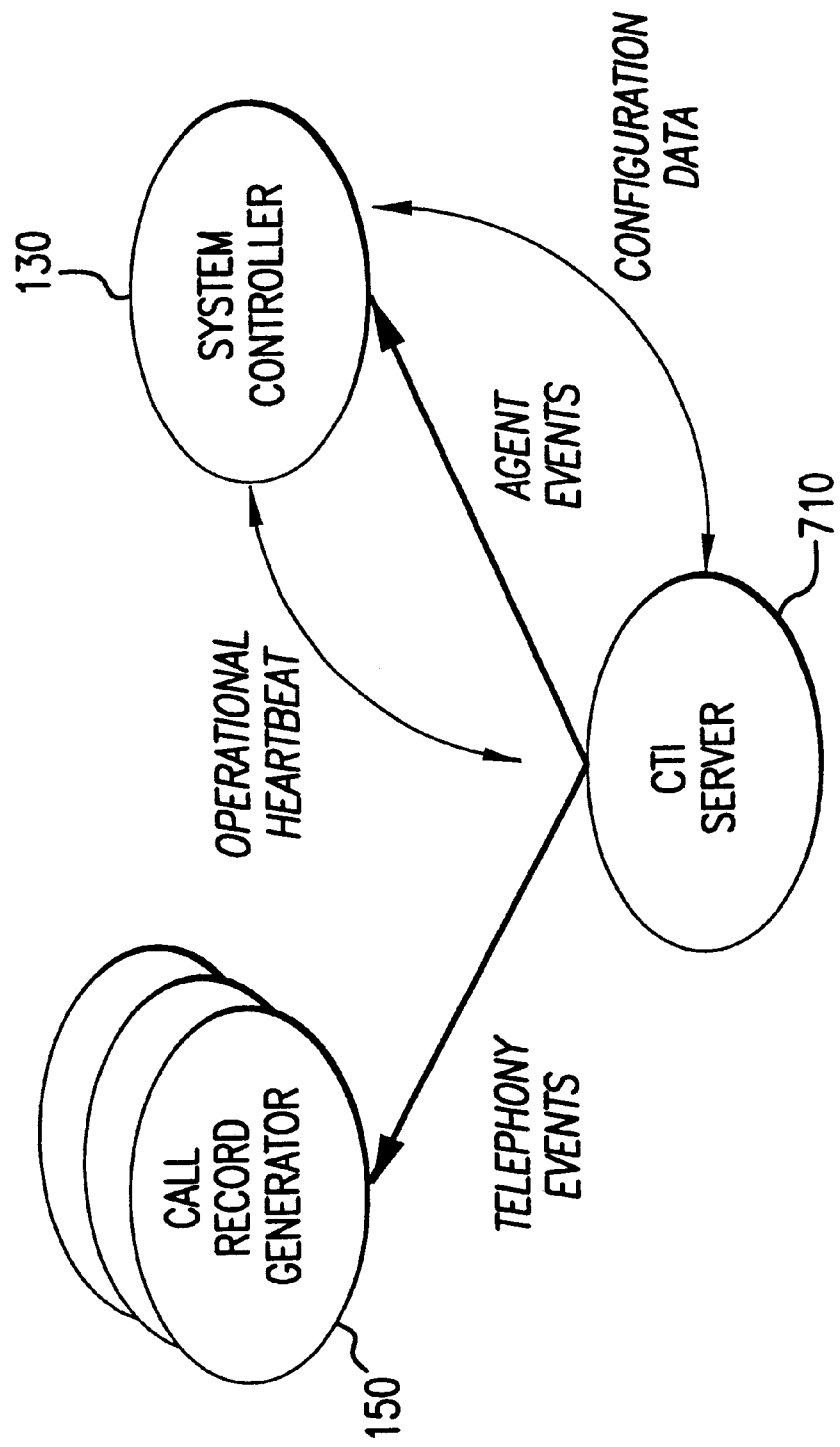
FIG. 7 illustrates how, in addition to telephony events, the CTI Server 710 is responsible for supplying certain metadata regarding agent events to the System Controller 130.

FIG. 7 illustrates how, in addition to telephony events, the CTI Server 710 used in accordance with the present invention is responsible for supplying certain metadata regarding agent events to the System Controller, which is part of the Scheduling & Control Services 130 shown in FIG. 1. This information, which generally includes agent ID, extension number, logon and logoff time, etc., is obtained when available from the various PBXs, ACDs, and turret systems. The agent events delivered to the System Controller 130 enable a map to be maintained of the extension number(s) where a real person can be found, at a given date and time. This information enables a browser application to intelligently associate some of the previously recorded calls even if a person was using different telephone sets according to a 'free seating' plan. The CTI Server 710 also keeps a local cache of the agent information, so that agent information can be included when sending the telephony events to the Call Record Generator 150.

Figure 8:
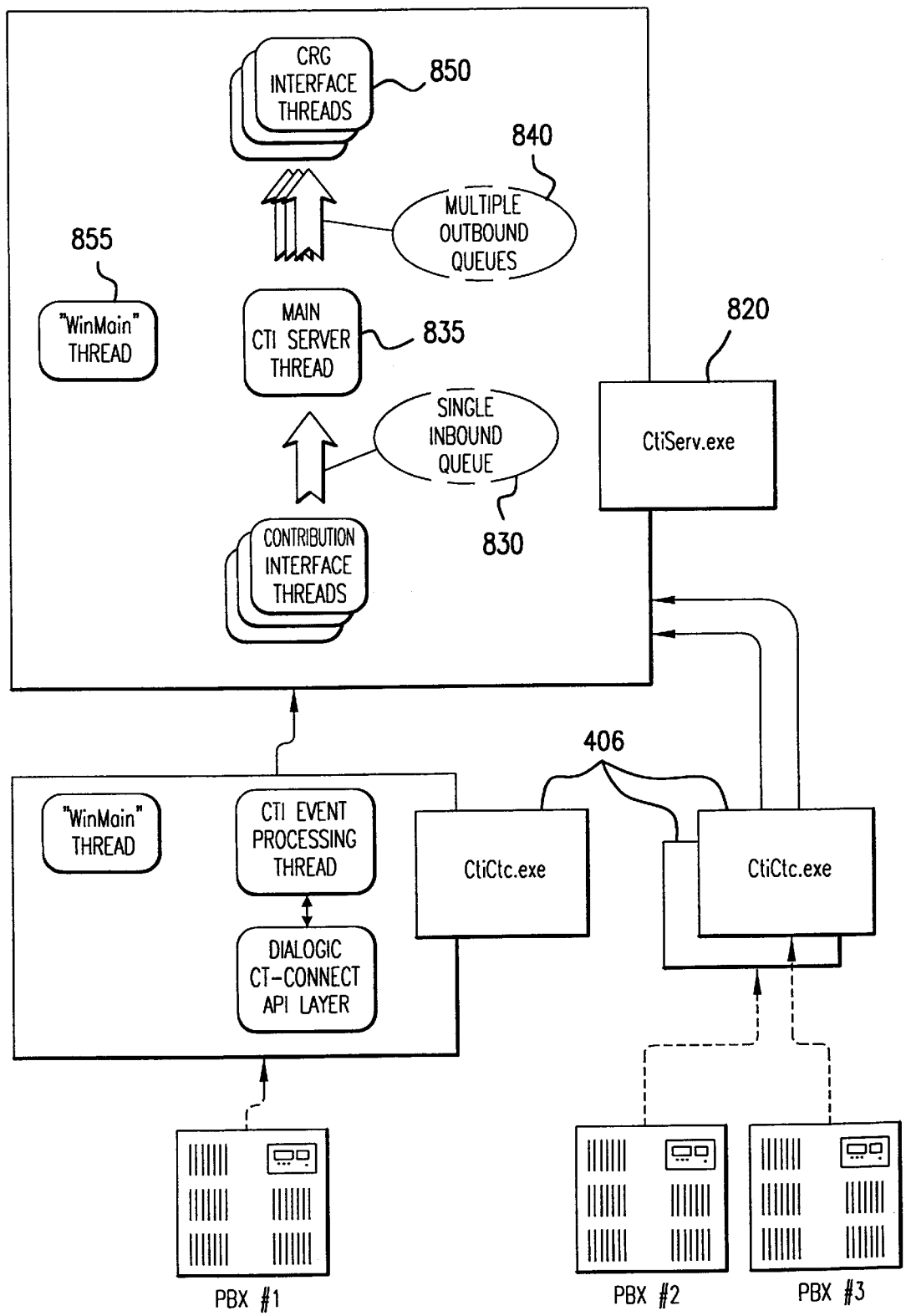
FIG. 8 shows the layout of the CTI Server.

The physical layout of the CTI Server used in a specific embodiment is shown in FIG. 8. With reference to FIG. 1, the translation modules are implemented by separate programs, such as CtiCtc.exe 406, which encapsulate the details on converting a specific PBX interface or vendor API layer into a normalized format. The distribution module is preferably implemented by a single program, CtiServ.exe 820, which includes the main processing and routing logic for the CTI Server.

As noted, the translation modules of the CTI Server convert proprietary-format CTI information into a normalized format. In accordance with a preferred embodiment, this is done in several layers within the program. The information is first converted by Dialogic's CT-Connect software into the CTC-API format, and then the conversion to the generic format used by the other components of the recording system is completed by the translation module CtiCtc.exe. Once the data is converted, it is transmitted to the distribution module (CtiServ.exe) by using a distributed communications method such as DCOM. Component Object Model (COM) is a Microsoft specification that defines the interaction between objects in the Windows environment. DCOM (Distributed Component Object Model) is the network version of COM that allows objects running on different computers attached to a network to interact. An alternate embodiment of the CTI Server utilized Microsoft Message Queue (MSMQ) technology as the means to carry messages among the system components, instead of the original DCOM method used by CtiServ.exe, and those skilled in the art would appreciate that a variety of additional data communications technologies are also suitable to this role.

Figure 9:
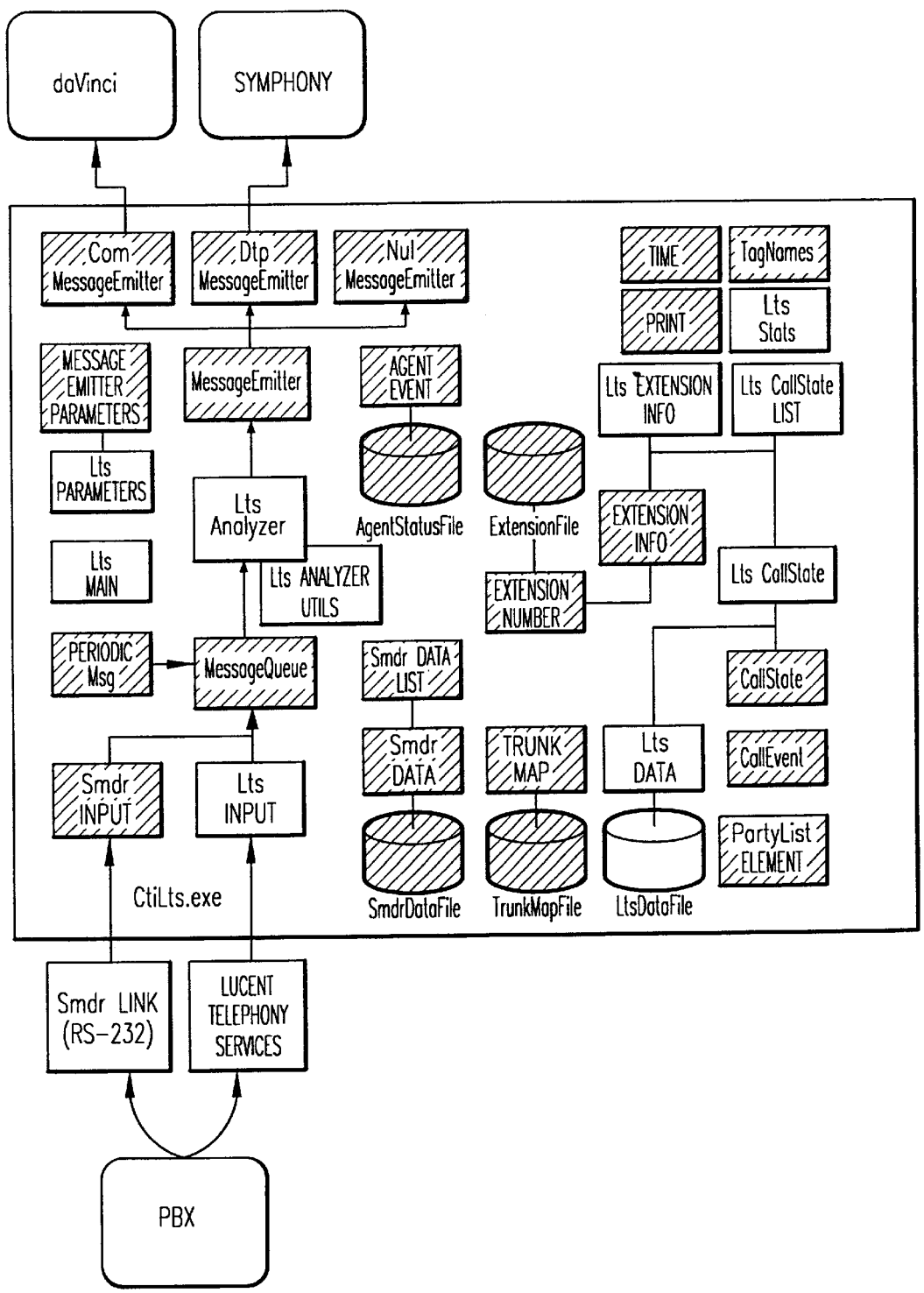
FIG. 9 shows a version of CtiCtc.exe configured to work with a Lucent Telephony Services interface (and thus called CtiLts.exe instead of CtiCtc.exe).

The translation module and the distribution module of the CTI Server can be located on different machines, if desired. There can be multiple translation modules running in the system—one for each PBX or CTI middleware environment. There can also be different types of translation modules, with one version for each interface or API layer. As depicted in FIG. 8, CtiCtc.exe deals with the Dialogic CT-Connect API, and there are 3 copies of this program running to handle the PBXs. If other types of APIs are used, there would be other programs for these various interfaces. All translation modules contribute data upward to the distribution module in a single, common, normalized format. An example of a version of CtiCtc.exe configured to work with a Lucent Telephony Services interface (and thus called CtiLts.exe instead of CtiCtc.exe) is shown in FIG. 9. The modules which are common to both versions of the program are shown in FIG. 9 as shaded gray. The unshaded modules represent those portions of the program that necessarily vary between CtiCtc.exe and CtiLts.exe, due to the differing input parameters and data structures used by both systems.

Again with reference to FIG. 8, the distribution module (CtiServ.exe) receives and collects all the CTI events from the various translation modules. Then it puts the events into a single inbound queue 830 for processing by a main control thread 835. After the events are processed, they are separated into individual outbound queues 840. Finally, the events are sent by various delivery threads 850 to the CRG components within different Voice Servers. The main processing thread 855 (WinMain) is deliberately isolated (decoupled) from the inputs and outputs to ensure that delays in transmitting or receiving data will not impact the overall performance of the CTI Server.

Figure 11:
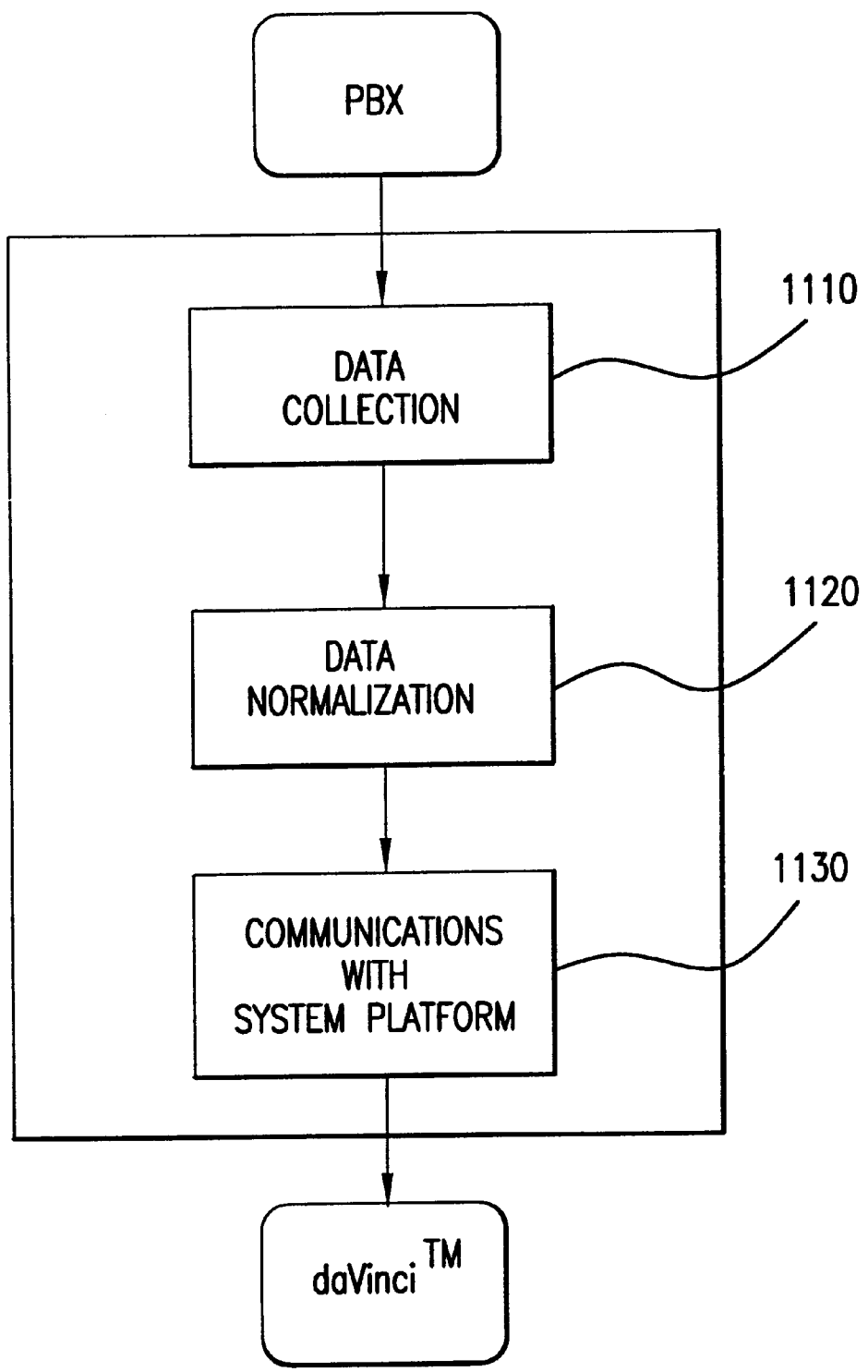
FIG. 11 illustrates three distinct layers of the CTI Server in a preferred embodiment.
Figure 12:
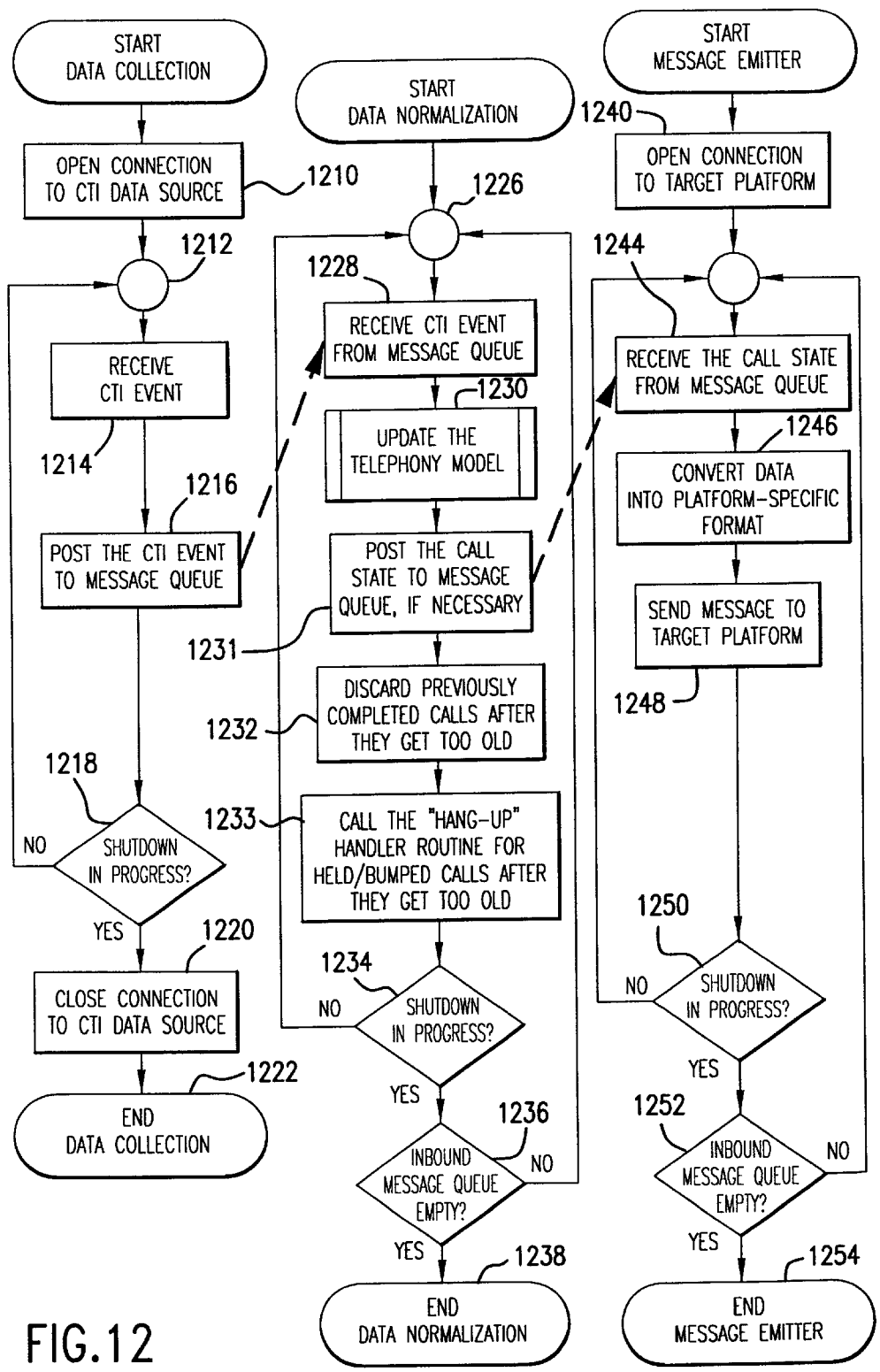
FIG. 12 shows in block diagram form several threads of the CTI Server in a preferred embodiment that implement three distinct layers of processing (data collection, data normalization, and message emission).

FIG. 11 shows how the CTI server in accordance with a specific embodiment consists of several threads that implement three distinct layers of processing (data collection 1110, data normalization 1120, and message emission 1130). FIG. 12 illustrates the processing steps of these layers. The dashed lines indicate message flow between threads, whereas the solid lines indicate program logic flow. The CTI translation modules are thus internally separated into 3 major sub-tasks: (1) data collection from the input source (PBX, CTI middleware, etc.); (2) normalization of the data to a common format; and (3) communications with the system platform.

In a data collection layer, the initial step 1210 is to open the connection to the CTI data source. At step 1214 the layer receives a CTI event, and at step 1216 posts the CTI event to the Message Queue 462 (see FIG. 4). If at step 1218 a shutdown is in progress, the connection to the CTI data source is closed at step 1220, and at step 1222 data collection is ended. If at step 1218 a shutdown is not in progress, the CTI connection remains open (step 1212).

At step 1228, the data normalization layer receives a CTI event from the Message Queue 462. The data normalization layer updates the telephony model at step 1230. See FIG. 13 for a more detailed explanation of the updating of the telephony model. At step 1231, the call state is posted to the Message Queue, if necessary. At step 1232 completed calls are discarded from memory after they age beyond a configurable time limit. At step 1233 the "hang-up" routine is called to update the telephony model for held or bumped calls after they age beyond a configurable time limit. At step 1234, if a shutdown is in progress, the data normalization layer checks the inbound message queue at step 1236. If the message queue is empty, data normalization is ended (step 1238). If the message queue is not empty at step 1236 or if there is not a shutdown in progress at step 1234, the data normalization layer goes to step 1226 and waits for the next CTI event to arrive.

The message emission process begins with opening a connection to a target platform, such as the da Vinci or SymphonyCTI recording systems at step 1240. At step 1244, the message emission layer receives the call state from the message queue 462. At step 1246, the call state data is converted into a platform-specific format. At step 1248, the message emitter sends the message to the target platform. At step 1250, if a shutdown is in progress, a check is made at step 1252 for whether the inbound message queue is empty. If the inbound message queue is empty, message emission is ended at step 1254. If the inbound message queue is not empty at step 1252, or if there is not a shutdown in progress at step 1250, the message emission layer, at step 1242, maintains the open connection to the target platform and awaits the next call state transmission.

Master Call Record

The CTI Server sends "Call Event Records" onward to the recording platform. These messages provide details on the start and end of calls, as well as significant transitions that affect the lists of participants for the calls. The list of participants is cumulative, and information regarding participants is retained for the entire duration of the call even when some participants in the list may have dropped off from the call. If a participant rejoins the call, a new, separate entry will be created to reflect that change within the participant list. The following table shows the fields contained within these messages.

| CtiCallEvent | | |
|---|---|---|
| Name | Type (max length) | Description |
| Version | WORD | Version number of this message format, for reverse compatibility. |
| MessageID | GUID | Unique ID for this message instance |
| RecorderNode | WORD | A number that identifies a particular Voice Server |
| RecorderChannel | WORD | A number that identifies a recording input channel on a Voice Server |
| EventType | BYTE | Indicates if this event added (0 x 01) and/or dropped (0 x 02) participants in the call. |
| EventReason | BYTE | Indicates if this call was affected by a normal (1), conference (2), or transfer (3) telephony event |
| CTICallRecId | GUID | Unique ID pertaining to entire call (CTI server provides the same ID for a call that is transferred, conferenced, etc) |
| CallDirection | BYTE | Indicates call origin - outbound (0 x 12), inbound (0 x 21), internal (0 x 11), or unknown (0 x 44) |
| RingLength | WORD | Seconds between the first ring signal and going off-hook (picking up the phone) |
| DTMFCode | String*(50) | DTMF codes entered during the call |
| ApplicationData | String*(32) | Character array dedicated to information the switch may provide along with the call (e.g., account number) |
| CallingParty | WORD | Index number of the calling party within the participant list. Normally this is zero. |
| CalledParty | WORD | Index number of the called party within the participant list. Normally this is one. |
| PBXCallRecId | DWORD | Number provided by the PBX to identify this call. |
| NumberOfParticipants | WORD | Count of participants in the following array. |
| ParticipantList | Vector* | Array of PartyListElement describing all participants involved in the call |

*ObjectSpace data types

ObjectSpace is a set of C++ class libraries provided by ObjectSpace, Inc., that define useful general-purpose data structures including representations of strings, time values, and collections of objects (such as vector arrays or linked lists). These class libraries are implemented in a way that supports a wide variety of computer operating systems. Those skilled in the art will appreciate that many alternate implementations for such data structures are suitable for this role.

| CtiPartyListElement | | |
|---|---|---|
| Name | Type | Description |
| AgentID | String*(24) | Registered ID of person, typically used for "free seating" call center environments |
| Number | String*(24) | Telephone number of this participant (e.g., ANI, DNIS, Dialed Digits) |
| Console | String*(10) | Seating position that can consist of one or more stations. |
| Station | String*(10) | Unique telephone set, possibly with multiple extensions. |
| Extension | String*(6) | Internal line number of the participant |
| SwitchId | WORD | Number of the switch (PBX, ACD, or turret system) which is handling the conversation |
| TrunkID | WORD | Identification of trunk line which is handling the conversation |
| VirtChannel | WORD | Identification of trunk's channel (time slot) which is handling the conversation |
| LocationReference | BYTE | Describes the location of participant with respect to the switch - can be internal (1), external (2), or unknown (3) |
| StartTime | time_and_date* | Time participant joined the call |
| EndTime | time_and_date* | Time participant left the call |
| ConnectReason | BYTE | How participant joined the call: norm start of call (1), being added to a conference (2), or receiving a transferred call (3) |

-continued

CtiPartyListElement

| Name | Type | Description |
|---|---|---|
| DisconnectReason | BYTE | How participant left the call: normal end of the call by hanging up (1), dropping out of a conference (2), transferring away a call (3), or call ends by another party hanging up (4). |
| Changed | BOOL | Indicates if recent change in CTI message. |

*ObjectSpace data types

For external participants, only the fields Number, SwitchName, TrunkID, VirtChannel, LocationReference, StartTime, EndTime, ConnectReason, and DisconnectReason will be applicable. For internal participants, all fields may be applicable. Unused string fields will be null terminated. Unused number fields are set to zero. Each call event record will contain at least two participants in the list. These two participants are the original calling party (0) and called party (1) and will appear within the list in that order respectively.

Note: The data field "Number" will be filled in a variety of ways, depending upon the type of participant and direction of the call.

| Participant Type | Call Direction | Number Field |
|---|---|---|
| External participant | Inbound Call | ANI |
| External participant | Outbound Call | Dialed Digits |
| Internal participant | Inbound Call | DNIS or Extension |
| Internal participant | Outbound Call | Extension |
| Internal participant | Internal Call | Dialed Digits or Extension |

The CTI Server sends "Agent Event Records" onward to the recording platform's System Controller to convey information when an agent logs on/off at a particular location. The following table shows the fields contained within these messages.

CtiAgentEvent

| Name | Type (max length) | Description |
|---|---|---|
| Version | WORD | Version number of this message format, for reverse compatibility. |
| MessageID | GUID | Unique ID for this message instance |
| EventType | BYTE | Indicates if this event pertains to either a logon (1) or logoff (2). |
| LocationType | BYTE | Indicates if this event pertains to a location type such as a console (1), station (2) or extension (3). |
| AgentID | String*(24) | Registered ID of person, typically used for "free seating" call center environments |
| SwitchId | WORD | Number of the switch (PBX, ACD, or turret system) where the agent connected. |
| Console | String*(10) | Seating position that can consist of one or more stations. |
| Station | String*(10) | Unique telephone set, possibly with multiple extensions. |
| Extension | String*(6) | Internal line number of the participant |
| StartTime | time_and_date* | Time that the agent logged in. |
| EndTime | time_and_date* | Time that the agent logged out. |

*ObjectSpace data types

Within any given "Agent Event Record", only one of the following three fields will be applicable: Console, Station, or Extension. The actual mapping is determined by the LocationType. Unused string fields will be null terminated. Unused number fields are set to zero.

It will be appreciated that the general principles behind the method described above are suitable not only for associating and combining real-time CTI data with the trunk channel information from an SMDR message, but also for any situation where a mixture of information is being provided from two or more sources and there is a need to gather and merge the information to get a more complete picture of what is actually happening in the system. The disclosed method could easily be adapted by those of ordinary skill in the art to situations in which the mapping or association between the multiple sources of information is "weak" and prone to ambiguity. While this method does not make the potential ambiguity disappear, it helps to define a quantitative set of rules for making a judgement call on when a match is "good enough" to act upon. While human beings are often capable of making such judgement calls intuitively, computers need a specific set of instructions in order to act in a repeatable and reliable fashion upon the input data.

Previous recording systems that made use of CTI to collect enhanced search information mimicked the event-oriented interfaces provided on the data links from a PBX. Individual database records were constructed on a 1-to-1 basis for the events occurring during the total lifetime of a phone call. The interpretation of the series of events was left to the end user. Associations between related events were made difficult in certain cases because the call identification numbers given by a PBX may change after a call has been transferred or conferenced, or the numbers may be recycled and reused over time. Following and tracing the history of events for a complete call from the perspective of the external customer could require much manual and repetitive searching. Playing back the entire set of audio recordings from the start of that customer's interaction with the business, to the ultimate conclusion of that customer's transaction, could also require additional repetitive manual requests to play back the individual recorded segments within a call that was transferred or conferenced.

Figure 10:
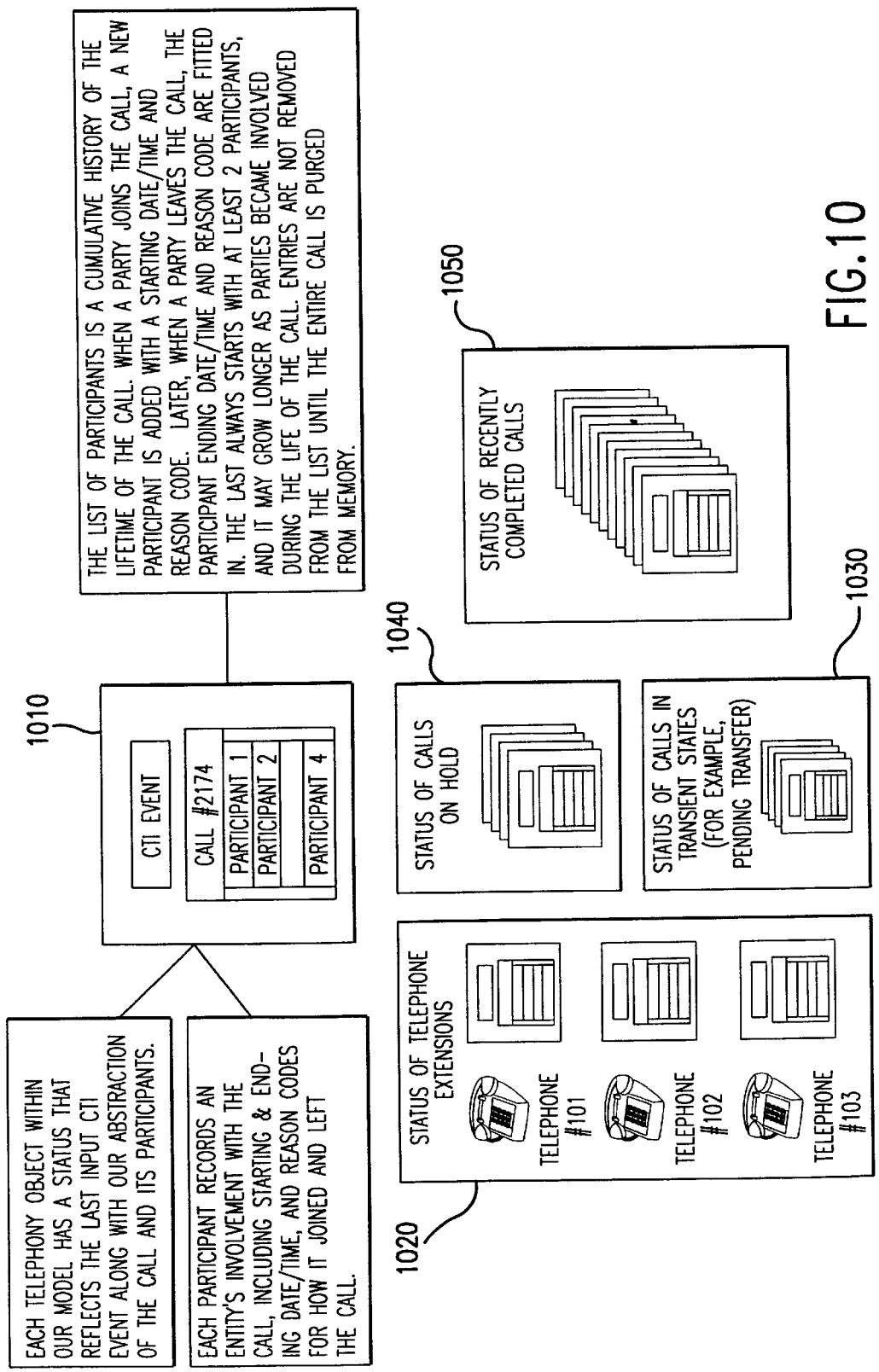
FIG. 10 depicts key elements of the data model used in a preferred embodiment.

To resolve this problem, the CTI server of the preferred embodiment maintains and accumulates information within a data model of telephony activity. FIG. 10 depicts the key elements of the data model. This consolidated information is shared with the rest of the recording system when parties join or leave a call, thereby eliminating the need for downstream components to store or interpret the individual CTI events occurring during a call's lifetime.

During the active lifetime of a call, real-time information is accumulated within a historical call record that tracks each participant within the call. At certain key points during the accumulation of data, whenever a party joins or leaves the conversation, the call record is transmitted onward to allow the rest of the recording system to process the information accumulated to that point. Upon the conclusion of the call, the CTI server of the preferred embodiment retains a copy of the call record for a configurable time interval before discarding it from memory. This delay allows for the arrival of the SMDR data.

The call records are organized into a two-tiered hierarchy of calls and participants. Certain data fields that apply globally to the entire call are stored at the upper level. Most data fields, however, apply only to a specific party involved within a call, and are stored at the lower level. Individual participants can have identifying information (such as extension number, agent ID, telephone number via DNIS/ANI/CLID, trunk and channel) along with time-stamps and reason codes for the entry and exit from participation in the telephone call. Reason codes include initial start, transfer, hold, resume, conference add/drop, and hang-up.

The currently active call on each telephone set being monitored is maintained within a storage area 1020 of the data model. Also, the data model provides for an open-ended list 1040 of calls that may be "on hold" (and therefore not associated with any telephone set). There is also a list 1030 that can be used temporarily for calls when they are in a state of transition during transfers, queuing or re-routing, for the brief period of time when an active call is disassociated from its original telephone set but not yet associated with a new telephone set. Finally, there is a list 1050 of recently completed calls that is used to await additional information that might be provided from a SMDR message.

This complete set of data structures is replicated independently for each CTI server that monitors a separate PBX within the overall call center environment.

The call-centric structure and the list of participants facilitate a common framework for modeling the various types of complex call scenarios that may occur during the life of a call, far beyond the simplest example of a basic two-party telephone call. Moreover, the recording units can link references (i.e., logical pointers) to the audio recordings for a portion of the call, so that these audio sections are associated with the total history of the logical telephone call. Each call record can be linked within the database to an open-ended list of references, which provides: the name of a Voice Server; the name of a .WAV file containing the audio recording; the offset within the .WAV file to the start of the recording segment; the start time of the recording segment; and the duration of the recording segment.

Rather than relying exclusively upon the call identification number assigned by the PBX, the CTI server of the preferred embodiment obtains a Globally Unique Identifier (GUID), that is generated at the software's request by the underlying Microsoft Windows NT operating system, and uses that GUID to identify the call uniquely within the recording system's memory, online storage database, and offline storage archives. The GUID is initially requested at the start of the call. While the call remains active, the CTI server maintains a record of both the call identification number assigned by the PBX, and the GUID assigned to the call by the software of the preferred embodiment. When a CTI event arrives, the system searches the telephony model to find a matching call record for the PBX-assigned call identification number. At transition points during a call's lifetime, such as when it is transferred or conferenced, the PBX typically provides the old and new identification numbers together in that single transition event. In these cases, after locating the matching call record, the software of the preferred embodiment updates its record of the call identification number now being used by the PBX while retaining the originally allocated GUID value. In this way, the same GUID identifies the call throughout its lifetime, even while the PBX call identifier may be changing. The long-term uniqueness of the GUID value is also useful if the PBX recycles and reuses previously assigned call identifiers. It further helps in dealing with calls within a multiple PBX environment. While another PBX may coincidentally use the same call identification number, a different GUID is assigned at the start of each individual call, thereby avoiding a conflict within the telephony model.

As shown in FIG. 11, the CTI server consists of three distinct layers. Each layer actually runs in a separate thread of execution, and communicates with the other layers through shared memory, control semaphores, and message queues. The first layer 1110 is responsible for gathering input from the PBX data link(s), and there can actually be several threads running to provide better throughput capacity or to handle multiple diverse input sources (e.g., SMDR and real-time CTI messages). After saving the clock time when a message is received, the first layer 1110 places the message into a queue for subsequent processing by the second "analyzer" layer. The second layer 1120 is responsible for updating and maintaining the telephony model within the memory of the CTI server, and for deciding when to send copies of call records onward to the rest of the recording system. When a call record needs to be sent onward, the call record is placed into a message queue for subsequent processing by a third "message emitter" layer 1130, which is responsible for communications with other components of the overall recording system. This separation of layers gives the CTI server the flexibility to process its input and output sources in a de-coupled fashion, so that any delay in one area of communications does not affect the processing of another area. In a sense, the design approach provides a virtual "shock absorber" so that bursts of input traffic, or temporary lag times in communicating with other parts of the recording system, can be tolerated without loss of data or incorrect operation of the system.

The call records saved within the telephony model also include a record of the last state of the device as reported by the PBX. This information is used by the analyzer to run state machine rules, in order to select a handler routine for a subsequent message. The CTI server uses the previous state of the device (e.g., ringing, answered, and so forth) along with the current state of the device to select a handler routine from a matrix of potential choices.

The analyzer layer is of particular interest, since it is responsible for updating and maintaining the data model of telephony activity. Its overall program logic flow is illustrated in FIG. 12 and the subroutine called at step 1230 is shown in further detail by FIG. 13. This program logic is described below.

Figure 13:
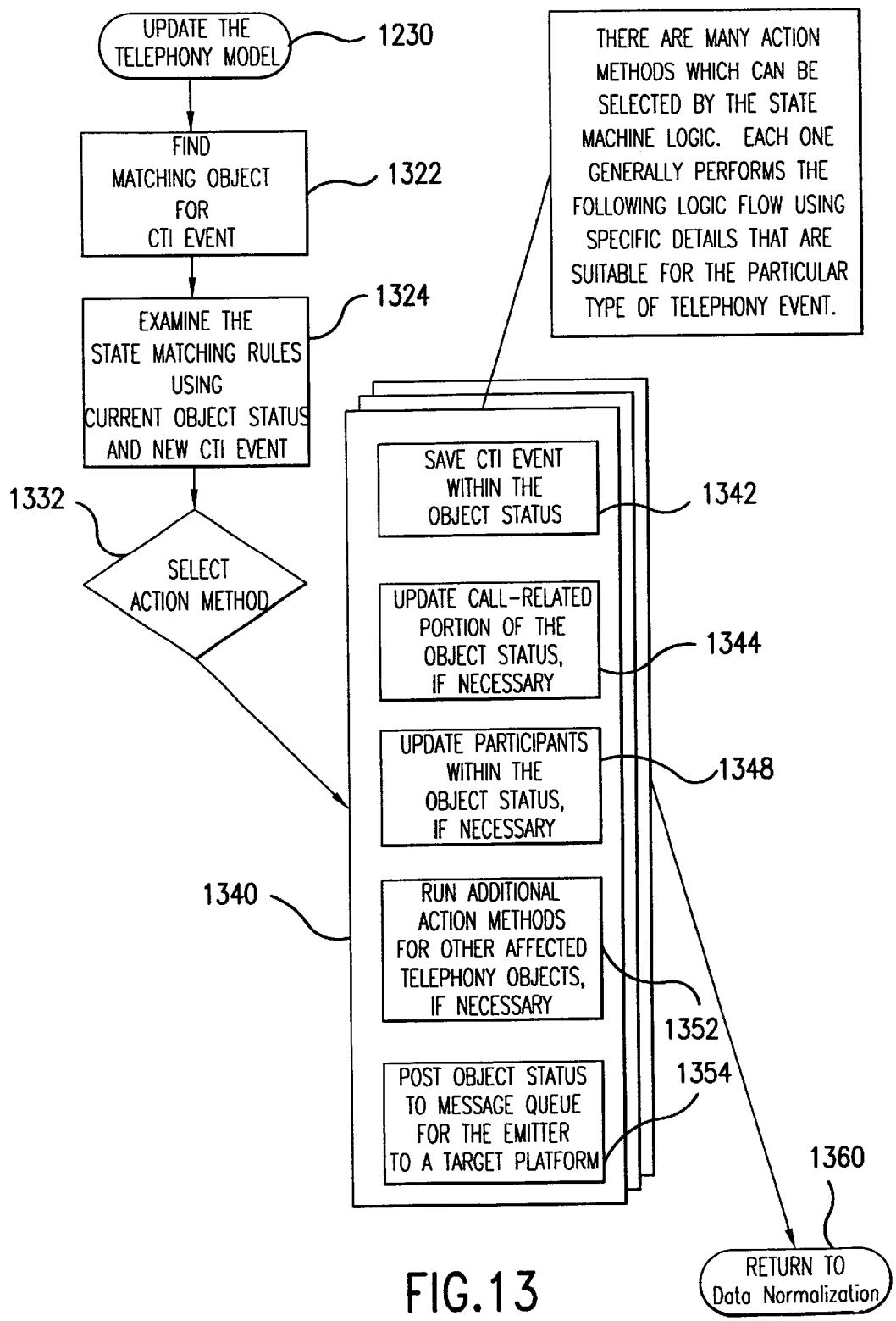
FIG. 13 illustrates the program logic flow of the analyzer layer of the preferred embodiment.

1. Receive a CTI event from the message queue at step 1228.
2. Enter the subroutine at step 1230 to update the telephony model. Referring now to FIG. 13, search the data of model of telephony activity, to find a matching record at step 1322 with the same monitored device (i.e., telephone set).
3. If the PBX-assigned call identification number does not agree, search for a matching record in the lists of calls on hold, in transition states, or recently completed. If a match is then found, move the call record on the affected device to the list of calls in transition states, and move the matching record to the monitored device.
4. At step 1324, use the previous state as recording within the telephony model, along with the new state reported in the CTI event, to select the appropriate handler routine at step 1332 from a matrix of choices. The handler routine will be one such as those described below.
5. At step 1340, run the steps of the handler routine. This will commonly include steps to save at step 1342 information from the CTI event into the call record, to update the call-related portion of the Object Status, if necessary (step 1344), to update Participants within the Object Status, if necessary (step 1352), to run additional action methods or handler routines for other affected telephony objects, if necessary (step 1348), and to post Object Status to the message Queue for the Emitter to a target platform (step 1354).

6. At step 1360, returning to FIG. 12, at step 1232, discard completed calls within the data model of telephony activity, if they have aged beyond a certain re-configurable time limit.
7. Call the "hang-up" routine at step 1233 for any held call that have aged beyond a separate re-configurable time limit. Likewise, call the "hang-up" routine for any calls marked in transition, which have aged beyond another separate re-configurable time limit.
8. Continue again from the beginning of this logical program flow at step 1226.

The following description lists processing steps for various handler routines that may be called in response to certain event types using a decision matrix based upon past and current state information.

Handler Routines
Ignore: adjust state based on CTI event
DialTone: save the initial start-time of the call
   save the original dialed number, if available
   adjust state based on CTI event
RingIn: adjust state based on CTI
   event time-stamp when ring occurred
   clear call record
   set inbound, outbound, internal
Answer: adjust state based on CTI event
   compute total ringing duration
   fill in call record with calling party & called party
   generate START message to recording system
Abort: adjust state based on CTI event
   clear timers & original dialed number
Hang-Up: adjust state based on CTI event
   update call record to stop all parties
   indicate which party actually hung up on the call
   generate STOP message to recording system
RingOut: adjust state based on CTI event
   time-stamp when ring occurred (i.e., now)
   clear call record
   set inbound, outbound, internal
   compute total ringing duration (i.e., zero)
   fill in call record with calling party & called party
   generate START message to recording system
Hold: adjust state based on CTI event
   stop participant placing the call on hold
   add new placeholder participant for HOLD
   generate TRANSFER message to recording system
   move call record to hold area
   fill device slot with a new empty call record
Resume: if device slot not idle, move call record to transition list
   move matching call record from hold area to device slot
   adjust state to "active"
   stop the placeholder participant for HOLD
   add new participant for telephone set that resumes the call
   generate TRANSFER message to recording system
Conference: if call record found in hold area,
   if device slot not idle, move call record to transition list
   move matching call record from hold area to device slot
   adjust state to "active"
   stop the placeholder participant for HOLD
   add new participant for telephone set that resumes the call
   generate TRANSFER message to recording system
   adjust state based on CTI event
   add new participant for telephone set that is added via conference
   generate CONFERENCE-ADD message to recording system
Transfer: if call record found in hold area,
   if device slot not idle, move call record to transition list
   move matching call record from hold area to device slot
   adjust state based on CTI event
   stop the participant leaving the scope of the call (either a device or HOLD)
   add new participant receiving the transferred call
   generate TRANSFER message to recording system
ConfDrop: adjust state based on CTI event
   stop the participant leaving the scope of the call
   generate CONFERENCE-DROP message to recording system
OpAnswer: adjust state based on CTI event
   re-compute total ringing duration
   correct the affected participant entry in the call record
   generate CORRECTED message
DestChanged: clear call record
   the call will be processed via a subsequent CTI event The following step-by-step description describes the same call scenario as in FIG. 3, but with emphasis on the data model of telephony activity.

1. A real-time CTI message occurs describing that phone B is ringing, but not yet answered.
2. The "RingIn" routine is invoked.
3. The telephony model is updated with the time when ringing started (for use later in measuring ring duration) and the call direction. These facts are stored with device B 340.
4. A real-time CTI message occurs describing the start of the call between A 335 and B 340.
5. The "Answer" routine is invoked.
6. The telephony model is updated to reflect the initial 2 participants (A and B) started normally at t0 310.
7. A copy of the call record is sent onward to the rest of the recording system.
8. The call record is retained within the telephony model, associated with device B 340.
9. A real time CTI message occurs describing that B 340 placed the call on hold.
10. The "Hold" routine is invoked.
11. The telephony model is updated to reflect that B 340 transferred the call to HOLD 345 at t1 315. (This information is accumulated with the information previously gathered at t0).
12. A copy of the call record is sent onward to the rest of the recording system.
13. The call record is removed from device B 340 within the telephony model, but kept in a list of held calls.
14. A real-time CTI message occurs describing that B 350 returned to the call and invited C 355 by conferencing.
15. The "Conference" routine is invoked.

16. The call record is moved within the telephony model from the list of held calls back to device B 350.
17. The telephony model is updated to reflect that HOLD 345 transferred the call back to B 350 at t2 320. (Note that information is accumulated with the information previously gathered at t0 and t1).
18. A copy of the call record is sent onward to the rest of the recording system.
19. The telephony model is updated to reflect that C 355 joined the call as a conference participant at t2 320. (This information continues to be accumulated with previously gathered information).
20. A copy of the call record is sent onward to the rest of the recording system.
21. The call record is retained with both devices B 350 and C 355 within the telephony model.
22. A real-time CTI message occurs describing that C 355 dropped out of the call.
23. The "ConfDrop" routine 386 is invoked.
24. The telephony model is updated to reflect that C dropped out of the conference at t3. (This information continues to be accumulated with previously gathered information).
25. A copy of the call record is sent onward to the rest of the recording system.
26. The call record is removed from device C within the telephony model, but retained with device B.
27. A real-time CTI message occurs describing that A terminated the call.
28. The "Hang-Up" routine is invoked.
29. The telephony model is updated to reflect that A stopped normally and B stopped because the other party hung up at t4 330. (This information continues to be accumulated with previously gathered information).
30. A copy of the call record is sent onward to the rest of the recording system.
31. The call record is removed form device B 350, but kept in a list of completed calls.
32. A SMDR message occurs summarizing the call in its entirety.
33. The list of completed calls is searched to find a match, and the appropriate call record is retrieved.
34. The call record is updated with the trunk channel information from the SMDR message.
35. A copy of the call record is sent onward to the rest of the recording system.
36. The call record is removed from the list of completed calls.

Figure 14:
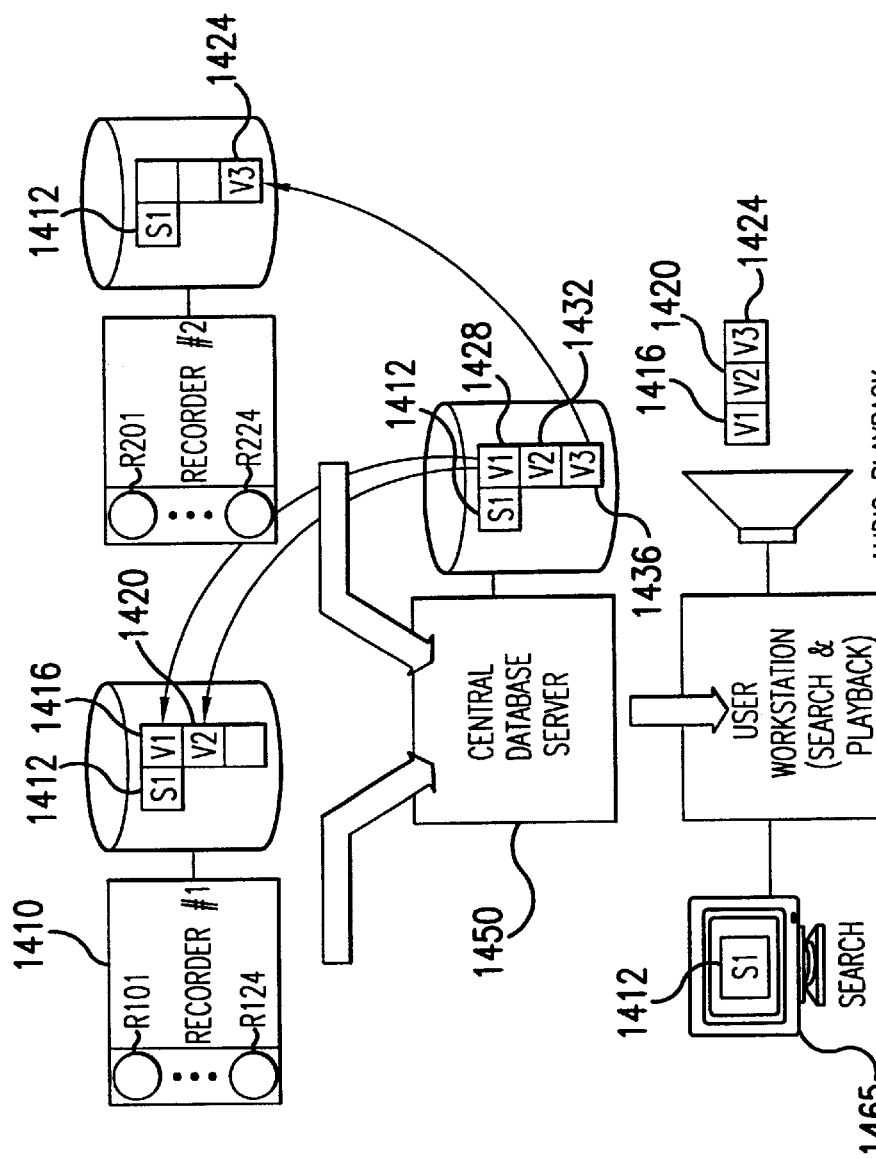
FIG. 14 depicts the flow of information within the recording system of this invention in a preferred embodiment.

FIG. 14 depicts the flow of information within the remainder of the recording system. The same enhanced search information S1 1412 is provided by the CTI server to all of the recording units involved in handling a portion of the call. Even if a call is transferred to another telephone set, which is attached to an input channel on a different recorder, the entire call will still remain associated as one entity within the system. Each recorder maintains a local copy of the audio sections V1 1416, V2 1420, and V3 1424 that it obtained during the call, along with a complete call record containing search information S1 1412 which contains the two-tiered call and participant model. The search information is copied to a central database server 1450, along with references (i.e., logical pointers) to the original audio recordings VR1 1428, VR2 1432, and VR3 1436. When a user searches for a call, the search results 1465 will include the complete call record S1 1412. By using the audio references the playback software can reassemble the complete audio for the original call, including sections possibly obtained from different physical recording units.

The general principles behind the method described above would be suitable, not only for representing the complete history of telephone call's lifetime, but other forms of multi-party communications. This may include certain forms of radio traffic that have an associated data link, which provides "talk group" identification numbers (or similar types of descriptive search data in relation to the audio traffic).

Call Record Generator

The Call Record Generator (CRG) in accordance with the present invention performs the function of combining voice and data into call records. It performs this function at or near real time. The CRG, when combined with the metadata normalization module CTI Server, makes up a system that can be used in current and future communication recording products.

The CRG is responsible for collecting data from different sources with respect to portions of a call on various recording input channels, and merging them together into a unified call record. One of these sources is the recorder that creates the files containing media. Another sources provides metadata describing the when, who, why and where information of a call. This call record metadata comprises the start and stop times of a segment within a call, as well as CTI data such as telephone numbers and agent IDs. These metadata sources include but are not limited to Telephony switches and Trunked Radio servers. The CRG depends upon the CTI Server to normalize data from these sources.

FIG. 1 illustrates the relationship between the CRG and the rest of the system. Since call records are an essential part of the recording system, there is one CRG dedicated to each recorder and physically located in the same Voice Server. If other system components become inoperable, call record generation will remain functional (albeit at a reduced level).

The CTI server supplies switch events to the appropriate recorder indicating either the status of calls or providing data for population. The CTI server provides, along with call record data, the association between the recorder location (i.e., Voice Server and recording input channel number) and the switch connection point. The switch connection point is described as either the extension for extension side recording or the Trunk ID/virtual channel (TDM time slot) for trunk side recording. In addition to this mapping, an agent identification will be supplied for agents currently associated with this call. The recorder location, switch identification and corresponding agent are stored in the call record. The CRG is designed to work with many different configurations of the disclosed system. These configurations include: systems without CTI Servers; systems with Real-time CTI Servers; systems with non-Real-time CTI Servers; recorders with analog inputs; recorders with digital inputs; recording on the trunk side of the telephony switch; and any combination of CTI Servers, Recorder inputs, and recorder positions mentioned above.

Due to the non-standard operation of telephony switches and flexibility requirements of the recording device, the CRG must handle event data arriving in different chronological order. In accordance with a preferred embodiment, it accomplishes this by requiring all events to indicate time of occurrence and maintaining a history of them. A call record can be created solely from either event sources but when both are present, call records are generated using recorder information together with CTI data.

It is clear that the use of different data sources and non-synchronous messages, as required to support various alternative configurations of the overall system, add considerable complexity to the CRG. For example, with the many different objects supplying information for a particular call, the messages from each can be received in any order. The CRG must be able to accommodate this requirement. In some configurations, objects supply redundant information to the CRG. The CRG provides a mechanism for selecting which information will populate the call record.

In the most basic mode of operation, the CRG has no CTI input and is recording solely on VOX events from the recorder controller (the term "recorder controller" is used interchangeably herein with "Audio Recorder"; both terms refer to the software that primarily directs the processing of the audio data). VOX is Dialogic Corporation's digital encoding format for audio samples. This term is also sometimes used to refer voice-activated initiation of recording, a process that conserves storage space since a continuous recording process would include periods of silence. These VOX events mark the beginning of energy activity on a phone line and are terminated by the lack of activity. With this approach, an actual phone call may include several call records. To address this problem, the recorder waits a configurable holdover period while silence is present before terminating an active VOX clip (the term "Recorder" is used interchangeably herein with the term "Voice Server"; both terms refer to the physical recording server). The goal is to concatenate parts of a phone call where gaps of silence exist. The solution lies in determining an appropriate holdover time so as to avoid merging audio from the next phone call if it occurs close to the end of the last call.

The next level of operation is where the recorder hardware can detect telephony signaling such as off hook and on hook. The CRG has no CTI input from the switch and is recording solely on events from the recorder controller, but these events mark the beginning and end of a phone call (off hook and on hook). The resultant call record reflects a phone call in entirety but lacks much descriptive data that accompanies switch data.

The highest level of operation involves the use of a CTI Server. In this configuration, the CRG receives recorder events as well as CTI events. Since CTI events give the CRG a description of the entire phone call, information obtained from them drive the creation of call records. Recorder data describing audio events are absorbed into the CTI call record whenever audio and CTI times overlap. With CTI events driving call record generation, non-audio based call records can be created.

Mixing of recorder and CTI data occurs by comparing ranges of time indicated. For example, a person whose telephone extension is being recorded is involved in a phone call for a given period of time. The recorder events indicating that audio was recording on the same extension during the same time period are associated with the CTI metadata for that phone call. Since the data from the CTI Server may arrive before or after the corresponding recorder events, the CRG maintains an independent history for each type of data.

For the case where CTI events arrive before the recorder events, the CTI events are added to the CTI history list. When the corresponding recorder events arrive, the CTI history list is swept for matching time ranges and associations are made when they occur. For the case where recorder events arrive before the CTI events, the recorder events are added to the recorder history list. When the corresponding CTI events arrive, the recorder history list is swept for matching time ranges and associations are made when they occur.

Previous recording systems stored voice data and metadata in separate locations. A significant disadvantage to this approach is that it is left up to the other software subsystems to combine the information when required. This approach makes the work of other system features, such as playback and archiving to offline storage, more complicated and prone to error. By performing this "early binding" of the audio and CTI data in accordance with the present invention, such problems are avoided and the above desirable features are therefore much simpler to implement in a correct, robust fashion.

When attempting to playback media for a given call record, the playback mechanism must figure out where the audio for the call record exists and when determined, retrieve and locate the start time inside this media. The CRG places this media metadata in related tables, thus informing the playback mechanism what files are associated, their location, and what time ranges inside the file are available for playback.

Most communication systems require an archive mechanism to store large amounts of data that cannot be kept online due to capacity limitations. The CRG used in accordance with this invention assists with archiving by allowing both call record metadata and the media files to be stored on the same offline media. Current versions of recording systems store call record metadata and media files on separate offline media making restore operations more complicated.

For enhanced security purposes in a preferred embodiment, the CRG accesses media files associated with a call record through the use of media segmentation. A media segment includes, in addition to a media filename and location, a start time and duration inside the media file. Media segmentation is necessary when creating CTI based call records since a call record may involve many recording locations throughout the life of the call. The specified time range isolates a portion of the media file that can be accessed through this call record. This feature is very important when there are many call records located in one media file. A user attempting to play back media of a call record, to which he has the permission for access, may or may not have permission to play back other call records sharing the same physical file.

The Call Record Generator is responsible for merging CTI search data and a multitude of voice recording segments together into a single manageable unit of data. This software includes a flexible receiver algorithm to allow voice and search data to arrive in either order, without requiring one to precede the other. Once combined, the call record can be managed as a single entity, which greatly simplifies and reduces the work necessary to perform search, retrieval, and archival operations. This approach also offers a more natural and flexible framework for controlling security access to the recordings, on an individual call basis (or even on selected portions within a call).

Figure 15:
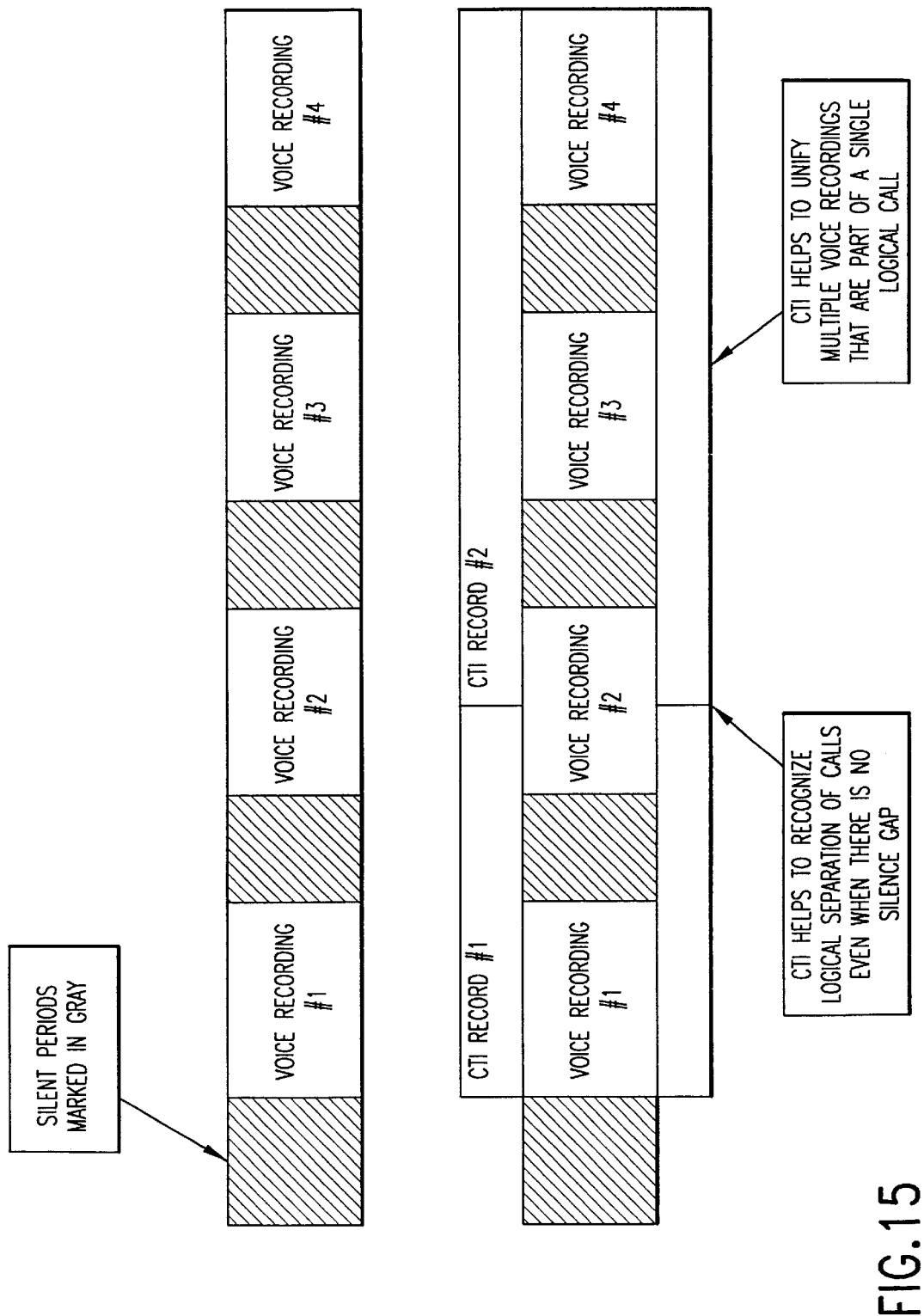
FIG. 15 shows how a recording unit operating with only voice signaling to guide the creation of its call records could make a number of fragmented audio segments.

As shown in FIG. 15, a recording unit operating with only voice signaling to guide the creation of its call records could make a number of fragmented audio segments. When the recording unit is supplied with CTI search data giving a complete history of the call's lifetime, and when it is designed to merge the CTI search data and audio segments into a combined unit of Voicedata™, the results can simplify and reduce the work necessary for a user to obtain a desired call from the system. Several audio events can be grouped together, and can be understood by the system as being part of the same logical telephone call. It is also possible that a single audio segment was recorded, even though parts belong to separate telephone calls, because the delay between stopping the first call and starting the second call was very brief Without a sufficient silence gap, it may appear to the voice recording unit that this was a continuous segment of audio, rather than belonging to two separate calls. When the CTI search data is merged with the audio segments, the system can use this information to recognize when an audio segment should be split and divided between two logically distinct calls.

The purpose of the Call Record Generator (CRG) is to collect information describing multimedia data and store it in a central location. The CRG produces Master Call Records (MCRs) that encapsulate information describing a phone call as well as the location multimedia that is associated with it. This description data comes from a multitude of sources including but not limited to a Voice Server and CTI Server. Likewise, the design of the system envisions that there will be a number of possible input sources for audio recording.

Whatever the means for collecting CTI information, it is communicated to the rest of the system in a common, normalized format. The CTI information is passed from the translation modules to a message router. From that point, copies of the information are sent to the scheduling and control services and to the CRG for the appropriate recorder (s). The scheduling and control services are responsible for starting and stopping the audio recorder, according to pre-defined rules that are dependent upon time and CTI information. The CRG is responsible for merging the audio recording with the CTI information to determine the temporal boundaries of the call and prepare the Voicedata for storage.

The user workstation typically searches and retrieves records from the Voicedata storage, and then obtains audio for playback directly from each recorder's private storage area. The user workstation can also be used to monitor "live" conversations by communicating directly with the recorder. The user workstation can also control the audio recorder indirectly by manipulating the rules used by the scheduling and control services.

Figure 16:
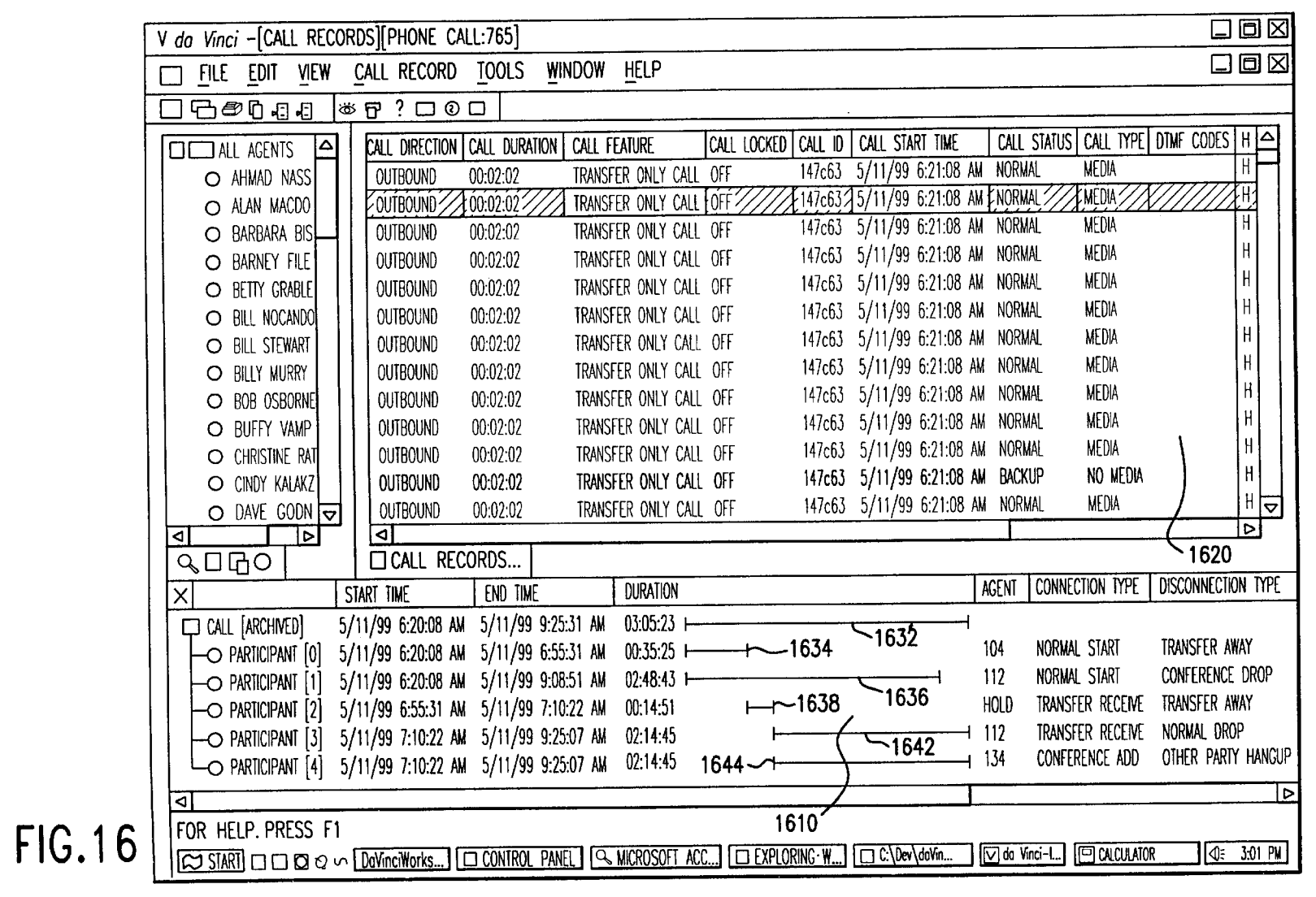

In the preferred embodiment, the user workstation has software that is configured to display a graphical user interface (GUI) such as that shown in FIG. 16. The GUI in FIG. 16 uses the information compiled in the Master Call Record to generate a graphical representation 1610 of the call, as well as displaying the call record information in alphanumeric form in a table 1620. Further, when the call is played back, the displayed segments in the graphical representation are highlighted to indicate the portion of the call being played back. For example, in FIG. 16, if the entire call is played back, when the portion of the call that occurred between 6:20:08 AM and 6:55:31 AM is played back the bars 1632, 1634, and 1636 are highlighted from left to right as the call is played back. Thus, as the part of the call that occurred at 6:55:31 AM is reached, bar 1634 is fully highlighted, and bars 1632 and 1636 are highlighted starting from the left and extending to those points on bars 1632 and 1636 that are directly above and below the right-hand endpoint of bar 1634. After the played back call reaches the part that occurred at 6:55:31 AM, the bar 1638 begins to be highlighted starting at the left endpoint. When the part of the call that occurred at 7:10:22 AM is reached, the bar 1636 is fully highlighted. At that point, the bars 1632 and 1636 are highlighted from their left-hand endpoints and extending to points directly above the right-hand endpoint of bar 1638. The process continues as long as the call is being played back, until bars 1632, 1634, 1636,1638, 1642, and 1644 are completely highlighted.

In alternate embodiments of the subject invention, playback of a potion of a call can be activated directly from the graphical view by mouse-clicking or by selecting from a pop-up menu; circular "pie-charts" show the percentage of time for each party involved during the lifetime of the call; an animated vertical line scrolls along to indicate the progression of time when the call whose graph is being displayed is played back; and miniature pictorial icons are shown within the graphs to indicate start/stop reasons, type of participant, etc. All of these embodiments are enabled by the data contained in the Master Call Record.

As a method of managing complexity, the preferred embodiment of the system uses data abstraction to isolate the internal details of certain structures to those components which need to operate directly upon them. Information is organized by the collectors (or producers) of that data, into a digested form that is more easily usable by the applications which need to retrieve and process the data.

For example, the CTI translation modules supply normalized records to the rest of the system in a common shared format, rather than exposing the details of various different CTI links. The system data model is call-centric, containing a detailed cumulative ("cradle to grave") history, rather than event-centric, which would place the burden of work on the receiving applications. Likewise, agent information is session-oriented rather than event-oriented.

Whether collecting information from a CTI link, or recording audio from a telephone call, a fundamental design advantage for the system of the preferred embodiment that it operates virtually invisibly, from the end-user's perspective. The system architecture is designed to avoid any interference with the normal operation of a call center environment.

For example, the CTI translation modules are focused exclusively on collecting and normalizing information that is to be supplied to the rest of the system. Liability recording systems, and quality monitoring systems that use "service observance" techniques, do not require any active call control on the CTI links. Only the technique known as "dynamic channel allocation" requires active call control through CTI links to establish a "conference" or "bridge" session between the audio recorder and the telephone call participants. When active control is required to implement such a feature, it can be implemented through a new logically separate task, without significantly affecting the rest of the system design. For customers that have existing CTI infrastructure and applications, the system will not interfere with their existing operations.

The CRG is responsible for collecting data from the CTI Server, creating CTI-based call records, and attempting to match those records with existing recorded audio data. If the CRG receives CTI information indicating that audio data for the same call resides on two or more recorders (for example, due to a transfer), records will be generated for each portion with a common call record ID. This ID can later be used to query for all of the pieces ("segments") comprising the complete call. Each segment will identify the recorder that contains that piece of the call.

During playback, a player module connects to a program located on a Voice Server called the Playback server ("PBServer"). The machine name of the particular Voice Server which holds an audio segment is stored by the CRG in the call record table within the Voicedata storage, and is passed into the player module after being extracted by a User Workstation's sub-component known as the call record browser. A call record playback request is then submitted, which causes the PBServer to query for a specific call record's audio files located on that physical machine, open them, and prepare to stream the audio upon buffer requests back to the client software (the player module) on the User Workstation. If successful, a series of requests is then issued from the client, each of which will obtain just enough audio to play to a waveOut device while maintaining a safety net of extra audio in case of network delays. Upon a request to "move" within the scope of a call record, the PBServer repositions its lead pointer to the desired location and then begins passing buffers from that point. This series of Request and Move commands continues until the user chooses to end the session by shutting down the client-side audio player.

As used herein, the term "Call Control" refers to the part of the metadata concerning the creation and termination of call records. The term "Media" refers to the actual data that is being recorded. This term is used interchangeably with audio since the primary design of the CRG is to support audio recording. However, the CRG could apply to any data being recorded including multimedia or screen image data. The term "Metadata" refers to informational data associated with multimedia data describing its contents. The term "Call Participant" refers to an entity that is involved in a phone call. There are at least two participants involved in a call; namely the calling and called parties. Participants can consist of people, VRUs, or placeholders for parties being placed on hold. The term "Recorder Participant" refers to a participant in the MCRs Participant list who is located at the same connection point on the Switch to which the recorder input channel is connected. In accordance with the present invention, there can be more than one Recorder Participant associated with a call record since participants can enter and leave many times in a call. For any given recorder channel, there can only be one matching Recorder Participant active (not disconnected) at any given time across all call records associated with that channel. A "VOX-based Master Call Record contains information contributed by events from the Recorder alone, in the absence of data from a CTI Server. A VRU is a Voice Response Unit: an automated system that prompts calling parties for information and forwards them to the appropriate handler.

Figure 16A:
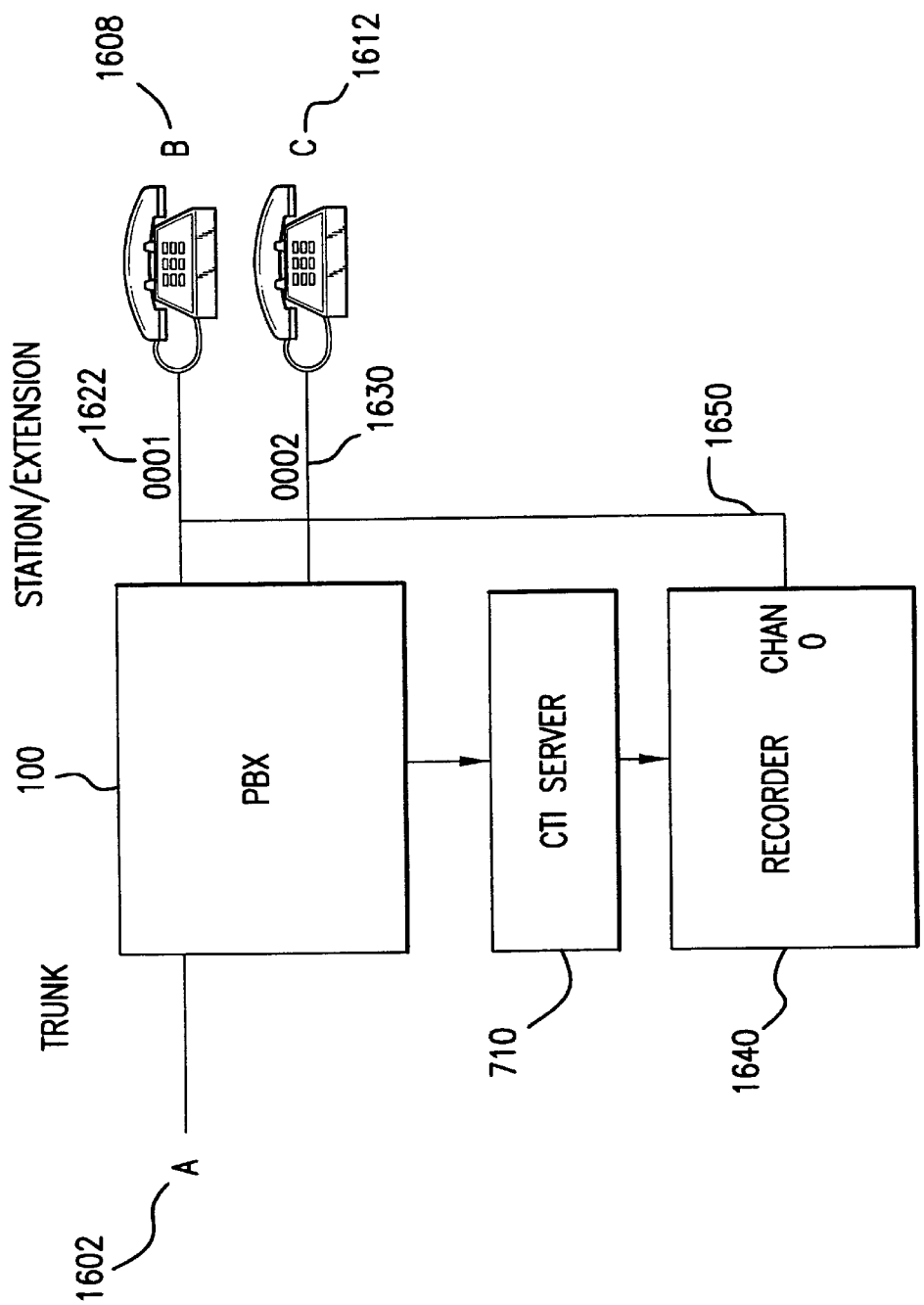
FIG. 16A shows a system containing a CTI Server and a Recorder in a specific embodiment of the present invention.
Figure 17:
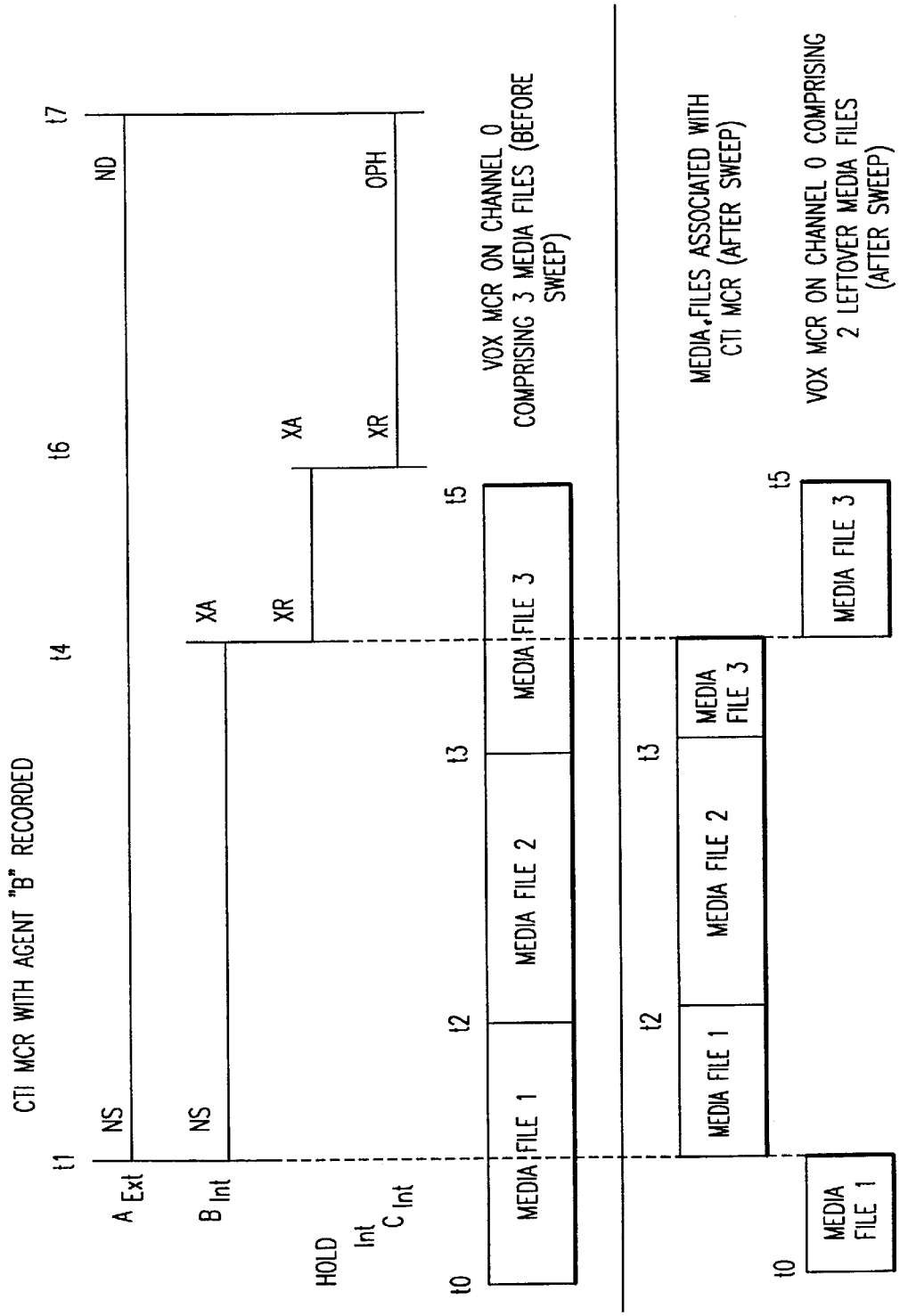
FIG. 17 illustrates steps in the creation of a Master Call Record used in a specific embodiment.

Once a recorder channel becomes involved in a phone call, it will be associated with all subsequent CTI events pertaining to the same call. This occurs even if the recorder location is no longer involved in the call. As an example, consider a phone call involving a transfer. FIG. 16A shows the subject system containing a CTI Server 710 and Recorder 1640. A recorder channel 0 1650 is attached to the extension side to extension 0001 1622. A phone call is initiated from the outside by some agent "A" 1602 and initially connects to agent "B" 1608 at extension 0001 1622. Agent "B" 1608 places "A" 1602 on hold and transfers him to Agent "C" 1612 at extension 0002 1630. The CRG recording extension 0001 1622 would receive all update messages with regard to this call since he/she participated in the call. Descriptive information from the CTI Server 710 would look like that in table 1600 in FIG. 16B. Audio clips recorded while agent "B" 1608 was involved in the call are recorded in a VOX based call record as shown in FIG. 17. The three media files created from the conversation may overlap with the recorder participant (agent "B"). At some point, determined by the order by which recorder and CTI events are received, audio data information from the VOX call record is absorbed into the CTI MCR for the times the recorder participant is involved (see the results after the sweep of the VOX and CTI history lists). For this call record, audio recorded between times $t_1$ and $t_4$ is absorbed. Any remaining audio is left in the VOX MCR for possible absorption in other CTI MCRs adjacent in time to this one. Since extension 0001 in this call record is different from the other participants in that it is associated with the same switch point as the recorder channel, he/she is referred to as the Recorder Participant. From time t4 and on when the Record Participant is no longer involved in the call, CTI events are still received for that channel. This allows the system to supply information about the entire phone call involving extension 0001 that may be of interest to the customer.

Since the CRG must be prepared to handle messages from different components arriving in any order, it is designed to collect information in separate structures. Depending upon the operating mode of the CRG channel, call records are created from information collected in one or more of these repositories. The name given for these structures is Master Call Record (MCR).

The major components of the preferred embodiment contributing information for call records are the Recorder and the CTI Server. In alternate embodiments of the subject invention, other multimedia or screen image data may be provided to the CRG in order to be merged with descriptive metadata.

Recorder events are assembled into VOX MCRs identified by a unique sequence number. Individual events contain a sequence number identifying a specific structure to update (or create). For example, a recorder event would be used to indicate the beginning of a new audio segment. While that segment is active, other messages containing the same sequence number are used to add metadata to the audio segment. These update events include, without limitation: DTMF digit data; agent association information; change of audio filenames holding future audio data; selective record control; and ANI, ALI, DNIS information. DTMF is Dual Tone Multi-Frequency and refers to sounds emitted when a key is pressed on a telephone's touch-tone keypad; ALI is Automatic Location Identification, a signaling method that identifies the physical street address of the calling party and typically used to support Emergency 911 response. Finally, a disconnect message identifies the end of an audio segment.

Events received from the CTI Server are accumulated in CTI MCRs. Each event received from the CTI server contains a unique identifier. Events containing the same unique identifier are associated with the same CTI MCR. If any VOX MCR contains audio data that overlaps in time with Recorder Participants in a CTI MCR, then that audio data is transferred to the CTI MCR. If the absorption process causes all audio metadata for a VOX MCR to be consumed, the VOX MCR is deleted from the VOX list. Therefore, call records generated on the same channel will never have overlapping audio data. VOX MCRs containing leftover audio not absorbed by CTI MCRs are either be saved into the central database if of significant duration or discarded.

Data from a Master Call Record alone is processed into call record(s) that populate the system's central database. Thus, if the recorder channel is set up for VOX based recording only or if the CTI Server is down, VOX MCRs drive call record creation in the system. Otherwise, the CTI MCRs drive call record creation in the system.

The VOX and CTI MCR structures are maintained in two separate lists for each recording input channel. These are the VOX History List and CTI History List respectively. These lists represent a history of call activity sorted chronologically. The depth of the history list is driven by a configurable time parameter indicating the amount of history that should be maintained. By maintaining a history, the CRG tolerates events received in any order as long as received within the time boundaries of the history list. Some CTI Servers obtain data from SMDR type switches which report entire phone calls at the end of the call with a summary message.

Maintaining a history buffer for VOX MCRs allows us to hold onto audio data for a period of time to allow later CTI summary messages to consume (absorb) the associated audio.

The MCR has status fields associated with them indicating its current state. At an installation involving real time CTI events, when a recording input channel receives a CTI event, it may indicate that a participant connected at the same telephony switch location as the recorder (Recorder Participant) is active in the call. The MCR is considered active as long as there is a Recorder Participant still active in the call. During this period, any new audio arriving on this channel is associated with the MCR. When a Recorder Participant leaves the call, the MCR becomes inactive. Since any Recorder Participant can become involved in the conversation at any given time through transfers or conferences, the MCR can transition into and out of active state many times throughout the phone call.

Another field in the MCR indicates the overall status of the call. This flag, called m_bComplete, indicates when the phone call is over. An MCR is considered incomplete as long as there is at least one participant still active in the call. When there are no participants active in a MCR it is considered to be complete. Therefore, calls created in real-time will start as incomplete and at some point transition into completed state. When an MCR enters complete state, a Closed Time variable is set to the current time. This time is used in maintenance of the History List. A closed MCR is allowed to stay in the History list for a configurable amount of time before it is deleted. During this window of time, events arriving out of timely order are allowed to update the MCR. Once this configurable amount of time expires, the MCR is updated in the local database, marked complete, and deleted from the History List.

When the CRG starts, it initializes, for each recording input channel, a location which identifies where it is attached to the telephony switch. Each recorder location contains status fields describing the state of the switch and CTI server involved. These fields are m_SwitchStatus and m_MetadataServerStatus respectively and are set to "down" state until an event is received that indicates otherwise. When a message is received indicating a change of state, all associated recorder locations are updated with the new state value. Any changes in operation are processed upon receipt of the next event for the channel.

Another configuration setting indicates what type of external sources are allowed to populate call records created on a record channel. This setting, m_ExternMetaDataSource, is set to zero when a record channel is to be driven by recorder events only. It is set to non-zero when external events are allowed to generate MCRs.

The CRG is able to react to a variety of situations that may arise. For example, when the CRG first initializes and a record channel is configured to receive CTI input, how are call records generated if the CTI server is not running? What if the CTI Server is running but the communication path to the recorder is down? The CRG must also be able to react to external parts of the system, that it normally relies on for input, being temporarily unavailable for periods of time. In accordance with a preferred embodiment, the CRG handles these situations by operating in different modes: Initial, Degraded, and Normal. These modes are applied individually to each channel in the recorder.

Initial Mode

When a recorder starts up, there can be a considerable amount of time before the rest of the system becomes operational. The CRG must be ready to handle events coming from the Recorder immediately after startup. Therefore, the CRG must be ready to accept recorder metadata without supportive information from the CTI server. VOX MCRs are created from these recorder events and are stored in the VOX History List. When VOX MCRs are completed, they are made persistent in the Local Data Store.

The CRG system will remain in this mode until all of the following conditions occur: (1) the CTI server becomes available; (2) the switch being recorded by this channel becomes available; and (3) a configuration option for the channel indicates it is to be driven from an online CTI server and switch.

Degraded Mode

If a record channel is configured to be driven from a CTI source, only CTI MCRs are entered into the database. These CTI MCRs absorb any recorder metadata that intersects with the time ranges of the CTI events. No VOX MCRs are made persistent. If, however, the CRG detects that the CTI Server, switch, or associated communication paths are down, the channel enters Degraded mode. This mode is similar to Initial mode in that VOX MCRs are made persistent when completed. Any CTI MCRs that were left open at the time the CTI Server went down are closed and updated for the last time. The recorder channel will remain in this state until the three conditions indicated in "Initial Mode" are met. Only then will the recorder channel transition into Normal mode.

Normal Mode

Under normal operating procedures in a system with a CTI server and switch online, MCRs are created whenever a VOX or CTI connect event is received and stored in the appropriate list. For each VOX message received, the CTI History List is swept to see if audio metadata can be absorbed by a matching MCR. Any remaining audio data is placed in a VOX MCR. For CTI events involving updates to Recorder Participants, the list of VOX MCRs is swept to see if audio metadata can be absorbed. CTI MCRs are made persistent to the Local Datastore when first created, upon significant update events, and when completed. VOX MCRs are not made persistent to the Local Datastore as they should be completely absorbed by CTI MCRs. There is a configuration parameter that can enable leftover VOX MCRs to be made persistent when they are removed from the VOX MCR history list.

Transitions from Initial/Degraded to Normal Mode

When a CRG channel is in Initial or Degraded mode, VOX MCRs are recorded into the Local Data Store when completed. If notification is received indicating a recorder channel meets the three criteria indicated in "Initial Mode", the channel is set to Normal mode. From this point on, only CTI based MCRs are made persistent and VOX MCRs will be absorbed by the VOX events. Since CTI events represent an accumulated history of a phone call, prior events occurring while the connection between the CRG and CTI Server was lost (or was not yet established) are nonetheless summarized in each update message. The time spans of Recorder Participant(s) are compared to audio data in the VOX MCR list, with any overlaps causing the audio data to be absorbed. In this way, any audio data that occurred while a connection to an external component is temporarily unavailable will still be capable of being correctly associated.

Transitions from Normal to Initial/Degraded Mode

When the CTI server and switch becomes available for driving the call record creation and processing, the CRG channel enters into Normal mode. A heartbeat message is used to periodically update the status of the switch and CTI Server. When the heartbeat is lost or there is a message indicating one the components has gone down, the recorder channel switches to Degraded mode. The CRG will still create and maintain MCRs in the VOX list and force MCR closure on open CTI MCRs as they pass out of the CTI history buffer. The sweeping action of audio metadata among incomplete CTI MCRs will cease, preventing all future audio data from being absorbed by it. VOX MCRs are made persistent in the database when they leave the history buffer.

Trunked Radio Mode

In an alternate embodiment of the subject invention, fields in the call record structure are added to support trunking radio. Information contributing to these fields may be obtained from communications with a Motorola SmartZone system. This system uses the Air Traffic Information Access (ATIA) protocol to communicate metadata related to radio activity. The embodiment has a trunking radio server similar to the CTI server that provides an interface between the SmartZone system and the recorders of the preferred system. This server provides the normalization of data and distribution to the correct recorder. There are currently two modes of operation of the Motorola trunking radio system that are discussed below.

Message Trunking

In this mode, when a radio is keyed, it is assigned a particular frequency to communicate on. When the radio is de-keyed, a message timeout timer (2–6 seconds) is started. If another radio in the talk group keys up during this time, the controller uses the same frequency for transmission and resets the timer. The conversation will remain on this frequency until the timer is allowed to expire. During this time, all events that are reported with respect to this conversation will have the same call number associated with them. Therefore, the concept of CTI based call records with many participants has been applied to Message Trunking.

If the timer is allowed to expire, future radio transmissions will be assigned to another frequency and call number. The server needs to detect this occurrence and properly terminate a call record.

Transmission Trunking

Transmission Trunking does not use the holdover timer mechanism used in Message Trunking. When a radio is keyed, it is assigned a particular frequency for transmission. When de-keyed, the channel frequency is immediately freed up for use by another talk group. Therefore, a conversation can take place over many channels without a call number to associate them. The concept of VOX based call records which contain one radio clip per MCR is used in this mode.

Selective Record

There may be certain phone calls involving extension or agents that are not to be recorded. Selective Record is a feature that tells the system to refrain from recording a call while a certain condition exists.

Virtual CRG

MCRs can exist in the subject system's database that have no audio associated with them. These non-audio MCRs can be created due to different features of the subject system. Some customers may require that all CTI data coming from their switch be saved even though they are not recording all extensions or trunk lines. By creating records from the CTI data alone, in the absence of recorded audio, this mode of operation can provide the customer with useful information for statistical analysis or charting purposes. Likewise, records created based upon CTI data alone may provide a useful audit trail to verify the occurrence of certain telephone calls, analyze traffic patterns, or to perform other types of "data mining" operations. In that case, a CRG is associated with the CTI Server mechanism to receive all CTI events that are not matched to a specific recorder. These CTI MCRs are made persistent to the Central Database upon call completion.

Call Record Structure

Call record start and stop events originate from two independent sources: the Recorder and the CTI server. The CRG must perform some method of merging events from these two sources in such a way that the resultant call record contains the best information available. CTI server events are advantageous in that they provide more information than the recorder and can also accurately determine a call record boundary. Recorder based events are a subset of CTI server events and can only distinguish call record boundaries based upon VOX or off/on hook. The recorder has advantages in that since it is in the same box as the CRG, receipt of these events is guaranteed as long as the recorder is running. The main purpose of the assembly process is to leverage the information coming from the CTI server in such a way that the entire phone call is assembled into one Master Call Record (MCR). The structuring of call records is weighed towards trunk side recording with the services of the CTI server driving call record creation. This type of configuration enables the system to summarize phone calls in the most effective manner. The manner in which the structure of the MCR designed to achieve this goal is discussed below.

Master Call Record

The MCR holds information accumulated for all events received necessary for archiving to the local data store. It consists of individual fields that are global to the entire call record as well as lists of specific information. Global information includes identifiers for the call record, the start and stop times of the entire call, the recorder location with respect to the switch, and flags indicating the call record status.

Lists included with each MCR contain the following information: Media File List—List of media filenames that make up the call (e.g., telephone or radio communications); Screen Data Capture File List—List of screen image files associated with audio on this channel; and Participant List—List of participants involved in this call.

The MCR is populated from events received from the CTI Server and Recorders. The following table shows the fields in the MCR, in a preferred embodiment, their data types, description and if they are stored in the database.

| Name | Type (max length) | Archive | Description |
| --- | --- | --- | --- |
| m_CallRecID | string¶ | Y | Unique ID (UUID) pertaining to entire call (Ctl and Trunk Radio server provides same ID for call parts that are related to the same conversation.) |
| m_MetaDataSource | BYTE | Y | Indicates the source used to populate call record information.<br>0 = none<br>1 = CTI<br>2 = Trunking Radio |
| m_bCallComplete | bool | N | Indicates the end of a call. (i.e., there are no more active participants involved) |

Master Call Record structure.

Master Call Record structure.

| Name | Type (max length) | Archive | Description |
|---|---|---|---|
| m_bCallHoldoverExceeded | bool | N | If true, MCR has been in a complete state for a time period exceeding the configured Call Holdover time. |
| m_bMetadataHoldoverExceeded | bool | N | If true, MCR has been inactive for a time period exceeding the configured Metadata holdover period. Used to allow completion of MCRs that haven't been updated for long periods of time possibly because of missed events. |
| m_bLastUpdate | bool | N | true when the CRG has decided to send the last update of this MCR. Used to prevent any future updates. |
| m_bDontArchive | bool | N | Indicates whether this call record is to be archived by data store. Certain record features such as selective record may prevent us from storing this call record. |
| m_CallDirectrion | BYTE | Y | Indicates call origin Outbound = 0 x 12, Inbound = 0 x 21, Internal = 0 x 11, Unknown = 0 x 44 |
| m_CustomerNumber | string† | Y | Variable length character array dedicated to information the switch may provide with the call. For custom call record support. (e.g., account number) |
| m_pRecLoc | RecorderLocation | N | Pointer to recorder location descriptor associated with this channel. (see RecorderLocation class) |
| m_SSFile | list† | Y | List of TimestampedFilename (see below) objects representing Screen Data Capture filename(s) associated with a call record |
| m_Participants | list† | Y | Array of Callparticipants (see below) describing all participants involved in the call |
| m_XactionSema | HANDLE | N | Semaphore used to lock this MCR from being modified by any other threads. |
| m_SemaTimeoutVal | unsigned long | N | Maximum time thread is blocked on m_XactionSema access before returning. |
| m_bModified | bool | N | Set whenever MCR is changed in a way that requires update to the Local Data Store. |
| VOX Call Record (Derived) | | | |
| m_dwVoxCrNum | DWORD | N | Sequence number of first VOX MCR associated with this CTI MCR (if applicable). |
| m_bVoxInProgress | bool | N | Indicates this VOX clip is still active (i.e., End time is default time.) |
| m_CreationTime | time_and_date† | N | Holds time at which the call record was created. Used for debugging purposes to measure how long a call record is alive. |
| m_CloseTime | time_and_date† | N | Local time at which MCR was marked complete. Used for determining when call record is ready for archive. |
| m_MediaFiles | list | N | List of TimestampedFilename classes representing multimedia files used to store data with respect to this call record. |
| m_CtiInfo | CtiInfo | N | Class containing CTI type data associated with call record. |
| Base Call Record (Derived) | | | |
| m_wVersion | WORD | N | Version number of call record. |
| m_StartTime | time_and_date† | Y | Start time of call record |
| m_EndTime | time_and_date† | Y | End time of call record |

| \multicolumn{3}{c}{RecorderLocation} | | |
|---|---|---|
| m_MetadataServerStatus | BYTE | Indicates the status of the metadata server driving call records for this particular recorder location. This source is in most cases the CTI server but can be other servers such as Trunking Radio Server 0 = "down", 1 = "up" |
| m_SwitchStatus | BYTE | Indicates the status of the telephone switch providing call record information for this particular Recorder Location. 0 = "down", 1 = "up" |
| m_ExternMetaDataSource | BYTE | Indicates what external source (if any is contributing call record meta data for this channel 0 = None (recorder only) 2 = CTI server |
| m_ChanID | ChannelIdentifier | Class identifying recorder channel. |
| m_SwitchID | Switch Identifier | Class identifying switch connection point. |
| m_SwitchChars | SwitchCharacteristics | Class identifying characteristics of switch needed by CRG. |

| SwitchIdentifier | | |
|---|---|---|
| m_SwitchNum | WORD | Number identifying switch |
| m_wTrunkID | WORD | Identification of trunk line attached to switch. (Valid only if not equal to −1) |
| m_dwVirtualChannel | DWORD | Identifies time slot of digital line (T1 or E1) of interest. (Valid only if TrunkID is not equal to −1) |
| m_Extension | string† (6) | Extension number (Valid only if m_wTrunkID equals −1) |

| ChannelIdentifier | | |
|---|---|---|
| m_wNode | WORD | Unique number used to distinguish between multiple Voice Servers. |
| m_wChannel | WORD | Unique number used to distinguish between multiple recording input channels within a Voice Server. |
| m_bSignalSupport | bool | Indicates if hardware associated with this channel supports on/off hook signaling. |

| SwitchCharacteristics | | |
|---|---|---|
| m_bTimeSynced | bool | Indicates if switch is synchronized with the system. |
| m_bRealTime | bool | Indicates if switch provides CTI info in realtime (true) or batched and sent periodically (false) |
| m_iCmdTimeOffset | int | Value that indicates any known time offset between events received at the switch versus the time the similar signal is received at the recorder. This value will be used to adjust CTI generated timestamps before comparing to recorder events |
| m_iSwitchTimeOffset | int | For switches that are not time sync'd with the system, this value indicates any known time offset between the switch and the system time. This can be utilized if has some way of updating the time delta between switches and our system on a periodic basis. |

| CtiInfo | | |
|---|---|---|
| RingLength | WORD | Time (in sec) between first ring signal and off hook. |
| DTMFCode | string† (50) | DTMF codes entered during conversation |

| \multicolumn{3}{c}{TimeStampedFilename} | | |
|---|---|---|
| Name | Type | Description |
| m_AFStartTime | Time_and_date† | Start time of audio file |
| m_StartTime | Time_and_date† | Start time of interest |
| m_EndTime | Time_and_date† | End time of interest |
| m_SegStartTime | Time_and_date† | Start time of segment inside file absorbed by this MCR. |
| m_SegEndTime | Time_and_date† | End time of segment inside file absorbed by this MCR. |
| m_PathName | string† (36) | Path describing the Voice Server and directory location where the audio files are located. |
| m_File Name | string† (36) | GUID-based name that uniquely identifies a specific audio segment's recording file. |
| m_wFileType | WORD | bitmap indicating types of media associated with MCR. bit Data 0 Audio Present 2 FAX Present 3 Video Present 3 Screen Capture data Present |
| m_wFileFormat | WORD | Recording format of media data, as defined by Microsoft Corporation's multimedia description file "mmreg.h" |
| m_bNew | bool | Used by local data store to indicate whether this record should be inserted (true) or updated (false) into the database. |

TimeStampedFilename

| Name | Type | Description |
|---|---|---|
| m_bDiscard | bool | If true, don't allow playback or archiving of this media. Used for the Selective Record feature. |
| m_dwVoxCrNum | DWORD | Sequence number corresponding to VOX call record that provided this media. |
| m_iAssocPart | int | Index of Recorder Participant in the Participant list causing this media file to be associated with this MCR. |

CallParticipant

| Name | Type | Description |
|---|---|---|
| m_AgentID | string† (24) | Registered ID of agent at extension (CTI) or Radio Alias (Trunking Radio). |
| m_Number | string† (24) | Full telephone number of the participant (i.e., ANI, DNIS) |
| m_Console | string† (10) | Seating position of participant that can consist of one or more stations (CTI) or Talkgroup ID (Trunking Radio). |
| m_Station | string† (10) | Unique telephone set. Possibly with multiple extensions |
| m_LocRef | BYTE | Describes the location of participant with respect to the switch. (1=internal, 2= external, 3=unknown) |
| m_SwitchLoc | SwitchIdentifier | Class identifying the position of a participant relative to the telephone switch. |
| m_StartTime | Time_and_date† | Time participant joined the call |
| m_EndTime | Time_and_date† | Time participant left the call |
| m_ConnectReason | BYTE | How participant joined the call<br>NotConnected = 0,<br>NormalStart = 1,<br>ConferenceAdd = 2,<br>TransferRecv = 3,<br>UnknownConnect = 9 |
| m_DisconnectReason | BYTE | How participant left the call<br>NotDisconnected = 0,<br>NormalEnd = 1,<br>ConferenceDrop = 2,<br>TransferAway = 3,<br>OtherPartyHangup = 4,<br>UnknownConnect = 9 |
| Changed | Bool | Indicates if recent change in CTI message. (not archived) |
| Trunking Radio Only Information | | |
| SourceSiteID | BYTE | Site number that is currently sourcing audio on active call. |
| ZoneID | BYTE | Zone at which participant is currently located. |
| CIUNumber | BYTE | Console Interface Unit. Translates 12kbit into clear audio & vice versa. |
| CDLNumber | BYTE | Channel associated with CIU |

CallParticipant

| Name | Type | Description |
|---|---|---|
| DIUNumber | BYTE | Digital Interface Unit. Translates ASTRO clear secure data into analog audio & vice versa. |
| DBLNumber | BYTE | Channel associated with DIU |

† -Objectspace data types

Unused string fields are null. Unused number fields are set to zero.

The version number is used to indicate the structure of data contained within the call record. In order to maintain compatibility with future versions, changes to call record structures will be performed in an additive nature. That is, current members of the call record will not change in position, size, or meaning.

Each call record will contain a list to store participant information. There will be at least two participants in a call record; the calling and called parties. Any additional connections that are conferenced in or transferred to are appended to the end of this list.

Only one active VOX and CTI based Master Call Record is allowed per recording input channel at any given time.

CRG Software Architecture

Figure 18:
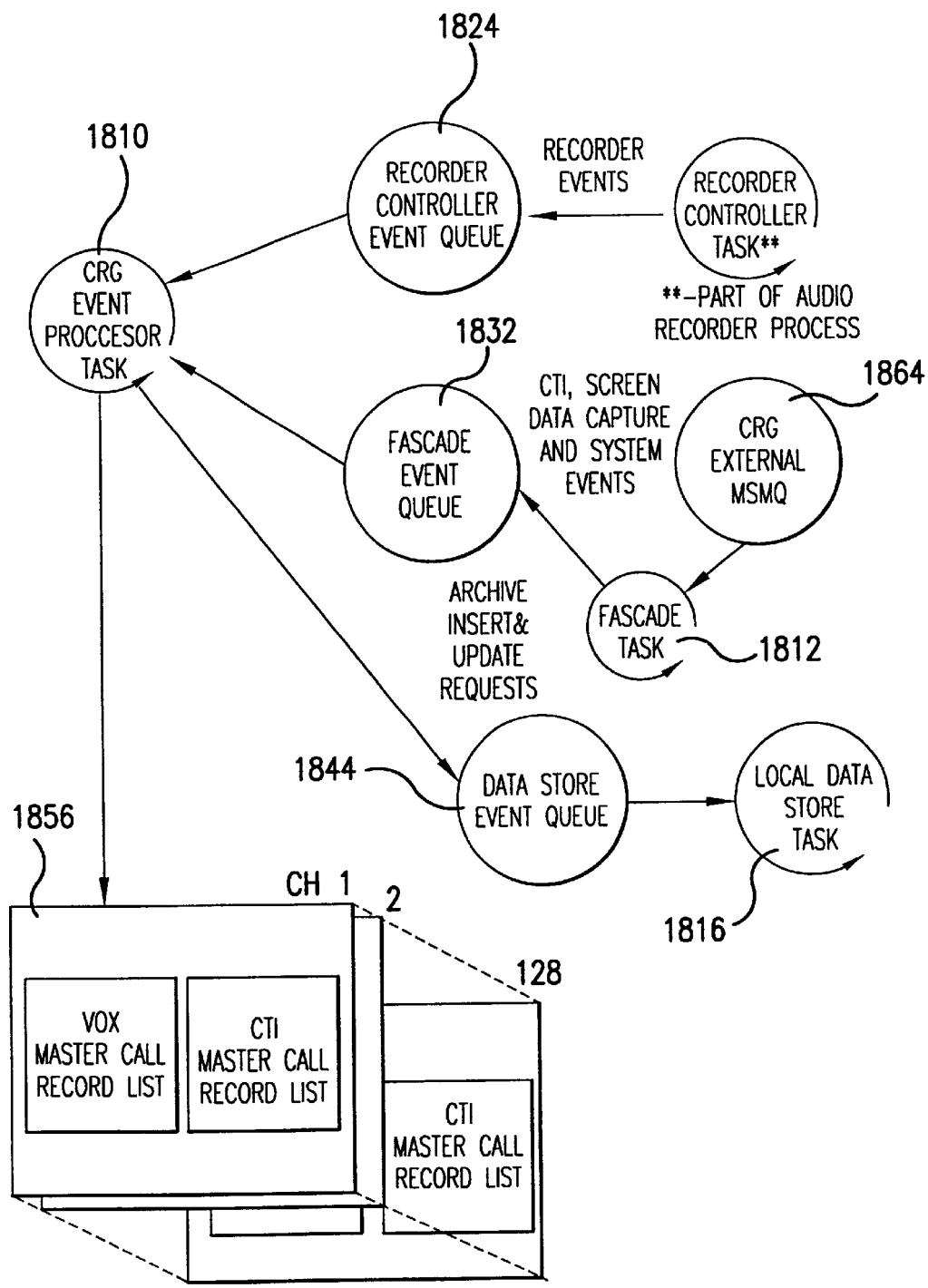
FIG. 18 shows the processing threads and data structures that comprise the CRG module in accordance with the present invention.

FIG. 18 shows the processing threads and data structures that comprise the CRG module in a preferred embodiment.

Event Processing

When the CRG is created and initialized, three threads are created. These threads are the CRG Event Processor thread 1810, Façade thread (The terms "façade," "facade," and "fascade" are used interchangeably in this disclosure) 1812 and Local Data Store thread 1816. Additionally, three message queues are created and are known as the Recorder 1824, Façade 1832, and Data Store 1844 queues, respectively. These queues enable the processing of various input messages in a de-coupled fashion within the CRG, so that any delay in one area of communications does not affect the processing of another area. Each thread is described below.

Event Processor Thread

The Event Processor is the primary thread of the CRG module. Its responsibilities include reading any messages placed in the Recorder 1824 and Façade 1832 queues. The processing activities that occur in response to these messages cause updates to be made to call records belonging to one of the recording input channels 1856. If these changes cause a call record to be completed, a message is sent to the Date Store queue 1844 requesting that the call record be made persistent in the local database. This thread is also responsible for processing state change messages, that cause memory resident structures to be refreshed or to shut down the CRG module.

Façade Thread

The Façade thread handles messages that come from outside the Voice Server. Its primary function is to look for messages placed in the CRG's external Microsoft Message Queue (MSMQ) 1864 where events may arrive from other components within the overall subject system. Upon receipt of a message, the Façade thread reads the message, translates it into an appropriate format for the CRG's internal data structures, and places the translated copy in the Façade Queue 1832. This thread is known as the Façade, because it manages the external interactions of the CRG with the other components within the subject system.

Local Data Store Thread

The Local Data Store thread 1816 processes requests from the CRG Event Processor thread 1810. The primary purpose of the Local Data Store thread 1816 is to take internal Master Call Record (MCR) structures and translate their contents into structures compatible with database technologies, such as Microsoft SQL Server, or comparable types of storage means. These resultant structures are stored within the database in order to make the call record persistent.

Characteristics of some switches mandate that the CRG be able to handle CTI events that are not real-time. Some switches batch events and send them out periodically. CRG configuration settings that limit the history list by time must be set long enough to accommodate the switch characteristics. Therefore, call records that are generated between switch reports (via recorder events) will not be finalized until a configurable time period (window) after which the call record terminated. This window (CallHoldoverPeriod) needs to be set to a minimum of the period of time between switch reports. Once a call record leaves this time window, it is marked as read-only and committed to the local data store.

A situation that must be dealt with is when the telephone switch is not time synchronized with the rest of the system. To facilitate the merger of recorder and switch events effectively in non-time-synchronized systems, alternate embodiments of the subject system are described.

One alternate embodiment of the subject system has a mechanism that synchronizes the clocks in the system (manually or automatically) on a periodic basis. This must guarantee time skews of less than some small and known quantity. A second embodiment has a mechanism for measuring the time delta between the switch and the subject system. This value is updated periodically and used by the CRG during the merging process. A third embodiment implements a combination of the first two.

During the call record merging process, a global time delta is used to adjust switch event time stamps before comparing to existing call record data.

The following paragraphs define the types of events the CRG is designed to accept and process. These events may cause the CRG to initialize, process metadata into call records, or prepare the system for shutdown.

The Master Controller (a sub-component of the present system's Scheduling & Control Services) supplies system events. The Master Controller notifies the CRG of system related changes such as configuration changes, CTI server status and system shutdown events. The CRG changes its behavior based upon events received from the Master Controller.

System Events

The CRG provides an interface that allows the client application to control its states of operation. This is accomplished with an interface class that is used by most system components in the subject system. The interface is named IProcCtrl and supports the following methods: Initialize( ); Start( ); Stop( ); Pause( ); Resume( ); Ping( ); and Shutdown( ).

In addition to these methods, the CRG supports two event messages that inform it of status changes that are needed to either update its memory resident configuration information or change its mode of operation. These methods are CtiStatus and AgentExtensionStatus. Each method is described in the following paragraphs.

Initialization Event

This method is the first method that should be called after the CRG has been created. When the CRG object is created, it retrieves configuration information from the subject system's database. This information describes the number of channels in the recorder, the switch location where each channel is connected, any fixed associations of telephone extensions or agent identifiers. Also included are parameters that determine the behavior of the CRG. Threads are spawned to handle the processing of CRG events, communicating with external metadata contributors, and processing information into the Call Records tables. These threads are created in a suspended state and require the Start or Resume commands to begin processing activity.

Start Event

This method should be called after the Initialization event. It resumes all threads of the CRG enabling it to process incoming events.

Pause Event

This method suspends all threads of the CRG.

Resume Event

This method is called after the Pause command to enable all CRG threads to continue processing.

Ping Event

This method is used by client applications to test the connection to the CRG. The method simply returns a positive acknowledgment to let the client know that the CRG is still running.

Shutdown Event

This method notifies the CRG when the subject system is shutting down so that it can cleanly terminate itself. The shutdown event supports a single parameter (ShutdownMode) that indicates how it should shutdown.

If the ShutdownMode is specified as "Normal", all pending events read from the input event queues and processed into the call records, any open call records remaining are closed at the current time and written to the database.

If the ShutdownMode is "Immediate", input event queues are cleared without processing into call records, open call records are closed and written to the database.

Once these actions are completed, the CRG threads terminate. At this point, it is now safe for the client application to release the resources of the CRG.

Stop Event

This method is implemented for consistency with the common interface of IProcCtrl. The CRG has no purpose for this method and just returns a positive acknowledgment.

CtiStatus Event

This event informs the CRG of the operational status of the CTI server that is providing it with telephony metadata needed for CTI call record generation. The Scheduler component of the subject system is responsible for maintaining a heartbeat with the CTI server to detect when connection has been lost. Any changes in CTI server status result in a CtiStatus message directed at the CRG.

This message contains one parameter that indicates the new state of the CTI Server. If the parameter indicates that a CTI Server has become operational, recording input channels associated with the CTI Server change from "Degraded" mode of operation of "Normal" mode. If the parameter indicates that the CTI Server is not operational, recording input channels associated with the CTI Server change from "Normal" mode of operation to "Degraded" mode.

AgentExtensionStatus Event

This event indicates that a change in one of the Agent or Extension tables has occurred. Since the CRG uses these tables to associate with recorder channels, the memory resident version must be updated. Therefore, this event causes the CRG to read these tables and update its memory resident copy.

Call Record Events

When a call record event is received, the message is interpreted to determine which recording input channel may be affected. Any filtering necessary on a per channel basis is performed at this stage. Call record events are then dispatched to the appropriate Call Record Channel Manager. There is a separate call record channel manager, which is a software sub-component of the CRG, for each recording input channel in a Voice Server. There are three messages that directly contribute to the creation and completion of call records. One comes from the CTI Server in the form of a CTI Event. The other two originate from the recorder and are the VoxSummary and VoxDisconnect messages. Each message is described in detail below.

CTI Event

The CTI Event is a message originating from the CTI Server software module that processes the information received from the telephone switch. The message details each participant involved with the phone call as well as information global to the call such as ring duration and DTMF codes. A CTI event message is sent to the CRG whenever a change in participant status occurs as well as when new ones enter the call. The messages are cumulative in that all information of the previous messages is contained in the new one with any additions included. This makes for a more robust system in cases where one of the messages is lost.

The pseudo code for processing a CTI event is shown below:

Pseudo Code for CTI Event
// - - - CTI Event (BEGIN) - - -
// Don't process CTI events if we're not in correct mode
Is this recorder channel configured to receive CTI event data?
{// Yes
Does this event match an MCR in my CTI History list?
{// Yes
   Update MCR participants with matching one in CTI event
   Add any new participants to MCR.

UpdateMediaFiles( ) (see pseudo code)

}// End—Does this event match an MCR in my history list?
Otherwise
{
   Create new MCR
   Initialize MCR Start time from Oldest Participant Start time in event
   Copy participants from event to message to MCR.
   // Now that we've updated the participants, see if
   // we need to change media file associations.
   UpdateMediaFiles( ) (see pseudo code)

Insert new MCR Into Cti MCR history list.
}

Are there any participants still active?
   Mark MCR as active
Otherwise
   Mark MCR as complete
}// End—Is this recorder channel configured to receive CTI event data?
// - - - CTI Event (END) - - -
// - - - UpdateMediaFiles (BEGIN) - - - for each Recorder Participant in the MCR
{
Is this not a new Recorder Participant?
{
   //This participants start and/or end time may have been adjusted.
   //See if audio previously absorbed by it has to be returned to the VOX history list
   FindGiveBackMediaFiles( ) (see pseudo code below)
} for each MCR in VOX History list with a time range that overlaps with this recorder participant
{
   for each media file in this VOX MCR that's timespan overlaps with this recorder participant
   {
   CheckAndApplyMediaFile( ) (see pseudo code)
   }End—for each media file in this VOX MCR that's timespan overlaps with this recorder participant
Did we consume all audio in this VOX MCR?
   Remove VOX MCR from History list and delete it.
}End—for each MCR in VOX History list that's time overlaps with this recorder participant
}End—for each Recorder Participants in the MCR
GiveBackAudio( ) (see pseudo code)
// - - - UpdateMediaFiles (END) - - -

// - - - FindGiveBackMediaFiles (BEGIN) - - - for each media file associated with the given CTI MCR
{
Was this media file contributed from the given recorder participant?
{//Yes
   if media file lies completely outside recorder participant timespan?
   |<- - - Participant Timespan - - - →|
     |←- - - Media File timespan - - - →|
   Move this entire media file to the Giveback list
Otherwise, If media file start time is before the recorder participants start time?
     |←- - - Participant Timespan - - - →|
|←- - - Media File Timespan - - - →|
   Make a copy of this media file and set its end time to the participants start time.
   Add media file to giveback list.
   Set original media files start time to that of recorder participant.
Otherwise, if media file end time is after the recorder participants end time?
|←- - - Participant Timespan - - - →|
   |←- - - Media File Timespan - - - →|
   Make a copy of this media file set its start time to the participants end time.
   Add media file to giveback list.
   Set original media files end time to that of recorder participant.
}
}End—for each media file associated with the given CTI MCR
// - - - FindGiveBackMediaFiles (END) - - -

// - - - GivebackAudio (BEGIN) - - -

// Sweep through VOX MCRs re-populating any giveback audio for all audio portions in given back list {
if we find the VOX MCR this audio originally came from?
{// Yes
    Attempt to merge the give back media file with an existing VOX MCR media file
        that's start or end time is adjacent to this ones.
    Otherwise, associate this media file with the VOX MCR.
}End—if we find the VOX MCR this audio originally came from?
Otherwise
{
    // Original VOX MCR containing this audio file doesn't exist anymore.
    Create a new MCR.
    Associate the giveback media file with the new MCR
    Insert MCR into VOX History list
}
}End—for all audio portions given back
// - - - GivebackAudio (END) - - -

// - - - CheckAndApplyMediaFile (Begin)
Does Recorder Participant span the entire media file?
|<- - - Participant Timespan - - - →|
    |←- - - Media File timespan-→|
Move media file from VOX MCR to Cit MCR.

Otherwise, Does Recorder Participant overlap with media file start time?
|<- - - Participant Times pan - - - →|
    |←- - - Media File timespan - - - →|
Make a copy of this media file and set its end time to the participants end time and associate with recorder participants MCR.
Set the original media files start time to the recorder participants end time.

Otherwise, Does Recorder Participant overlap with media files end time?
    |<- - - Participant Timespan - - - →|
|←- - - Media File timespan - - - →|
Make a copy of this media file and set its start time to the
    participants start time and Make another copy of this
    media file and set its start time to the participants end time
    and associate with VOX MCR. Set the original media files
    end time to the recorder participants start time.
// - - - CheckAndApplyMediaFile (End)
    VOX Summary Event
    The VOX Summary Event is a message originating from
the recorder associated with this CRG. It can be used in one
of two ways.
    The primary use of this message is to indicate the start of
audio activity in real-time. When used in this mode, the
VOXSummary command indicates the beginning of audio
activity. But since the activity is not complete, the end time
is set to indicate that the VOX segment is incomplete. The
end time of incomplete media file is also set in this way. In
this case, a VOX Disconnect message is required to complete the end times.
    The second mode is used to indicate a history of audio
activity. The VOX Summary start and end times reflect the
period of time covered by all accompanying media files. The
media files also have there respective start and end times
filled in. This message is complete and thus requires no
follow up messages. The VOXSummary message is shown
below.

VOX Summary Message Format

| Field Name | Description |
| --- | --- |
| Channel | Recorder channel of audio activity |
| VOXCrNum | Sequence number used to correlate related VOX events. |
| StartTime | time at which audio activity first started |
| EndTime | Time at which last audio activity ended. |
| Media Files | list of multimedia filenames used to store data with respect to this call record. (see below for details) |
| RingLength | Time from start of ring to off hook (in sec) |
| DtmfCodes | String of DTMF codes detected during VOXSummary period |
| ConnectReason | Indication of why VOX segment was started |
| DisconnectReason | Indication of why VOX segment was terminated |

Media File Structure

| Field Name | Description |
| --- | --- |
| FileStartTime | Time corresponding to first byte of audio data in a file. |
| StartTime | Time corresponding to first byte of audio at which activity occurred |
| EndTime | Time corresponding to last byte of audio at which activity occurred |
| FileName | String containing name of audio file. |
| PathName | String describing the location of audio file. |
| iAssocPart | Used by the CRG to indicate with which Recorder Participant this audio segment is associated, when it is part of a CTI-based MCR. |
| dwVOXCrNum | Used by CRG to indicate which MCR in the VOX History list this audio segment originated. |

The pseudo code for processing a VOX Summary event
is shown below.
// - - - VOXSummary (BEGIN) - - -
Is this recorder channel configured to receive CTI event data?
{// Yes
    // Attempt to merge media files in message with CTI based MCRs
    for each CTI MCR in History list
    }
        If any of the given media files fall inside the timespan
            of the Cti MCR?
        { // Yes
            // Merge media files with overlapping recorder participants in CTI MCR
            for each given media file in VOX Summary message
                for each recorder participant in the given CTI MCR
                {
                    CheckAndApplyMediaFile ( ) (see psuedo code)
                } End—for each recorder participant in the given CTI MCR
            } End—for each given media file
        } End—If any of the given media files fall inside the timespan of the Cti MCR?
} End—for each CTI MCR in History list
Remove media files from VOX Summary message that are
    completely consumed
}

Any unabsorbed audio remaining in message?

{ // Yes

Create MCR for remainder of audio.
Insert MCR into VOX History List
}
// - - - VOXSummary (END) - - -
VOX Disconnect Event
The VOX Disconnect Event is a message originating from the recorder associated with this CRG. It is used to terminate a VOX segment that has been started by a real-time VOX-Summary message.
The VOXDisconnect message is shown below.

| VOX Disconnect Message Format | |
|---|---|
| Field Name | Description |
| Channel | Recorder channel of audio activity |
| VOXCrNum | Sequence number used to corrolate related VOX events. |
| Time | End time of the VOX segment. Also indicates the end time of open media file. |
| DisconnectReason | Indication of why VOX segment was terminated |

The pseudo code for processing a VOX Disconnect event is shown below.

```
// - - - VOXDisconnect (BEGIN) - - -
Is there a MCR in VOX History list with the same sequence number?
{ // Yes
  // Close and update all media files in both VOX and
  // MCR list related to this one
  Close Active media file in VOX MCR at given message time
  UpdateFromMediaFile( )
  // Update any CtiMCRs that absorbed the audio file closed.
  for each MCR in CTI History list
  {
    // Attempt to merge audio with MCR.
    // Look for matches with audio filenames.
    for each media file in Cti MCR contributed by this VOX clip
    {
      Close media file at given message time // Now that we've closed it, does this media file still
      // belong with this CtiMCR?
      Does media file still fall in time span of MCR?
      { // Yes
        CheckAndApplyMediaFile ( ) (see pseudo code)
      }
      Otherwise
      {
        Remove media file from MCR list and discard
      }
    } End—for each media file in MCR contributed by this VOX clip
  }
  Close VOX MCR and mark as complete
}
// - - - VOXDisconnect (END) - - -
// - - - UpdateFromMediaFile (BEGIN) - - -
// Look for matches with audio filenames for each media file in MCR contributed by this VOX clip
{
  Close media file at given message time // Now that we've closed it, does this media file still
  // belong with this CtiMCR?
  Does media file still fall in timespan of MCR?
  { // No
    CheckAndApplyMediaFile ( ) (see psuedo code)
  }
  Otherwise
    Remove media file from MCR list and discard
  }
{ End—for each media file in MCR contributed by this VOX clip
// - - - UpdateFromMediaFile (END) - - -
```

Data Events

Data events are appended to the currently open associated call record. For CTI data events, this pertains to a currently open MCR based upon CTI connect events and containing a matching call record ID. For VOX data events, the currently open VOX call record is affected. If an open call record doesn't exist, an error condition is reported.

Correction Events

Correction events exist to remove a previous alteration to a call record after it has already been populated. One reason for such an event is to support selective record. An audio file that cannot be recorded due to customer or legal reasons might need to be removed from the call record or the entire call record might need to be deleted. The VOX event for a filename might have already been processed into a call record before the selective record mechanism has determined it not to be recorded.

Selective Record (Exclusion)

Selective Record is an important feature of the subject system, imposed by customer requirements. If the customer does not want certain participants recorded when they become involved in a recorded call, the CRG must exclude any audio associated with the call record for that participants' time of involvement. Implementing this feature is complicated by the varying characteristics of customer switches. If the telephone switch environments report events in real-time, recording of media can be prevented by turning the recording input channel off during the selective record participants' time of involvement. However, what happens when events are not reported in real time from the switch? The answer lies in the sweeping action of the CRG previously discussed for recorder participants.

The CTI Event message is routed through the Scheduler, and is altered by the Scheduler to indicate which participants re recorder participants as well as which ones are selective record participants. Recorder participants trigger the CRG to sweep any audio from VOX MCRs that overlap in time. When the CRG detects an overlap between recorder participant and selective record participant times, the audio that is swept into the CTI MCR for this overlap period is discarded. This causes the audio to be removed from both VOX and CTI MCRs, which prevents any chance of the audio being made available for playback or archive.

Selective Record Event

The Selective Record command is an event originating from the Scheduler. It identifies either a participant that is not to be recorded or that an entire call record should not be recorded. In one embodiment the system is capable of handling recording exceptions based upon information obtained from the CTI data. Criteria for selective record processing are discussed below.

Selective Record feature can take on two meanings. In one instance, a customer may want to record all telephony events except for ones that meet specific criteria. In a second instance, a customer may only want to record calls that meet certain criteria.

Since selective recording can possibly be triggered from multiple sources, in a preferred embodiment this decision process is located in the Master Controller, a sub-component of the subject system's Scheduling & Control Services.

Suggested reasons for not recording all or parts of a call are based upon the following examples of CTI event data.

| Event Data | Explanation | Results |
|---|---|---|
| Agent exclusion based upon participants AgentID | Supervisor involved calls not to be included | Delete audio for agent's participation during the call, and the associated references in the MCR. |
| Exclusion based upon Extension or fully qualified phone Number of participant. | CEO involved calls not to be recorded. (whether at office or at home) | Delete audio for agent's participation during the call, and the associated references in the MCR. |
| Combination of AgentID of one participant and fully qualified phone number of another participant | Prisoner calls his lawyer. | Delete all audio as well as the entire call record. |

Based upon these conditions and any future rules established inside the Master Controller (MC), exclusion can take place on audio recorded during a target participant's time of involvement or over the entire call record.

The chain of events involved in Selective Record (Call Exclusion) is as follows:

1. Recorder detects presence of audio and records to audio buffer.
2. Recorder sends VOX events to CRG indicating presence of audio.
3. CRG creates new call record based upon VOX event.
4. The CTI server sends call events to CRG and MC.
5. CRG associates CTI event data with VOX based call record.
6. MC checks for selective record triggers based upon criteria indicated above. If a criterion is met, a Selective Record (exclusion) command is sent to both Recorder and CRG indicating the start of the selective record interval.
7. Recorder deletes audio indicated in selective record message and continues to suppress recording until instructed otherwise.
8. CRG alters the call record to eliminate details of participant or deletes the call record.
9. Upon completion of the call, the CTI Server sends call events to the CRG and MC.
10. MC checks for selective record triggers based upon criteria indicated above. If a criterion is met, a selective record (exclusion) is sent to the Recorder indicating the end of the selective record interval.
11. The Recorder resumes its normal mode of audio recording.

Selective Record (Call Inclusion)

1. The CTI server sends call events to CRG and MC. CRG creates MCR and populates with events. Since default is set not to record, the flag m_bDontArchive is set to prevent the local data store from writing it to the database.
2. MC checks for selective record triggers based upon criteria indicated above. If a criterion is met, a Selective Record (inclusion) command is sent to both Recorder and CRG indicating the start of the selective record interval. CRG sets m_bDontArchive to false and immediately instructs local data store to archive.
3. Recorder detects presence of audio and records to audio buffer.
4. Recorder sends history of VOX events to CRG in a VoxSummary message.
5. CRG creates new call record based upon VOX event.
6. CRG associates CTI event data with VOX based call record.
7. Upon completion of the call, the CTI Server sends call events to the CRG and MC.
8. MC checks for selective record triggers based upon criteria indicated above. If a criterion is met, a selective record (inclusion) command is sent to the Recorder indicating the end of the selective record interval.
9. The Recorder resumes its normal mode of suppressing the audio recording.

The format of the Recorder's Selective Record command is shown below.

| Name | Type | Description |
|---|---|---|
| StartTime | time_and_date | Start Time of recording interval |
| EndTime | Time_and_date | End Time of recording interval |
| bRecordAudio | bool | If true, record audio during the indicated interval. If false, suppress any audio recording during the indicated interval. |

Since the recorder has no knowledge of participants or call record boundaries, the MC needs to inform the recorder when to start a selective record interval and when to stop. The boolean bRecordAudio signifies what action should be taken during this interval.

When an event occurs that triggers the start of a selective record interval, the Recorder's selective record command informs the recorder of the interval start. The End time is most likely not known at this point so it is set to some invalid value in order to indicate that audio should be recorded (or suppressed) for an indefinite period until a subsequent command is received.

When an event occurs that triggers the end of a selective record interval, the Recorder's selective record command informs the recorder of the interval end. The End time indicates when the selective record interval is complete. The recorder returns to its normal recording mode based upon its original configuration.

Any selected audio committed to file needs to be removed from the file and replaced with a silence entry for that period.

The format of the CRG selective record command is shown below.

| Name | Type | Description |
|---|---|---|
| MCR Number | UUID | MCR affected by this selective record command |
| Participant Index | UINT | Index of participant in MCR not to be recorded. (if Reason=1) |
| Reason | BYTE | 1 =Participant, 2=Entire Call |

For the CRG, only a single event that indicates what is selectively recorded is needed. If the Reason code indicates that the entire call record is to be deleted, the CRG will mark the call record such that it is removed from the database if it has already been written or not logged in the first place. If selective record affects a specific participant, the call record can either be left unmodified (since the recorder has already handled deletion of audio) or the participant can be overwritten to remove his/her details.

The system configuration can be adjusted so that the CRG will operate in either fashion, depending on whether removing the audio alone is sufficient for the desired application of the system, or if the metadata must also be removed to eliminate the records of telephone numbers dialed, etc.

CRG Software Implementation

In the preferred embodiment of the subject system, the CRG is implemented as an in-process COM DLL that is associated with the Audio Recorder process, and therefore these two components reside together upon the Voice Server. COM, here, is Common Object Model, a distributed computing architecture designed by Microsoft Corporation to facilitate cooperative processing among software elements on a LAN. DLL is Dynamic Link Library, a means whereby executable code can be encapsulated in a package that can be loaded upon demand and shared by several programs, rather than being packaged as a separate, isolated executable program. The Audio Recorder process is responsible for creating the CRG COM object as well as starting and stopping the CRG subsystem. The Data Store module that interfaces with the CRG is a statically linked DLL.

Class Design

Figure 19:
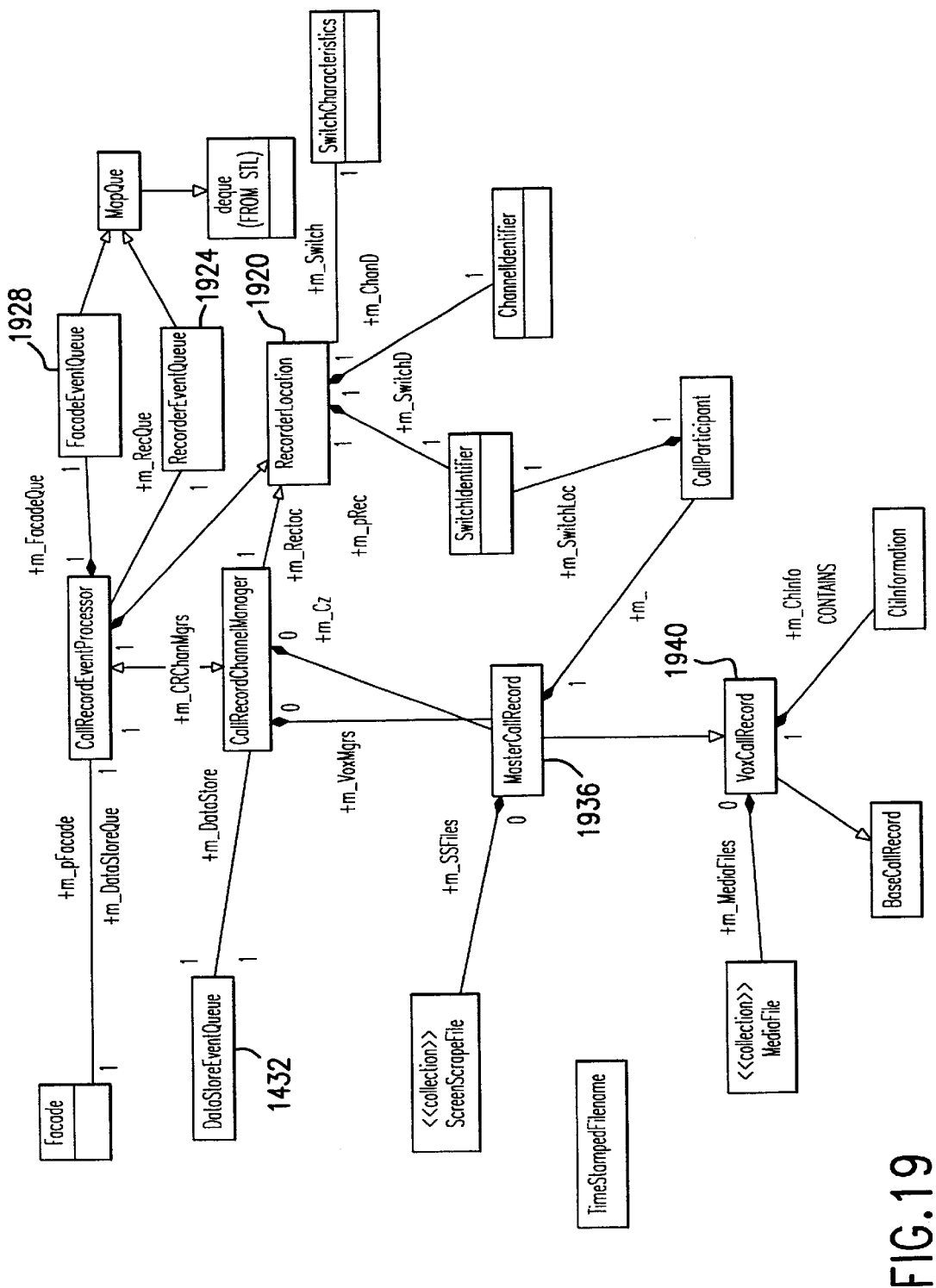
FIG. 19 illustrates the class diagram of the Call Record Generator used in a specific embodiment.

FIG. 19 illustrates the class diagram of the Call Record Generator. The CRG module is itself comprised of a plurality of modules, as shown in the figure, and explained below.

CallRecordEvent Processor—the CallRecordEventProcessor class 1912 is the main class of the CRG. It is instantiated during the Initialize method call of the CRG interface. It is responsible for allocating the rest of the CRG objects. On instantiation, it acquires the channel count for the recorder (currently limited to 128) and instantiates a group a classes for each recording input channel. These classes include a CallRecordChannelManager 1916 and RecorderLocation 1920 for each channel. The CallRecordEventProcessor 1912 creates the Recorder 1924 and Façade 1928 Event input queues. Reading and processing of configuration information from the subject system's database takes place in the CallRecordEventProcessor 1912. Events received that cause a change in configuration are processed there.

CallRecordChannelManager—This class manages the call records for a specific recording input channel. It is responsible for creating, populating, and closing call records with event information received from the CRG event processor. If event information is deemed as significant, the CallRecordChannelManager 1916 will send an event to the DataStoreEventQueue 1932 in order for the update to be reflected in the local data store.

MasterCallRecord—This class 1936 holds information that is global to an entire call. Global information includes identifiers for the call record, the start and stop times of the entire call, the recorder location with respect to the switch, and flags indicating the call record status. It also contains a list of the participants within a call, based upon information supplied by CTI events. It acts as a centralized point of control for merging call record information for a given telephone call.

VoxCallRecord—This class 1940 is a superclass of the MasterCallRecord class 1936. It contains information dealing with events provided by the recorder. It holds the details of a call, such as the start/stop times, media filenames and other data that can be supplied by the recorder.

RecorderLocation—This class 1920 holds the information relating a logical device on a telephony switch with a specific Voice Server and recording input channel.

The following table indicates configuration information needed by the CRG at runtime.

| Configuration Field | Type | Acceptable Values | Default | Description |
| --- | --- | --- | --- | --- |
| sSysTimeCoupling | String | "TIGHT", "LOOSE" | "LOOSE" | Indicates how time-based recorder and CTI events are compared to determine a match. TIGHT - Recorder times must fit entirely inside CTI times for a positive result. LOOSE - Recorder times need to overlap with CTI times for a positive result. |
| nCompleteCallHoldOver Period | DWORD | 0 . . . 4294967296 (in sec) | 90 - For realtime CTI. (Much larger if non-realtime CTI) | Maximum number of seconds that a completed call record is kept in the history list. This holdover allows events coming from different sources to affect the call record before it is made persistent. After this holdover period expires, no more events can update the call record. |
| nActiveCallHoldover-Period | DWORD | 0 . . . 4294967296 (in sec) | 86400 (24 hours) | The maximum number of seconds a call is allowed to exist before being forcibly closed. This is used as a safeguard against missing CTI or Recorder events that would normally end a call record. |
| nMCRMaxSize | WORD | 0 . . . 65535 (in entries) | 100 | Maximum number of entries allowed in the MasterCall Record history list |

-continued

| Configuration Field | Type | Acceptable Values | Default | Description |
| --- | --- | --- | --- | --- |
| nSystemSkew | WORD | 0 ... 65535 (in sec) | 0 | A known, fixed difference (in seconds) that specifies the skew between a Recorder clock and a PBX clock. Used to adjust incoming CTI event times before processing and comparing with Recorder event times. |
| ynCTIDataFromRecorder | bool | 1 = yes 0 = no | yes | Identifies, in cases where Recorder and CTI information overlaps, which source is preferred to populate the call records |
| nSaveVoxClipsLonger-ThanSeconds | WORD | 0 ... 65535 | 6 | This setting is used to avoid creating VOX based call records from noise on recording input channels. It directs the CRG to discard any VOX clips that do not exceed the specified number of seconds in duration. |

Stream Control Manager

As noted above, in a preferred embodiment, the system of the present invention taps into activity on a PBX (Private Branch Exchange) by intercepting audio on either the trunk or extension side of a phone call. The tapped audio is then redirected as input to a channel on a DSP (Digital Signal Processor) based voice processing board, which in turn is digitized and stored into program-addressable buffers. The recorded audio is then combined with descriptive information ("metadata") obtained through a Computer Telephony Integration (CTI) communications link with the PBX and stored as a single manageable unit ("Voicedata") to facilitate its subsequent search and retrieval.

The preferred embodiment leverages Computer Telephony Integration, to supplement the recorded audio data. As discussed above, CTI is provided through a data link from specific telephone switching equipment located at the customer site, which is then input to the recording system's CTI Server. Supplied data includes such items as telephone numbers of involved parties, caller ID/ANI information, DNIS information, and agent ID numbers. The CTI Server performs the task of analyzing and reorganizing data from both the real-time and SMDR (asynchronous) links, and passing the results onwards to the remainder of the recording system for further processing.

A module called the "Call Record Generator," or CRG, discussed above, is then responsible for collecting data from the CTI Server, creating 'master call records' and attempting to match those records with existing recorded audio data. If the CRG receives CTI information indicating that audio data recorded on two Voice Servers is related (for example, due to a transferred call), records will be generated for each portion with a common call record ID. This ID can later be used to query for all the pieces (or "segments") comprising the complete call. In addition, each segment will indicate the Voice Server which contains that piece of the call.

During playback, the User Workstation's player module connects to a program located on a Voice Server called the Playback Server, or PBServer. The machine name of the particular Voice Server with which a communications session should be established, stored by the CRG in the call record table of the Voicedata storage module, is passed into the player module after being extracted by the User Workstation's call record browser. A call record playback request is then submitted, which causes the PBServer to query for a specific call record's audio files located on that physical machine, open them, and prepare to stream the audio upon buffer requests back to the client. If successful, a series of requests is then issued from the client, each of which will obtain just enough audio to play to a waveOut device while maintaining a safety net of extra audio in case of network delays. Upon a request to "Move" within the scope of a call record, the PBServer will reposition its read pointer to the desired location and then begin passing back buffers from that point. This series of Request and Move commands will continue until the user chooses to end the session by shutting down the client-side audio player.

When a call is transferred between locations, it is possible that the call may span multiple Voice Servers, since the extensions or trunks involved may be monitored by different recorders. If this is the case, the audio data is spread out between playback servers, and it must be properly pieced back together to reconstruct the complete call for a playback client.

There are several possible solutions to the problem. First of all, one could choose one central server and copy in all data from the involved servers. This is as slow as copying the files locally to the client, but it at least consolidates the data to one location for the playback server to operate on. Assuming that this method is chosen, however, several new problems arise. First is the issue of drive space: depending on the number of transfers and recorders involved with a call record, the central playback server could end up suddenly storing a large number of files. This is multiplied by the total number of clients requesting playback sessions. Soon enough, a large amount of unpredictable space is being allocated and freed without any reasonable way of estimating the space necessary to service all requests. Similarly, the processor and memory load on this server is taking the brunt of being used for every playback request, since even normal, single recorder playback sessions would be routed through this one machine.

Another solution would be to have the central playback server run some intermediate process that would stream all of the data from the multiple servers back to each client, like a "funnel." This would avoid the copying and drive space issues, but there are still two problems. First, the centralizing of this server once again puts the entire load on a single machine. But more importantly, if multiple streams are being funneled through this one location, the server would somehow need to organize the streams so that during playback, they appear to be arranged in the proper order.

The Stream Control Manager (SCM) used in accordance with a preferred embodiment is the result of addressing the issues referred to in the second solution discussed above. With regard to the resource issue, the solution was to simply move the "funneling" module from one central server to the client side. In this way, servers are still providing the actual requested data, but it becomes the client side's responsibility to bring the data together. Yet the SCM remains a separate, COM-based module so encapsulation is still maintained (a client application is not hard-wired directly into the SCM code). This was intentional since other system modules in alternate embodiments of the system need to reuse the SCM to gather playback data (e.g., for phone handset playback support instead of LAN playback support) or to gather audio from a multitude of Voice Servers for long-term offline storage on DAT or DVD media.

The process of stream management begins when the SCM is sent a list of segments which comprise the entire call. Each segment includes the machine name of the Voice Server, the segment's start time, duration, channel ID, and an event callback routine provided by the client which serves as a destination for the final organized data.

Once this list is received and stored as a vector (array), the SCM proceeds to try connecting to all servers required to play back this call. The connection, if successfully established, is associated with its respective segment via a pointer in the segment entry. The connection is also added to an array so that if a subsequent segment's server is the same as an earlier segment, the connection can be reused. This may occur if a call transfers away to a line monitored by a second recorder and is later transferred back again to the original line. If the process cannot complete successfully (i.e., if a Voice Server is malfunctioning), playback is aborted to avoid skipping over any necessary data.

Next, the SCM goes through its list of segments and for each, handshakes with its server through a series of function calls. During this phase, the SCM informs each playback server of the desired segment to stream back by providing its start time, duration, channel ID using the parameter data that was passed in earlier. Once again, if any part of the procedure fails, the entire initialization (and thus playback) is aborted. At the completion of this phase, every server should have loaded all the audio files associated with their portion of the entire data stream. Each is now ready for audio buffer requests.

The SCM then waits for a client to execute a "StartStream" call. In a graphical interface, this would occur, for example, when a user hits a Play button or begins a Save operation. Once this function is called, a separate thread spawns which will handle the entire process.

First, the current play position is checked to see which segment to begin playing on (a Move operation, explained below, controls the manual repositioning of this value). This is determined by looping through all of the segments, adding each segment's duration to a running total. When the current segment's duration added to the total exceeds the play position, that is the segment which contains the current play position.

Once this calculation is complete, a loop begins which starts from the previously determined segment and proceeds through the rest of the segment vector. For each segment, requests are formed for a predetermined buffer size and sent to the associated server. Once a buffer is returned, based on a flag configurable from the client, the SCM will either directly send back this data or "slice" it for the client first before returning it. Here, slicing refers to a process of dividing the buffer into smaller buffers by a least common multiple known as a block align; this is sometimes useful to a client with a graphical component because the interface may need to reflect the amount played in smaller subdivisions.

When it is detected that all data from a segment has been requested, the SCM automatically steps to the next segment (possibly located on a different Voice Server) and begins requesting data from it instead. Because all Voice Servers are pre-loaded with the data and "ready to go," this process takes place in a fraction of a second, and the client does not sense any gap in the audio data being returned. In fact, the only true method for discerning the segment boundaries involves listening for normal, audible indicators of a transfer being made (clicking, ringing, or hearing the voice of a new participant) as provided through the telephone switch environment.

At the close of a play session (e.g., the user hits Stop or Pause in a typical audio playback GUI displayed in conjunction with the GUI described in FIG. 16) a StopStream call is made to the SCM. The thread in turn detects that the stopped state has been entered, exits from the request loop code, and frees up any used resources. Finally, it informs the client that a Stop event has occurred. If the entire call record is played without calling StopStream, the SCM performs the same exit and cleanup code, but informs the client that a Done event has occurred instead.

Movement within the overall stream is straightforward, given the aforementioned method that the SCM uses to determine which segment to begin playing from. A global variable holds the total number of milliseconds of audio data requested thus far. When a Move is performed, the server containing the data at the destination position is told to re-position itself, and the current play position is reset. Now, once StartStream executes again, it will initially start requesting from the server that was just moved to. And because that server had also moved its position pointer ahead, data will not be streamed from the beginning of the segment, but from where the Move position fell within that segment. Thus movement is a synchronized action completely transparent to the client, who is, ultimately, only interested in treating the data as a single stream.

SCM Pseudo-code
1. Initialize receives segment description data (start time, duration, etc.)
   a.) Form a vector of all segments.
   b.) Try to connect to all segments' servers.
   c.) If there is an error connecting to any server, exit.
   d.) Try to initialize each connected server.
   e.) If there is an error initializing any server, exit.
2. If StartStream received:
   a.) Go through segment list. Find segment of current play position.
   b.) Starting with that segment, contact the associated server and begin requesting buffers.
   c.) If option set, divide up buffer into smaller chunks.
   d.) Send buffer(s) to client via event callback.
   e.) Repeat until all data requested for this segment on that server.
   f.) Repeat from step b. with next segment in list.
3. If Stop received:
   a.) Exit from request loop.
   b.) Clean up used resources.
   c.) Send "Stop" event back to client.
4. If Stop not received, but all data from all segments played:
   a.) Exit from request loop.

b.) Clean up used resources.

c.) Send "Done" event back to client.

5. Move received:

a.) Go through segment list. Find segment of desired play position.

b.) Contact the associated server and reposition to that desired position.

c.) Reset current play position variable to reflect change.

Detailed flow diagrams describing SCM operation are provided in FIGS. 20, 20A, 20B, 21, 22, 22A, 22B, and 22C.

Figure 20:
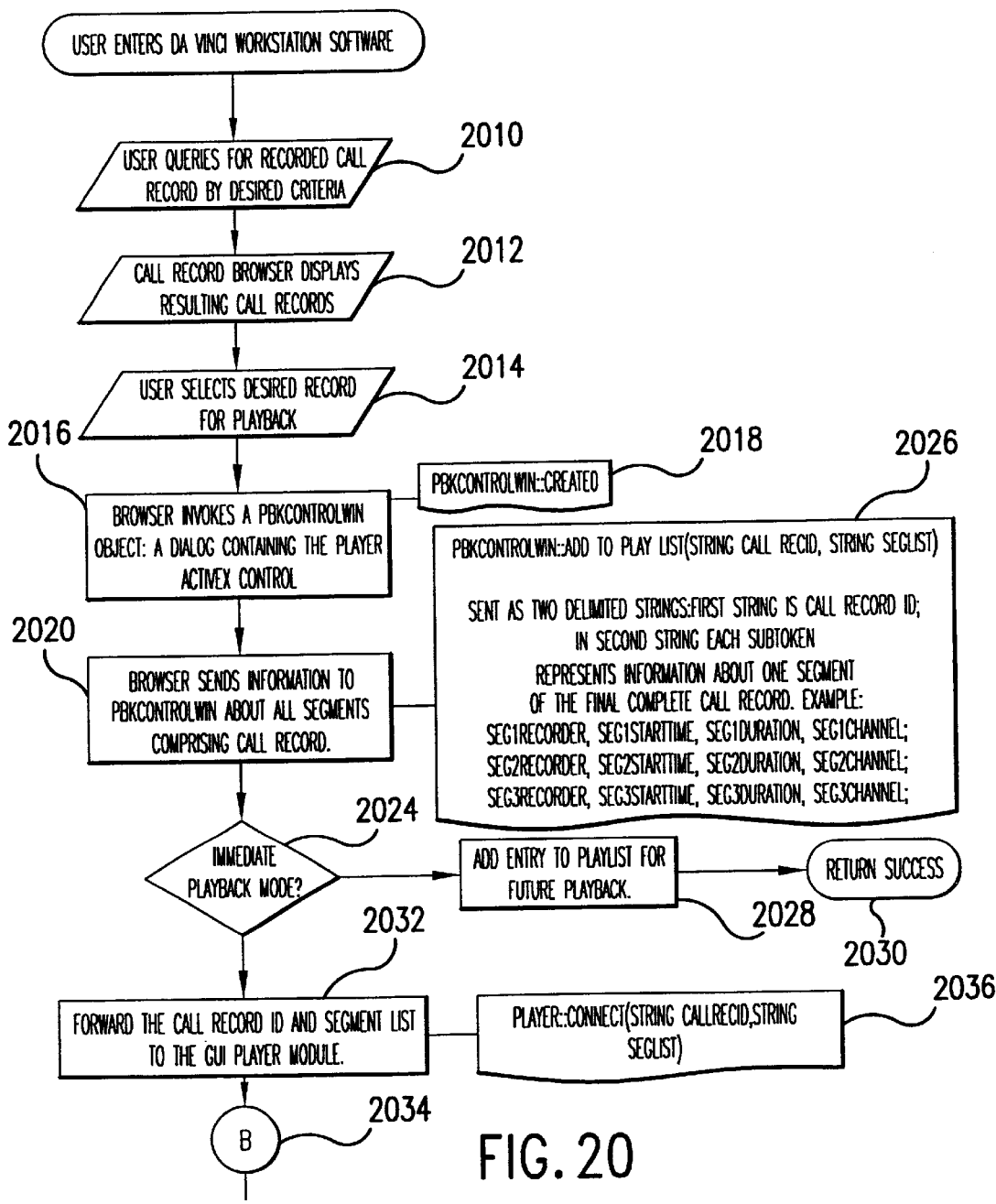
Figure 20B:
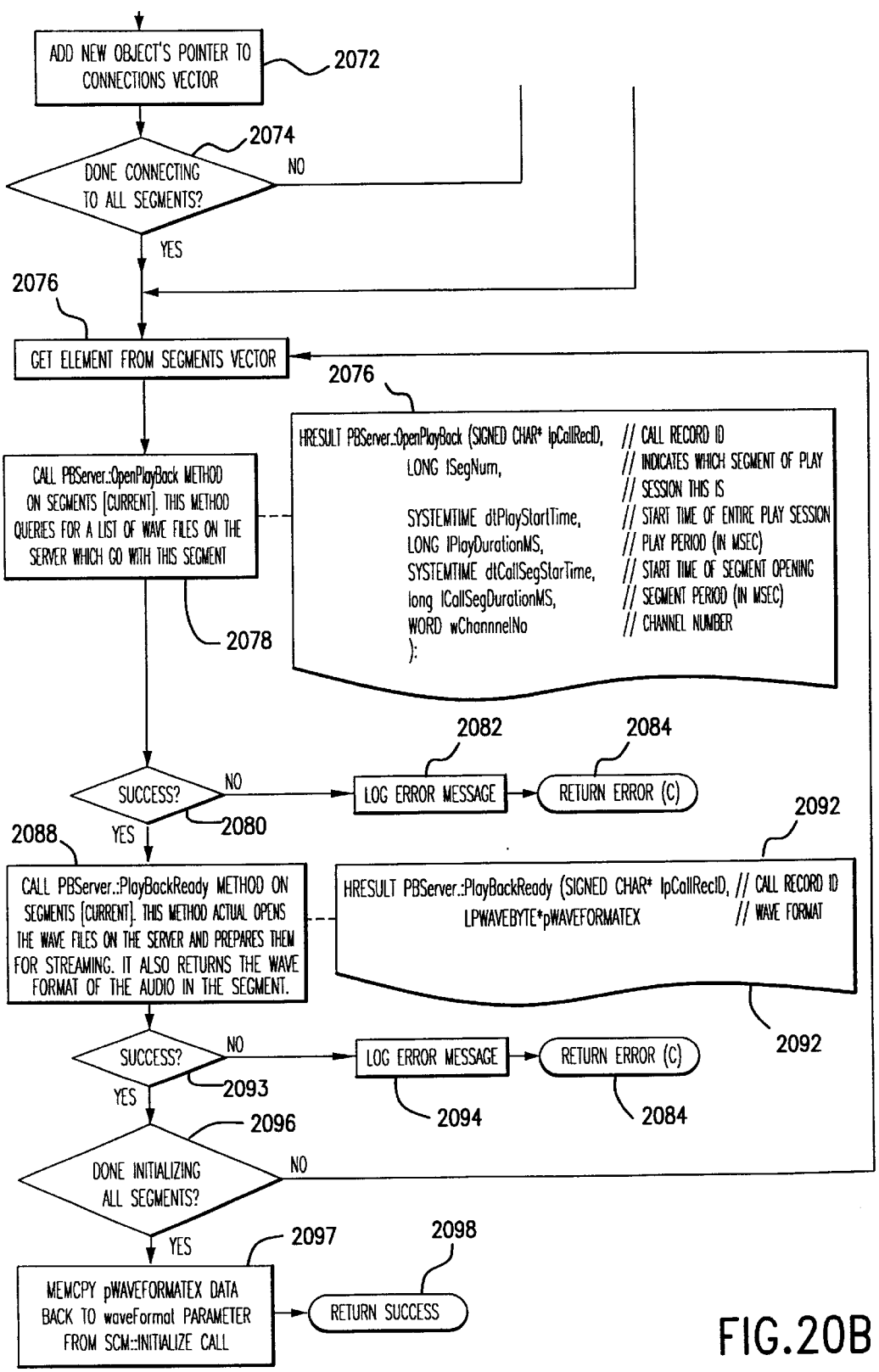

FIG. 20 illustrates the initialization process of the Stream Control Manager. The Initialization Sequence begins when a user enters the User Workstation playback software and at step 2010 queries for a recorded call record by desired criteria. At step 2012 a call record browser displays resulting call records. At step 2014 the user selects the desired record for playback. At step 2016 the browser invokes a PbkControlWin object: a dialog containing the 'player' ActiveX control.

At step 2020 the browser sends information to PbkControlWin about all segments comprising the call record. If at step 2024 immediate playback is not required, at step 2028 the entry is added to a playlist for future playback, and at step 2030 SUCCESS is returned. If at step 2024 immediate playback is required, at step 2032 the call record ID and segment list are forwarded to a GUI Player module. At step 2038 (see FIG. 20A) the player module instantiates a local SCM (StreamControl) object and stores a pointer in m_pIStreamControl. At step 2040 the player module accepts the data, displays starting time and total duration (by parsing out string data), and forwards it to the final module, the Stream Control Manager (SCM), for audio playback.

Step 2046 begins the creation of a segments vector. At step 2046, a segment is parsed out from segList. At step 2048, recorder ID, start time, duration, and channel are parsed out from the segment. At step 2050, a new SEGMENT structure is created from recorder ID, start time, duration, and channel. At step 2052, a new SEGMENT is added to the SEGMENT vector. At step 2054, if all segments have been parsed from segList, at step 2058 an element is gotten from the SEGMENT vector. If at step 2054 more segments remain to be parsed from segList, steps 2046, 2048, 2050, and 2052 are repeated.

After step 2058, the program determines at step 2060 whether a new DCOM connection is required to the recorder for this segment. If not, at step 2062 the existing pointer is copied from the Connections vector to the server pointer in the SEGMENT vector and the program proceeds to step 2076. If at step 2060 the connection is new, a connection is made to the indicated recorder's "PlayBackServer" DCOM object using CoCreateInstanceEx. At step 2066 the program checks whether the object instantiated successfully. If not, at step 2068 a log error message occurs and at step 2070 ERROR (C) is returned. If at step 2066 the object instantiated successfully, at step 2072 (see FIG. 20B) the new object's pointer is added to the Connections vector. At step 2074 the program determines whether all segments have been connected. If not, the program returns to step 2058. If at step 2074 all segments have been connected, at step 2076 an element is gotten from the SEGMENT vector. At step 2078 the program queries for a list of wave files on the server that go with this segment. At step 2080 the program determines whether the query was successful. If not, at step 2082 a log error message occurs, and at step 2084 ERROR (C) is returned.

If at step 2080 the query was successful, at step 2088 the program opens the wave files on the server and prepares them for streaming. It also returns the wave format of the audio in the segment. At step 2093 the program determines whether the wave files and format were obtained successfully. If not, at step 2094 a log error message occurs and at step 2095 ERROR (C) is returned. If step 2088 is determined at step 2093 to have been successful, at step 2096 the program checks whether all segments have been initialized. If not, the program returns to step 2076. If so, step 2097 is performed and at step 2098 SUCCESS is returned.

FIG. 21 illustrates how the program manages a Player Object 2110 and a PbkControlWin Object 2132.

Figure 22:
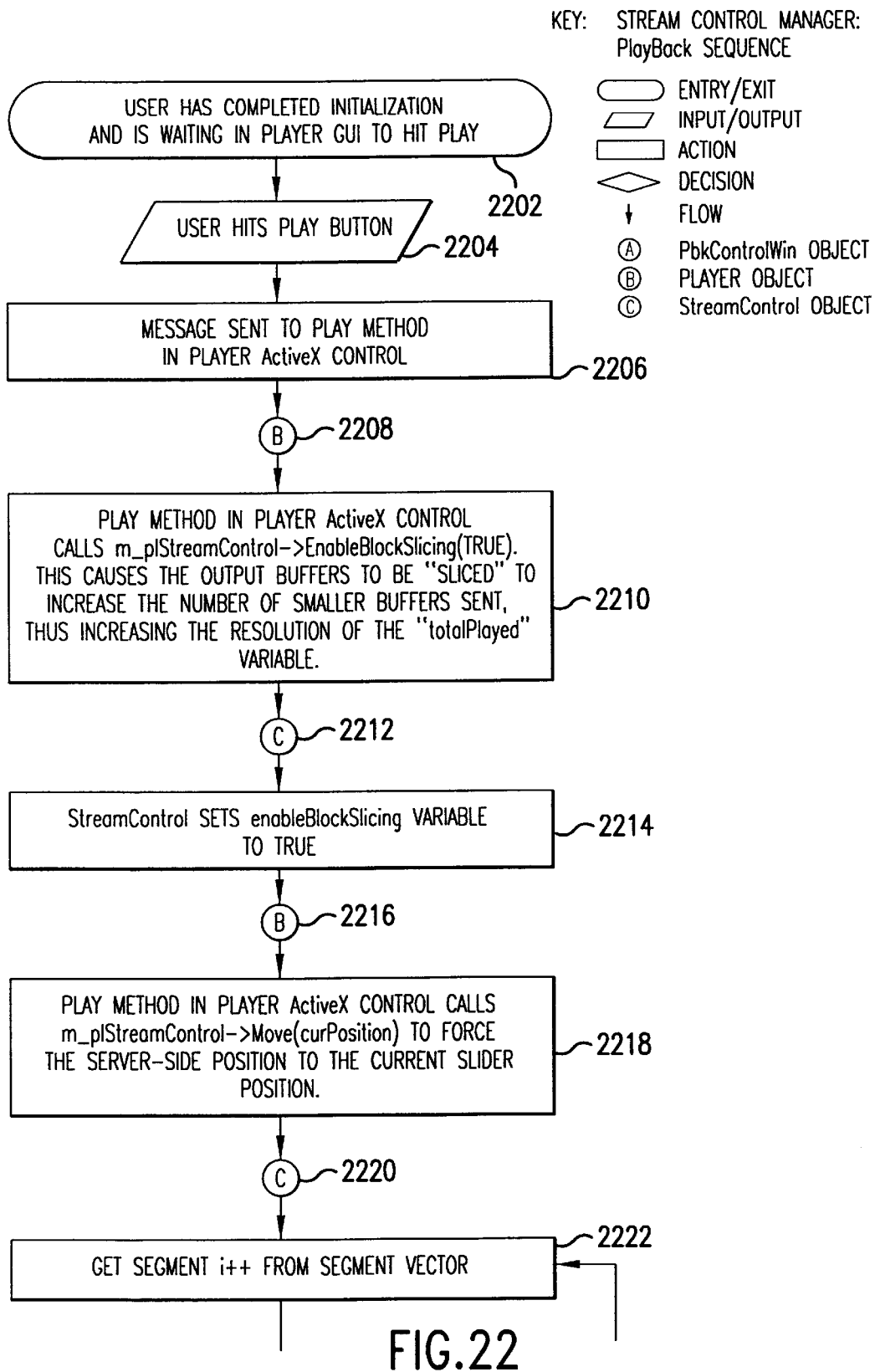
Figure 22A:
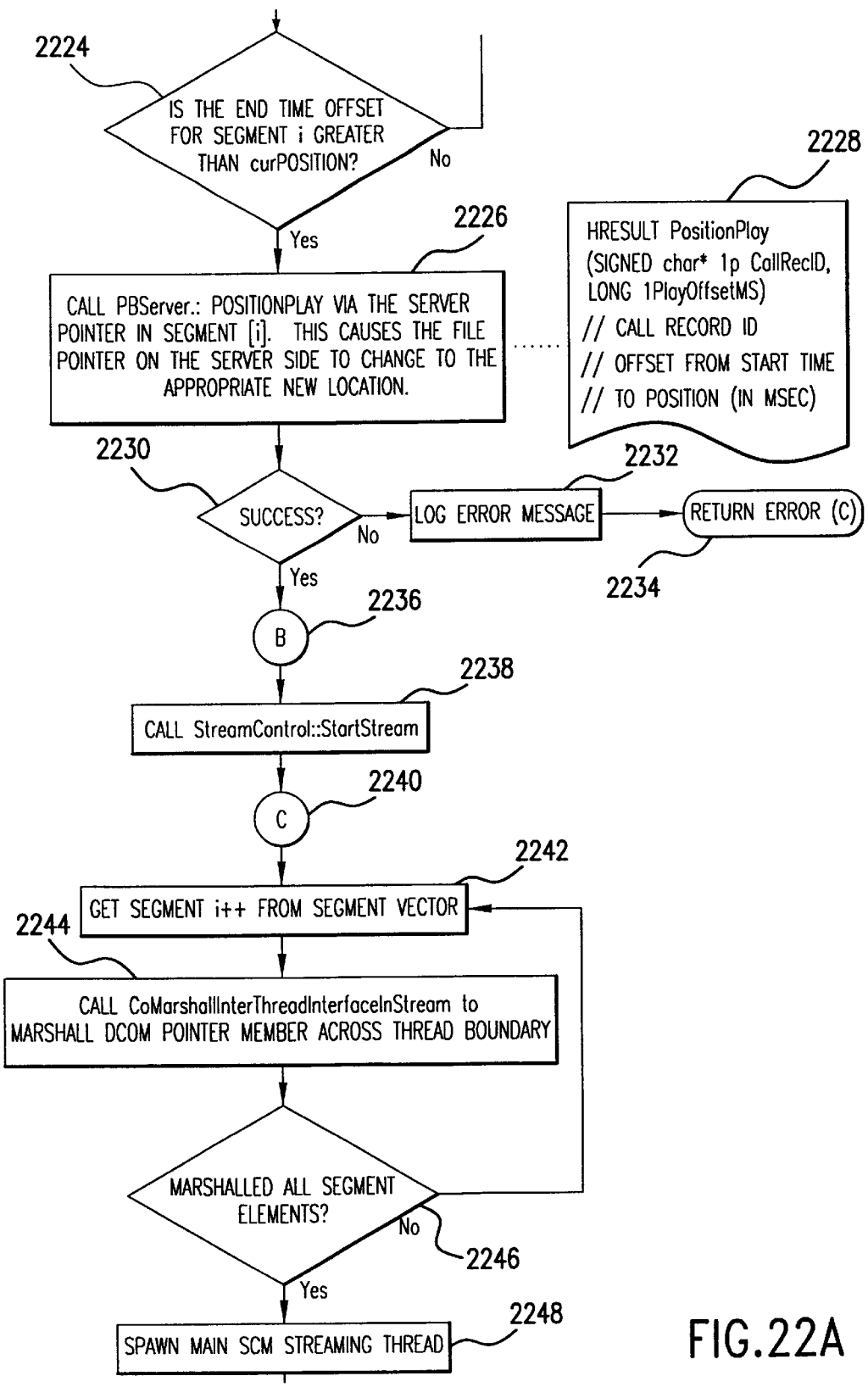

FIG. 22 illustrates the playback sequence of the Stream Control Manager. Initially, at step 2202 a user has completed initialization and is waiting to hit Play in the Player GUI. At step 2204 the user hits the Play button. At step 2206 a message is sent to the Play method in the Player ActiveX control. At step 2210 the Play method in Player ActiveX control causes the output buffers to be "sliced" to increase the number of smaller buffers sent, thus increasing the resolution of the "totalPlayed" variable. At step 2218 Play method causes the server-side position to move to the current slider position. At step 2222 the program gets segment i++ from the SEGMENT vector. At step 2224 (see FIG. 22A) the program determines whether the End Time offset for segment i is greater than curPosition. If not, the program returns to step 2222. If so, the program proceeds to step 2226 and causes the file pointer on the server side to change to the appropriate new location. The program checks at step 2230 whether step 2226 was successful. If not, at step 2232 a log error message occurs and at step 2234 ERROR (C) is returned.

If at step 2230 step 2226 is determined to have been successful, at step 2238 the program calls Stream Control::StartStream. At step 2242 the program gets segment i++ from the SEGMENT vector. At step 2244 the program calls CoMarshalInterThreadInterfaceInStream to marshal a DCOM pointer member across a thread boundary. At step 2246 the program determines whether all SEGMENT elements have been marshaled. If not, the program returns to step 2242. If so, at step 2248 the main SCM streaming thread is spawned.

Figure 22B:
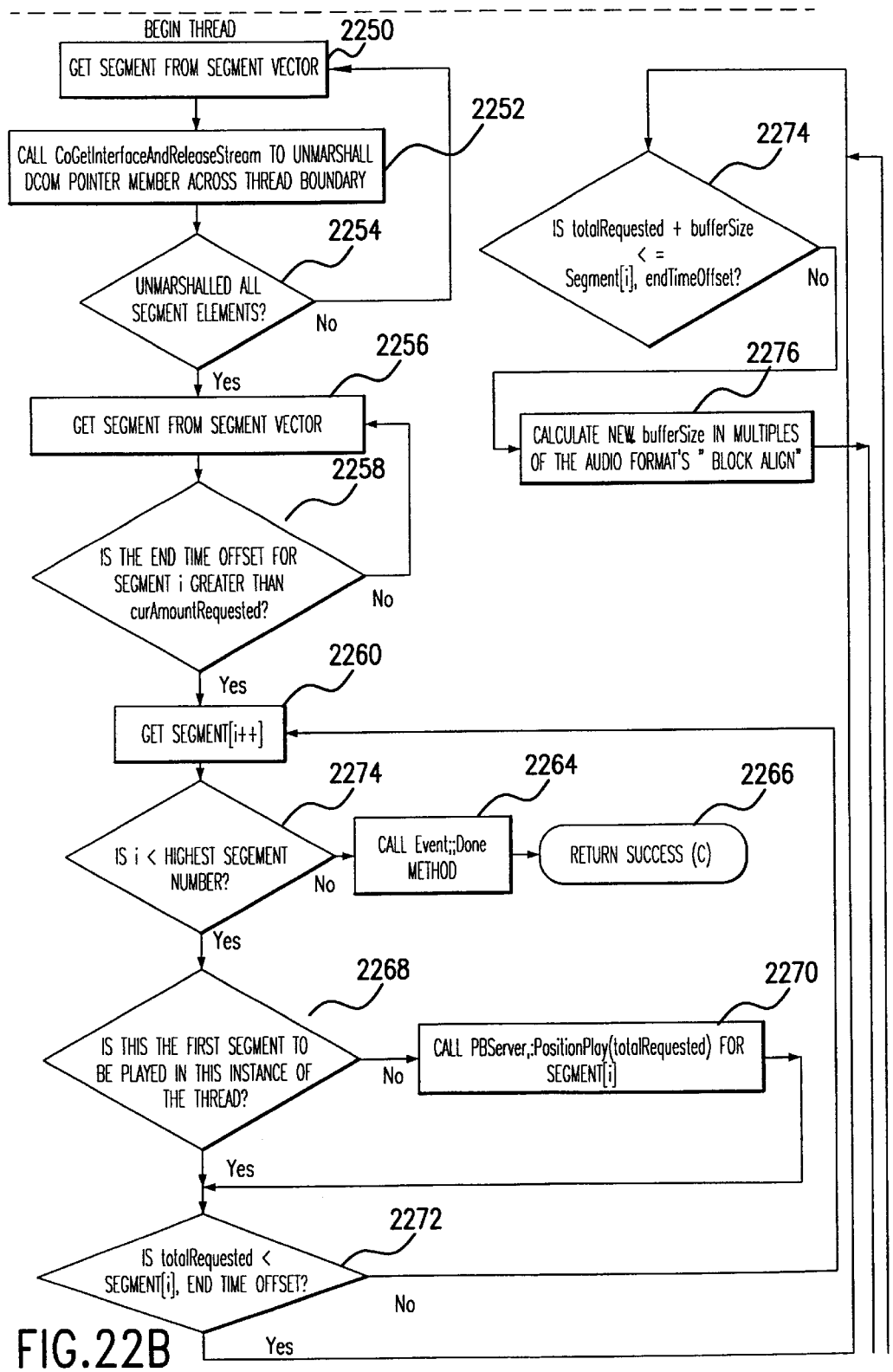
Figure 22C:
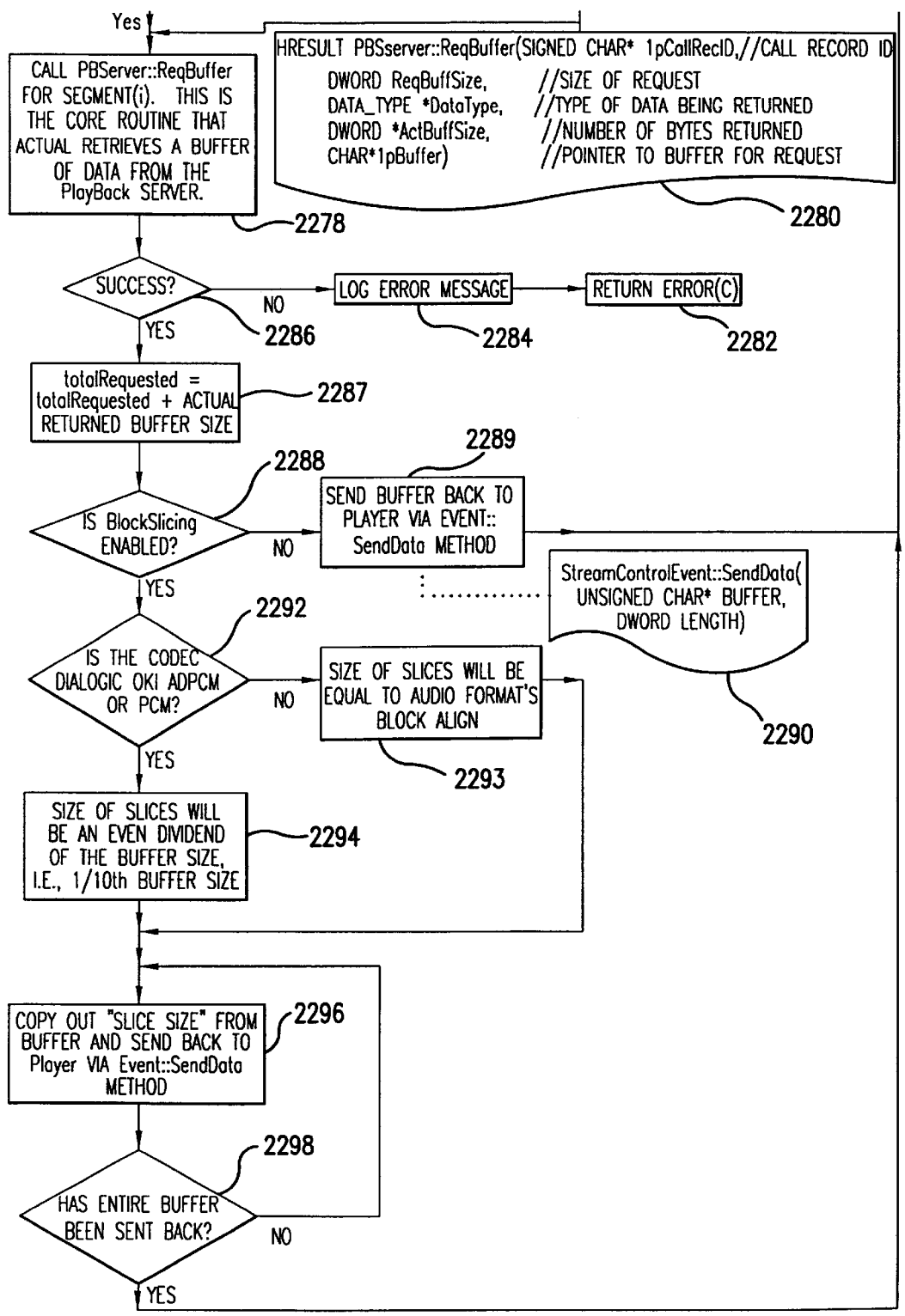

FIG. 22B illustrates an SCM main streaming thread. When the thread begins, at step 2250 the thread gets a segment from the SEGMENT vector. At step 2252 CoCetInterfaceAndReleaseStream is called to unmarshal a DCOM pointer member across the thread boundary. At step 2254 the thread checks whether all SEGMENT elements have been unmarshaled. If not, the thread returns to step 2250. If at step 2250 all SEGMENT elements are determined to have been unmarshaled, at step 2256 the thread gets a segment from the SEGMENT vector. The thread then checks at step 2258 whether the End Time offset for segment i is greater than curAmountRequested. If not, the thread returns to step 2256. If so, at step 2260 the thread gets Segment[i++]. The thread checks at step 2262 whether i is less than the highest segment number. If not, an Event::Done method is called at step 2264, and at step 2266 SUCCESS (C) is returned. If so, at step 2268 the thread determines whether this is the first segment to be played in this instance of the thread. If not, at step 2270 the thread calls PBServer::PositionPLay(totalRequested) for Segment[i] and goes to step 2272. If so, the thread goes directly to step 2272.

At step 2272, the thread checks whether totalRequested is less than Segment[i].endTimeOffset. If not, the thread returns to step 2260. If so, the thread proceeds to step 2274 and checks whether totalRequested plus bufferSize is less than or equal to Segment[i].endTimeOffset. If not, at step 2276 the thread calculates a new bufferSize in multiples of the audio format's "block align." and proceeds to step 2278 (see FIG. 22C). If so, the thread proceeds directly to step 2278. At step 2278, the thread calls PBServer::ReqBuffer for Segment[i]. This is the core routine that actually retrieves a buffer of data from the PlayBack Server. At step 2286 the thread checks whether step 2278 was successful. If not, at step 2284 a log error message occurs, and at step 2282 ERROR (C) is returned.

If at step 2286 the thread determines that step 2278 was successful, at step 2287 toatlRequested is set equal to totalRequested plus Actual returned buffer size. At step 2288, the thread checks whether Blockslicing is enabled. If not, at step 2289 the thread sends the buffer back to the Player via Event::SendData method and returns to step 2274. If BlockSlicing has been enabled, at step 2292 the thread checks whether the CODEC is Dialogic OKI ADPCM or PCM. If not, at step 2293 the slice of the slices is set equal to the audio format's block align and the thread proceeds to step 2296. If so, at step 2294 the size of the slices is set to an even dividend of the buffer size (e.g., one-tenth of the buffer size). At step 2296, the thread copies out "slice size" from the buffer and sends it back to Player via Event::SendData method. At step 2298 the thread checks whether the entire buffer has been sent back. If not, the thread returns to step 2298. If so, the thread returns to step 2274.

The Stream Control Manager could theoretically be adapted to be used in more general streaming media situations, outside that of communications recording systems. In most current stream-based systems for network-based playback of audio content, such as RealMedia and NetShow, two general broadcast architectures exist known as unicast and multicast. Unicast involves a single client-server connection for data streaming, while in the multicast scenario a server pushes data to a single network address which multiple clients can then "tune in" to. However both models assume that data is being continuously fed from a single server. In the interest of load balancing, or if pieces of a streaming presentation were spread out across multiple locations, the SCM model could provide an innovative solution where the client side has the power to weave together many streams into a single playback session. An example could be imagined where a news organization, such as CNN, dynamically assembles a streaming broadcast for the online viewer from many different reports located on servers across the country. The components could be played seamlessly end-on-end using the SCM model, and if the viewer desired to rewind or fast-forward to a specific point in the stream, the SCM model would allow for complete transparent control.

The present invention is not to be limited in scope by the specific embodiments described herein. Indeed, modifications of the preferred embodiment in addition to those described herein will become apparent to those skilled in the art from the foregoing description and accompanying figures. Doubtless, numerous other embodiments can be conceived that would not depart from the teaching of the present invention, which scope is defined by the following claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similiar features.

What is claimed is:

1. A system for recording information regarding telephone calls comprising one or more segments, comprising:
   (a) a first memory having one or more locations storing audio data regarding telephone call segments relating to one or more telephone calls;
   (b) a second memory having one or more locations storing data regarding telephony events associated with the telephone call segments; and
   (c) a processor programmed to identify telephone call segments that relate to one telephone call and to construct a data representation of a lifetime of the telephone call, using data regarding telephony events associated with the telephone call segments of the telephone call, wherein said data representation comprises
      (i) a list of participants in the telephone call,
      (ii) a list of telephony events regarding the call,
      (iii) a list containing the time each telephony event occurred,
      (iv) the start and end time of the call, and
      (v) the start time, end time, and duration of each telephone call segment.

2. A system for recording information regarding telephone calls comprising one or more segments, comprising:
   (a) a first memory having one or more locations storing audio data regarding telephone call segments relating to one or more telephone calls;
   (b) a second memory having one or more locations storing data regarding telephony events associated with the telephone call segments; and
   (c) a processor programmed to identify telephone call segments that relate to one telephone call and to construct a data representation of a lifetime of the telephone call, using data regarding telephony events associated with the telephone call segments of the telephone call, wherein the data representation comprises, for each segment of the call, the location of the stored audio data of the segment and the start time, end time, and duration of each telephone call segment.

3. A system for recording information regarding telephone calls comprising one or more segments, comprising:
   (a) a first memory having one or more locations storing audio data regarding telephone call segments relating to one or more telephone calls;
   (b) a second memory having one or more locations storing data regarding telephony events associated with the telephone call segments, said data regarding telephony events being received from a plurality of sources connected to a telephone switching environment, and wherein at least one of the sources is a real-time link and at least one of the sources is not a real-time link; and
   (c) a processor programmed to identify telephone call segments that relate to one telephone call and to construct a data representation of a lifetime of the telephone call, using data regarding telephony events associated with the telephone call segments of the telephone call.

4. The system of claim 3 wherein at least one of the sources connected to a telephone switching environment is a CTI link and at least one of the sources is an SMDR link.

5. A method for recording information regarding telephone calls comprising one or more segments, comprising:
   (a) receiving audio data regarding one or more telephone call segments relating to one or more telephone calls, and data regarding telephony events associated with said telephone call segments;

(b) storing the received audio data regarding telephone call segments;

(c) storing the received data regarding telephony events associated with said telephone call segments;

(d) identifying telephone call segments that relate to one telephone call; and (e) constructing a data representation of a lifetime of the telephone call using data regarding telephony events associated with the telephone call segments of the telephone call, wherein the data representation comprises
  (i) a list of participants in the telephone call,
  (ii) a list of telephony events regarding the call,
  (iii) a list containing the time each telephony event occurred,
  (iv) the start and end time of the call, and
  (v) the start time, end time, and duration of each telephone call segment.

6. A method for recording information regarding telephone calls comprising one or more segments, comprising:

(a) receiving audio data regarding one or more telephone call segments relating to one or more telephone calls, and data regarding telephony events associated with said telephone call segments;

(b) storing the received audio data regarding telephone call segments;

(c) storing the received data regarding telephony events associated with said telephone call segments;

(d) identifying telephone call segments that relate to one telephone call; and (e) constructing a data representation of a lifetime of the telephone call using data regarding telephony events associated with the telephone call segments of the telephone call, wherein said data representation comprises, for each segment of the call, the location of the stored audio data of that segment and the start time, end time, and duration of that segment.

7. A method for recording information regarding telephone calls comprising one or more segments, comprising:

(a) receiving audio data regarding one or more telephone call segments relating to one or more telephone calls, and data regarding telephony events associated with said telephone call segments, wherein the data regarding telephony events is received from a plurality of sources connected to a telephone switching environment, wherein at least one of the sources is a real-time link and at least one of the sources is not a real-time link;

(b) storing the received audio data regarding telephone call segments;

(c) storing the received data regarding telephony events associated with said telephone call segments;

(d) identifying telephone call segments that relate to one telephone call; and (e) constructing a data representation of a lifetime of the telephone call using data regarding telephony events associated with the telephone call segments of the telephone call.

8. The method of claim 7 wherein at least one of the sources connected to a telephone switching environment is a CTI link and at least one of the sources connected to a telephone switching environment is an SMDR link.

* * * * *